(12) United States Patent
Furusho

(10) Patent No.: US 6,643,644 B1
(45) Date of Patent: Nov. 4, 2003

(54) METHOD AND APPARATUS FOR RETRIEVING ACCUMULATING AND SORTING TABLE FORMATTED DATA

(76) Inventor: Shinji Furusho, Court House Kikuna 804, 1101-7, Matsumi-cho 4-chome, Kanagawa-ku, Yokohama-shi, Kanagawa (JP), 221-0005

( * ) Notice: Subject to any disclaimer, the term of this patent is extended or adjusted under 35 U.S.C. 154(b) by 0 days.

(21) Appl. No.: 09/762,584
(22) PCT Filed: Aug. 9, 1999
(86) PCT No.: PCT/JP99/04300
§ 371 (c)(1),
(2), (4) Date: Mar. 16, 2001
(87) PCT Pub. No.: WO00/10103
PCT Pub. Date: Feb. 24, 2000

(30) Foreign Application Priority Data

Aug. 11, 1998 (JP) .......................................... 10/227278
Nov. 27, 1998 (JP) .......................................... 10/338133

(51) Int. Cl.[7] .............................................. G06F 17/00
(52) U.S. Cl. ............................ 707/5; 707/101; 711/202
(58) Field of Search ..................... 707/1–10, 100–104.1, 707/200–206; 711/200–221; 717/168–170

(56) References Cited

U.S. PATENT DOCUMENTS

| | | | |
|---|---|---|---|
| 6,513,041 B2 * | 1/2003 | Tarin | 707/102 |
| 6,523,027 B1 * | 2/2003 | Underwood | 707/4 |
| 6,550,057 B1 * | 4/2003 | Bowman-Amuah | 707/5 |

FOREIGN PATENT DOCUMENTS

| | | |
|---|---|---|
| JP | 55-83962 A | 6/1980 |
| JP | 63-298626 A | 12/1988 |
| JP | 01-219927 A | 9/1989 |
| JP | 04-128972 A | 4/1992 |
| JP | 06-282578 A | 10/1994 |

OTHER PUBLICATIONS

Hirayama, A framework for forms processing using an enhanced–line–shared–adjacent format, Document Analysis and Recognition, 1999, ICDAR '99, Proceedings of the Fifth International Conference on, Sep. 20–22, 1999, pp. 103–106.*

Campbell et al., Video decimator design using a systolic array, Circuits and Systems, 1993, ISCAS '93, 1993 IEEE International Symposium on, May 3–6, 1993, pp. 1726–1729, vol. 3.*

Elsherbeni et al., Visualization of two and three dimensional antenna patterns, Southeastcon '94, 'Creative Technology Transfer—A Global Affair'., Proceedings of the 1994 IEEE, Apr. 10–13, 1994, pp. 270–272.*

(List continued on next page.)

*Primary Examiner*—David Jung
(74) *Attorney, Agent, or Firm*—Griffin & Szipl, P.C.

(57) ABSTRACT

This invention provides a method and apparatus for searching for and tabulating table-format data that not only has the functions of a conventional data table but also greatly increases the speed of searching for and tabulating large amounts of data. The method for searching for and tabulating table-format data represented as an array of records including fields containing field values for each field according to the present invention comprises: keeping in a storage device, a value control table containing field values in the order of field value numbers corresponding to field values belonging to a specific field, and a field value number-specifying information array containing information that specifies the field value numbers in the order of records, acquiring from the field value number-specifying information array the field value number corresponding to the specific record, and obtaining from the field values stored in the value control table the field value corresponding to the field value number thus acquired.

32 Claims, 39 Drawing Sheets

OTHER PUBLICATIONS

Inst. of Electronics, Information and Communication Engineers, Sybase IQ, vol. 97, No. 415, Dec. 2, 1997, pp. 51–56, "The Approach to the Data Warehouse by the Original Data Structure", Masayuki Unoki.

C&C Information Technology Lab., vol. 88, No. 127, Jul. 22, 1988, pp. 25–32, "A Retrieval Interface Based on Montage Method for Statistical Summary Databases", Jun' ichi Ueno.

"A Database Operation Processor: DBE", S. Matsuda et al., vol. 33, No. 12, Dec. 1992, pp. 1424–1430.

Journal of IPSJ, vol. 38, No. 9, Sep. 1997, pp. 745–750, "Data Warehouse and Multi–Dimensional Database", S. Tanaka.

"Introduction of Multi–Dimensional Database", S. Tanaka et al., pp. 1–7, 110–1 (Oct. 24, 1996).

The Institute of Electronics, Information and Communication Engineers, Technical Report of IEICE, A197–49, DE97–82 (Dec. 1997), pp. 25–30, "Storing a Large Time Sequenced Data within Disks", H. Sakai et al.

* cited by examiner

| RECORD NUMBER | SEX | AGE | PROFESSION |
|---|---|---|---|
| 0 | FEMALE | 18 | PROGRAMMER |
| 1 | MALE | 21 | STUDENT |
| 2 | FEMALE | 31 | TEACHER |
|  |  |  |  |
| 999999 | FEMALE | 16 | STUDENT |

DIRECTION OF INCREASING LOGICAL ADDRESSES

| 0 | FEMALE 18 PROGRAMMER |
|---|---|
| 1 | MALE 21 STUDENT |
| 2 | FEMALE 31 TEACHER |
| ... |  |
| 999999 | FEMALE 16 STUDENT |

DIRECTION OF INCREASING LOGICAL ADDRESSES

| 0 | FEMALE |
|---|---|
| 1 | MALE |
| 2 | FEMALE |
| 999999 | FEMALE |
| 0 | 18 |
| 1 | 21 |
| 2 | 31 |
| 999999 | 16 |
| 0 | PROGRAMMER |
| 1 | STUDENT |
| 2 | TEACHER |
| 999999 | STUDENT |

FIG. 23A

|  | STUDENT | PROGRAMMER | TEACHER | UNEMPLOYED |
|---|---|---|---|---|
| MALE | ○ | ○ | ○ | ○ |
| FEMALE | ○ | ○ | ○ | ○ |

FIG. 23B

|  | STUDENT | PROGRAMMER | TEACHER | UNEMPLOYED |
|---|---|---|---|---|
| MALE | × | × | × | × |
| FEMALE | ○ | × | × | × |

FIG. 24

| | |
|---|---|
| 0 | PENCIL;ERASER |
| 1 | RULER |
| 2 | PAPER;ERASER |
|  | . . |
| 999999 | PAPER;PENCIL |

FIG. 26

|  | STUDENT | PROGRAMMER | TEACHER | OTHER | BLANK |
|---|---|---|---|---|---|
| MALE | 81 | 5 | 0 | 5 | 6 |
| FEMALE | 54 | 8 | 56 | 6 | 8 |
| BLANK | 3 | 2 | 2 | 5 | 12 |

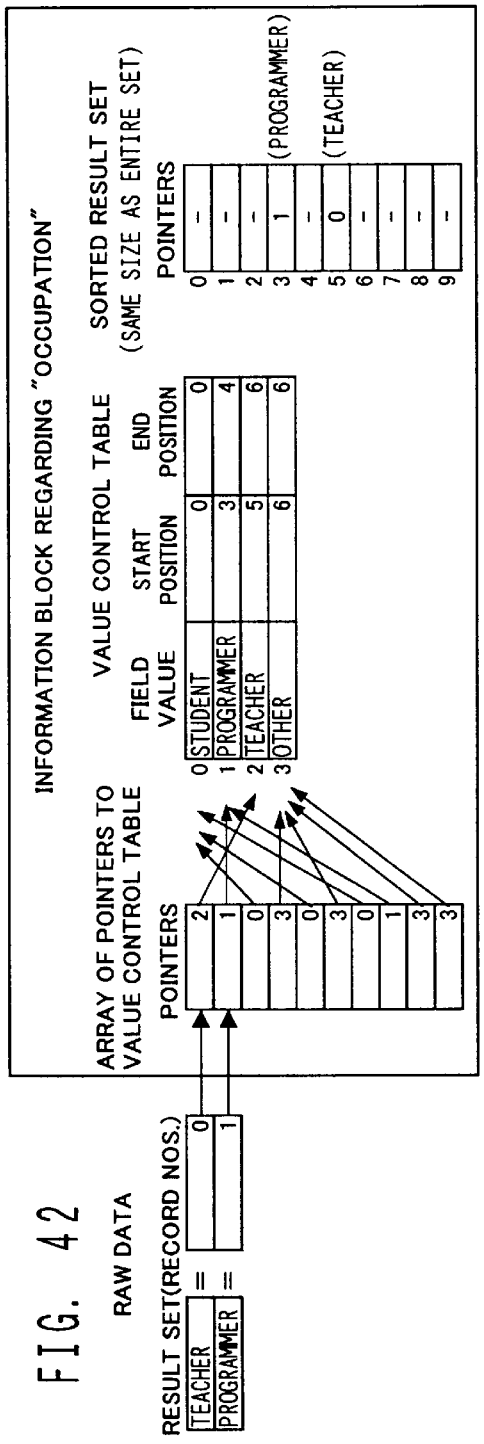
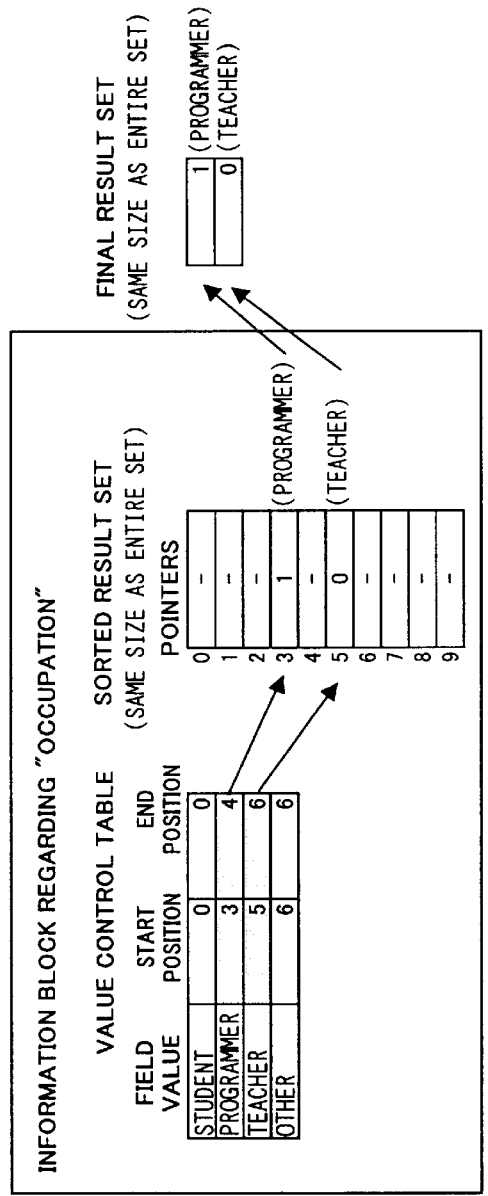
FIG. 42
FIG. 43

| RECORD NO. | x10,000 | x100 | x1 |
|---|---|---|---|
| 000000 | 00 | 00 | 00 |
| 000001 | 00 | 00 | 01 |
| . | . | . | . |
| . | . | . | . |
| . | . | . | . |
| 000100 | 00 | 01 | 00 |
| 000101 | 00 | 01 | 01 |
| . | . | . | . |
| . | . | . | . |
| . | . | . | . |
| 010000 | 01 | 00 | 00 |
| 010001 | 01 | 00 | 01 |
| . | . | . | . |
| . | . | . | . |
| . | . | . | . |
| 999999 | 99 | 99 | 99 |

| | BIT FLAG | ARRAY OF POINTERS | |
|---|---|---|---|
| NO. OF HITS | SEARCH | SEARCH | CROSS-TABULATION |
| 1000000 | 324 | 230 | 168 |
| 500000 | 260 | 185 | 83 |
| 250000 | 210 | 184 | 40 |
| 100000 | 205 | 127 | 15 |
| 10000 | 120 | 106 | 3 |
| 1000 | 35 | 95 | 0 |

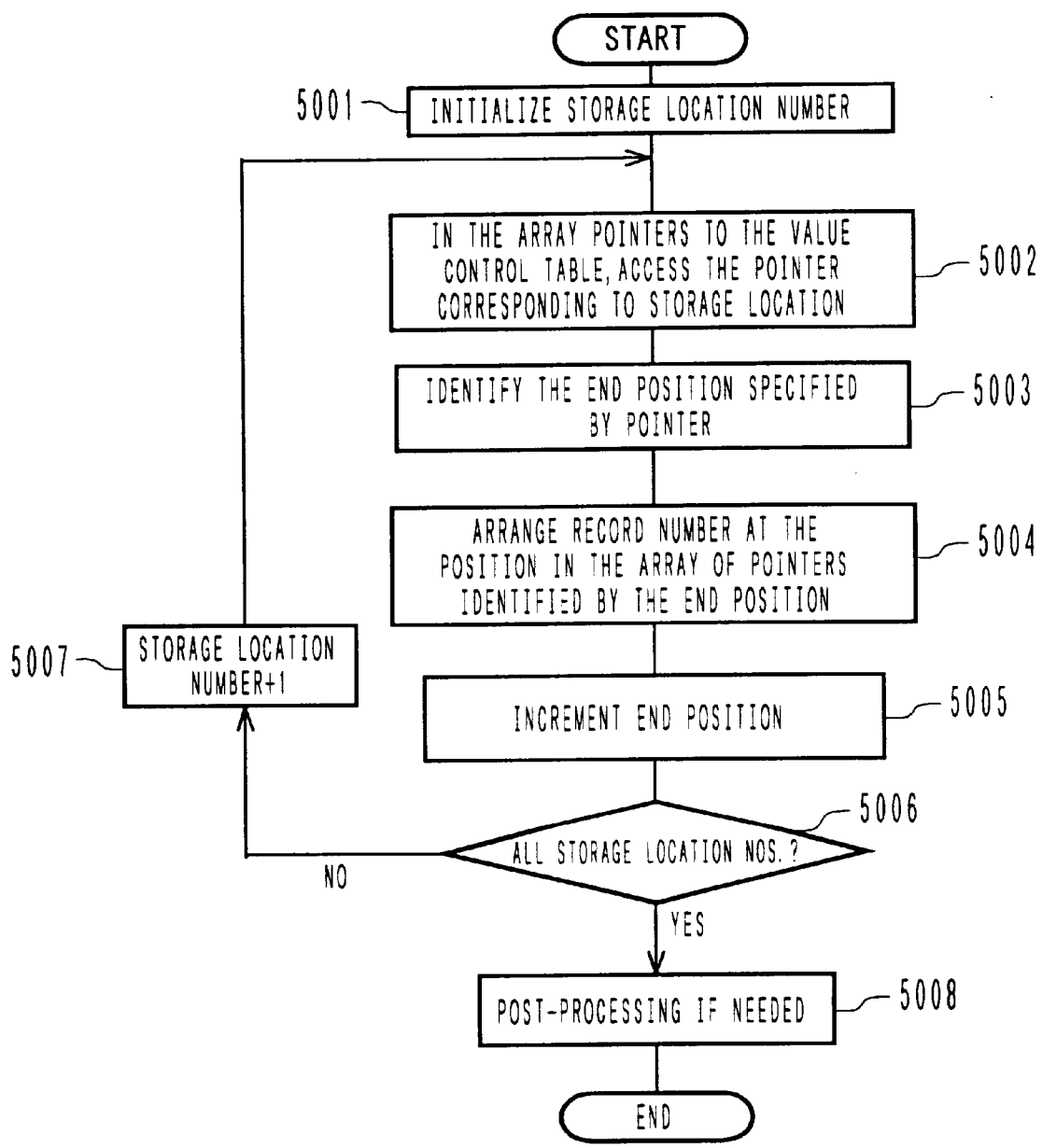

METHOD AND APPARATUS FOR RETRIEVING ACCUMULATING AND SORTING TABLE FORMATTED DATA

This application is related to and claims the early filing dates of Japanese Patent Application No. 10-227278, filed Aug. 11, 1998, Japanese Patent Application No. 10-338133, filed Nov. 27, 1998, and International Patent Application No. PCT/JP99/04300, filed Aug. 8, 1999. The entire disclosures of the above applications are hereby incorporated by reference.

BACKGROUND OF THE INVENTION

1. Field of the Invention

The invention relates to a data processing method and data processing apparatus or processing large amounts of data using a computer or other information processing apparatus, and particularly to a method and apparatus for searching for, tabulating and sorting table-format data.

2. Description of the Prior Art

Conventionally, large amounts of data are accumulated and searching and tabulating and other types of data processing is performed on the accumulated data. This data processing may be done using, for example, a known computer system including a CPU, memory, peripheral interface, a hard disk or other auxiliary storage device, a display, a printer or other output device, a keyboard, a mouse or other input device, and a power supply unit connected via a bus, and particularly as software that can be run on a readily available commercial computer system. In order to perform the aforementioned searching, tabulating or other types of data processing, various types of databases that particularly store large amounts of data are known. Among various types of large amounts of data, there is a particularly strong demand to process data that can be expressed in a table format. FIG. 1 is a diagram showing an example of expressing the data to be processed in a table format. FIG. 1 shows an example wherein the sex, age and occupation data for a large number of people, e.g. 1 million, are stored in a table. In FIG. 1, the horizontal rows in the table, namely the so-called records, consist of the record number, and the sex, age and occupation fields corresponding to the record number. The vertical columns in the table consist of the record number, sex, field, age field and occupation field. The table indicates that the person with the record number of "0" has a sex of female, age of 18 and occupation of programmer. In the following explanation, the data such as "Female," "18" and "Programmer" set in the various fields are called field values. In addition, in the following explanation, unless otherwise indicated, the table-format data consisting of 1 million records shown in FIG. 1 is used as a specific example of a large amount of data.

Whether or not large amounts of data can be searched for or tabulated efficiently depends on the format in which the large amount of data is stored. Conventionally, typical known storage techniques include the so-called "record-sequential" and "field-sequential" storage techniques shown in FIGS. 2A and 2B, respectively.

FIG. 2A and FIG. 2B show a representation of the data storage format on a storage device, e.g. a hard disk. In the case of the record-sequential storage technique in FIG. 2A, a set of the field values of sex, age and occupation for each record number is stored on disk in the order of increasing logical addresses sequentially for each record number. On the other hand, in the case of the field-sequential storage technique in FIG. 2B, for each field, the field values are stored in record number order grouped by field in the direction of increasing logical addresses. To wit, in the example of FIG. 2B, the field values for the sex field corresponding to record numbers "0" through "999999" are arranged in order, and next, the field values for the age field are arranged in record number order, and then the field values for the occupation field are arranged in record number order.

In the case of the aforementioned prior art, field values corresponding to all fields for all record numbers are stored as is in a two-dimensional data structure (with the record number as one dimension and the other field values as one dimension). Hereinafter, such a data structure in particular shall be referred to as a "data table." In the case of the prior art, when searching for and tabulating stored data, this is performed by accessing such a data table.

In addition to the method of storing the value of the fields as field values as is, there is also a known method of converting the values to codes and storing the codes as field values. For example, with respect to the sex field, the value "Male" may be converted to "0" while the value "Female" is converted to "1" and then the values "0" or "1" are stored as the field values instead of "Male" or "Female." Even in this case, there is no change to the point that the converted codes are stored in a data table as field values.

In the case of searching for and tabulating large amounts of data stored using a data structure of the data table type in the aforementioned prior art, there is a problem in that the processing time for searching and tabulating becomes longer due to the access time required to access such data tables.

In addition, data tables have at least the following intrinsic drawbacks.

(1) The data tables easily become enormous in size and cannot be easily separated (physically) into individual fields. For example, when extracting records in which the sex is "Male," the age and occupation information is unnecessary, so efficiency could be improved if the table could be separated into a table containing only the sex fields. In the case of the field-sequential storage technique shown in FIG. 2B, while separation into individual fields is simple, when large amounts of data are handled, the size of the data table still becomes enormous, so the actual expansion of a data table into memory or other fast storage device for the purpose of tabulating or searching is difficult.

(2) Data tables cannot be kept in a form with multiple field values sorted simultaneously. For example, in the case of the prior art illustrated in FIG. 2A and FIG. 2B, the field values for the sex field are arranged in record number order in the manner "Female, Male, Female, . . . , Female." However, when performing searching and tabulating processes, it is typically convenient for them to arrange in the manner "Female, Female, Female, Male, . . . , Male." However, in table data, the field values are arranged in a specific matrix order, namely record number order, so sorting the field values on a specific field is not permitted. For this reason, in the case of the prior art, it is not possible to select an arrangement of field values that is convenient for searching and tabulating.

(3) In a data table, identical values appear over and over. For example, in the case of the conventional data table given in FIG. 2A and FIG. 2B, at the time of extracting records wherein the sex is "'Male' or 'Man'" (or namely, record numbers), because the field value "Male" appears many times, it is necessary to perform the matching operation "'Male' or 'Man'" which is the comparison condition with the field value of "Male" many times. A single comparison should be sufficient to make the determination of whether there is a match with identical values.

In order to increase greatly the speed of searching for and tabulating large amounts of data, the object of the present invention is to provide a method of searching for, tabulating and sorting table-format data and an apparatus for implementing said method by providing a data control mechanism that both has the functions of the conventional data table and solves the aforementioned problems with the data structure based on the data table.

SUMMARY OF THE INVENTION

In order to achieve the aforementioned object, the method and apparatus for searching for and tabulating table-format data according to the present invention proposes a novel data control mechanism that is usable on an ordinary computer system. The data control mechanism according to the present invention comprises a value control table and an array of pointers to the value control table, as a general rule.

FIG. 3 is a diagram used to explain the principle of the present invention, showing a value control table 10 and an array of pointers to the value control table 20. A value control table 10 is defined to be a table made by assigning, for each field in table-format data, an (integral) field value number to each field value belonging to that field, and the table thus contains the field values corresponding to said field value number arranged in order of the field value numbers (reference number 11) along with a category number (reference number 12) which relates to said field value. An array of pointers to the value control table 20 is defined to be an array containing pointers to the field value numbers of the columns (namely, the fields) in the table-format data, namely to the value control table 10, arranged in order of the record numbers of the table-format data.

By combining the array of pointers to the value control table 20 with the value control table 10, given a certain record number, it is possible to use the array of pointers to the value control table 20 pertaining to the field in question to extract the stored field value number corresponding to that record number, and next, extract the stored field value corresponding to that field value number within the value control table 10, and thus obtain the field value from the record number. Therefore, in the same manner as with a conventional data table, it is possible to access all data (field values) with coordinates consisting of the record number (row) and field (column).

The data control mechanism according to the present invention, which includes a value control table generated for a certain field within the fields of table-format data and an array of pointers to the value control table, may also be referred to in particular as an "information block" in the following explanation.

While conventional data tables offer the integrated control of all data using the coordinates of the rows corresponding to records and columns corresponding to fields, the information blocks according to the present invention are characterized in that the data are completely separated by column in the table format, namely by field. In this manner, by means of the present invention, large amounts of data are separated by field, so it is possible to load only that data related to those fields required for searching or tabulating into memory or other high-speed storage device, and as a result, the access time to the data is reduced, so the searching and tabulating processes are speeded up, and even extremely large amounts of data can be handled without adversely affecting performance.

In addition, in the case of the information blocks according to the present invention, the field values are stored in the value control table, and the record numbers that indicate the position of the value are associated with the array of pointers to the value control table, so there is no need for the field values to be arranged in record number order. Therefore, data can be sorted on field values such that it is suited to searching and tabulating. Thereby, the determination of whether or not a field value matching the target value is present in the data can be performed at high speed. Furthermore, corresponding field value numbers are assigned to the field values, so even if the field values consist of long data or text strings, they can be handled as integers.

Moreover, by means of the present invention, all of the field value numbers of the value control table 10 correspond to different field values, so the number of comparison operations between a specific value and the field values which are required to extract a record containing a field value having that specific value is no more than the number of possible field values, namely the number of field value numbers, so the number of comparison operations is greatly decreased, thus speeding up searching and tabulating. At this time, while a location is required to store the results of determining whether or not a certain field value matches, for example, the category number 12 can be used as this storage location.

FIG. 4 shows the information block according to the present invention which comprises a value control table 10 including an array of field values 11 containing the field values, an array of category numbers 12 containing the category numbers, and an array of counts 14 containing the counts. The array of counts 14 contains numbers which indicate a count of the number of times each field value is present within all data in a certain field, or in other words, the number of records which have a stipulated field value. By preparing such an array of counts 14 within the value control table 10, the information "(how many instances of) which data is present?" required at the time of searching or tabulating can be obtained immediately, thus speeding up searching and tabulating.

FIG. 5 shows an information block including a value control table 10, array of pointers to the value control table 20 and an array of pointers to records 30. The array of pointers to records 30 is defined to be an array containing, for each field value number, namely each field value, pointers to records that have that field value (corresponding to the record number). The number of pointers contained in the array of pointers to records 30 for each field value matches the number of entries in the array of counts 14 in the value control table 10. In addition, an array of start positions 13 which specifies the starting address of a group of pointers for each field value may be provided within the array of pointers to records 30. By providing such an array of pointers to records 30 in the information block in this manner, a set of records that have a particular field value for a certain field can be extracted quickly. The count (reference number 14) and start positions (reference number 13) of pointers stored in the array of pointers to records 30 are set in the value control table 10, so the fact that the values and count are present in the information block as is such that they are usable at the time of tabulating is an advantage.

Here follows an explanation of the method of searching for and tabulating table-format data according to the present invention. Note that in the following explanation, the individual field information refers to the aforementioned "information block," and the field value number-specifying information array refers to the aforementioned "array of pointers to the value control table" while the record identifying information array refers to the aforementioned "array of pointers to records."

When table-format data is represented as an array of records including a plurality of fields containing field values for each field, the method of extracting from the table-format data the field value corresponding to a specific field and a specific record according to the present invention comprises the steps of:

keeping in a storage device, for each individual field, a value control table containing field values which are located in order of field value number each corresponding to the field value belonging to the specific field, and a field value number-specifying information array containing information that specifies the field value numbers in the order of the records, acquiring from the field value number-specifying information array the field value number corresponding to the specific record, and obtaining from the field values stored in the value control table the field value corresponding to the field value number acquired as above.

In addition, with the method of obtaining field values according to the present invention, in order to categorize the field values corresponding to the field value number, category numbers are stored in the value control table corresponding to the field value number, and the category numbers are accessed at the time of obtaining the field value corresponding to the field value number.

When table-format data is represented as an array of records including field values with respect to a field associated with a search condition, a single-search method of searching through said table-format data for field values that match a specific search condition comprises the steps of:

keeping in a storage device, for each individual field, individual field information such that includes a value control table containing field values which is located in order of field value numbers each corresponding to the field value belonging to the field associated with the search condition, a field value number-specifying information array containing information that specifies said field value numbers in the order of said records, and a record identification information array storing in exclusive areas for each of said field value numbers one or more pieces of record identification information related to identical field value numbers, and said value control table includes, for each of said field value numbers, record identification information-specifying information that indicates the area where said one or more pieces of record identification information related to identical field value numbers in said record identification information array, using said record identification information-specifying information corresponding to field value numbers related to field values within the field values contained in said value control table that match said search conditions, to acquire record identification information from said record identification information array that matches said search conditions.

In addition, the multiple-field search method according to the present invention comprises the steps of:

keeping in a storage device the result set of records that match the search conditions obtained by the single-field search method according to the present invention, selecting separate individual field information regarding fields related to separate search conditions, acquiring from the field value number-specifying information array regarding the separate individual field information the field value number corresponding the pieces of record identification information that match the search conditions set in the result set, regarding the separate individual field information, determining whether or not the field values identified by the extracted field value numbers match the separate search conditions, and regarding the separate individual field information, if the field values identified by the extracted field value numbers match the separate search conditions, extracting the pieces of record identification information corresponding to the field value numbers as pieces of record identification information that match the separate search conditions, and Alternately, as a variation to the multiple-field search method, it is possible to implement a so-called OR search. In more detail, this method comprises the steps of:

keeping in a storage device the result set of records that match the search conditions, regarding other individual field information related to other search conditions, using field values within the field values stored in other value control tables that match the search conditions and record identification information-specifying information corresponding to related field values to extract from a record identification information array the records that match the other search conditions, and store the records that match the search conditions in a specified other record set, p1 if necessary, regarding still other search conditions, using still other record identification information-specifying information to extract records that match still other search conditions, and repeating the storage of still other result sets, and obtaining a final result set by eliminating duplicate records from the result sets thus obtained.

When table-format data is represented as an array of records including a plurality of fields containing field values for each field, the method of tabulating the table-format data by each field value according to the present invention comprises the steps of:

if n represents an integer equal to 1 or greater, for each of n fields used in tabulation, keeping in a storage device individual field information including a value control table containing field values for that field corresponding to a field value number that uniquely identifies the field value, which is a field value number that is common to the various fields and has a stipulated order from an initial value, and a field value number-specifying information array containing information that specifies the field value numbers in the order of the records, if i represents an integer in the range $1 \leq i \leq n$, for the $i^{th}$ individual information field, the total number of the field value numbers is represented by $N_i$, $k_i$ represents an integer in the range $0 \leq k_i \leq N_i-1$, M represents an integer equal to 1 or greater, and if m is an integer in the range $1 \leq m \leq M$, then initializing elements $P_m(k_1, k_2, \ldots, k_i, \ldots, k_n)$ of n-dimensional M data spaces having a size of $N_{1 \times N2} \times \ldots \times N_i \times \ldots \times N_n$, for the n individual information fields, when j represents an integer in the range $0 \leq j \leq$ (total number of records)−1, extracting the respective field value numbers stored in the $j^{th}$ position in each field value number-specifying information array, and when the field value number extracted from the $i^{th}$ individual information field is represented by $q_i$, identifying the elements $P_{m(q_1,}$ $q_2, \ldots, q_i, \ldots, q_n)$ of the data space, and processing the identified values of the elements $P_m(q_1, q_2, \ldots, q_i, \ldots, q_n)$.

When table-format data is represented as an array of records including a plurality of fields containing field values for each field, the method of tabulating the table-format data by the category of field values, the method being characterized in comprising the steps of:
if n represents an integer equal to 1 or greater, for each of n fields used in tabulation, keeping in a storage device individual field information including a value control table containing field values for that field and the category number of the field value corresponding to a field value number that uniquely identifies the field value, which is a field value number that is common to the various fields and has a stipulated order from an initial value, and a field value number-specifying information array containing information that specifies the field value numbers in the order of the records, if i represents an integer in the range $1 \leq i \leq n$, for the $i^{th}$ individual information field, the total number of either the field value numbers or the category numbers is represented by $N_i$, $k_i$ represents an integer in the range $0 \leq k_i \leq N_i - 1$, M represents an integer equal to 1 or greater, and if m is an integer in the range $1 \leq m \leq M$, then initializing elements $P_m(k_1, k_2, \ldots, k_i, \ldots, k_n)$ of n-dimensional M data spaces having a size of $N_1 \times N_2 \times \ldots \times N_i \times \ldots \times N_n$, for the n individual information fields, when j represents an integer in the range $0 \leq j \leq$ (total number of records)$-1$, extracting the respective field value numbers stored in the $j^{th}$ position in each field value number-specifying information array, and when the field value number extracted from the $i^{th}$ individual information field or the category number stored corresponding to the field value number in the value control table of the $i^{th}$ individual information field is represented by $q_i$, identifying the elements $P_m(q_1, q_2, \ldots, q_i, \ldots, q_n)$ of the data space, and processing the identified values of the elements $P_m(q_1, q_2, \ldots, q_i, \ldots, q_n)$.

With the method of tabulating counts in particular according to the present invention, M=1 is true, and the step of processing the value of the identified element $P_m$ includes adding 1 to the current value of the element $P_m$.

In addition, with the method of tabulating statistical quantities according to the present invention, the step of processing the value of the identified element $P_m$ comprises: for at least one element $P_m$ among the M elements $P_m$, for separate individual field information kept in a storage device, acquiring the field value numbers stored in the $j^{th}$ position in the field value number-specifying information array, from among the field values stored in the value control table of the separate individual field information, acquiring the field value corresponding to the field value number thus acquired, and updating the current value of the element $P_m$ and the value of the element $P_m$ in combination with the field value thus obtained.

With the present invention, the information that specifies the field value number may be the field value number itself.

Alternately, in order to implement the so-called multi-answer fields wherein multiple field values are allocated to one field of a certain record, with the present invention, the information that specifies the field value number may be a binary value wherein 1 bit is allocated to each field value number, thus setting whether or not it is set.

In addition, when table-format data is represented as an array of records including a plurality of fields containing field values for each field, the apparatus for searching for and tabulating the table-format data according to the present invention comprises:

a storage device for keeping, for each individual field, a value control table containing field values for that field corresponding to a field value number that uniquely identifies the field value, which is a field value number that is common to the various fields and has a stipulated order from an initial value, and a field value number-specifying information array containing information that specifies the field value numbers in the order of the records, means of acquiring from the field value number-specifying information array kept on the storage device the field value number corresponding to the specific record, and means of obtaining from the field values stored in the value control table kept on the storage device the field value corresponding to the field value number acquired as above.

When table-format data is represented as an array of records including a plurality of fields containing field values for each field, the storage medium upon which is recorded a program for searching for and tabulating the table-format data according to the present invention is recorded with a program characterized in comprising:

a step of keeping in a storage device, for each individual field, a value control table containing field values for that field corresponding to a field value number that uniquely identifies the field value, which is a field value number that is common to the various fields and has a stipulated order from an initial value, and a field value number-specifying information array containing information that specifies the field value numbers in the order of the records, a step of acquiring from the field value number-specifying information array kept on the storage device the field value number corresponding to the specific record, and a step of obtaining from the field values stored in the value control table kept on the storage device the field value corresponding to the field value number acquired as above.

The present invention also proposes a sorting method whereby an array of record identification information, e.g. record numbers, specifying records including a plurality of fields containing field values corresponding to fields of information is rearranged on a specific field. With the sorting method according to the present invention, an array of pointers to the value control table is formed wherein, for each record, record identification information is associated with field value number corresponding to the field values of a certain field. Next, for each of the field value numbers, the storage location after reordering said record identification information is defined. Said record identification information is sequentially extracted from the array, and said field value number corresponding to said record identification information thus extracted is determined, the record identification information thus extracted is stored in said storage location according to the record identification information-specifying information corresponding to the field value number thus determined, and the storage location where the record identification information is to be stored is updated in order to store the next record identification information.

A preferred embodiment of the sorting method according to the present invention comprises the steps of keeping in a storage device individual field information including a value control table containing field values in the order of field value numbers corresponding to field values for a field value associated with search conditions, and a field value number-specifying information array containing information that specifies field value numbers in the order of the records, where the value control table further includes record identification information-specifying information that, for each field value number, indicates the area in said record identification information-specifying information array where said one or more pieces of record identification information regarding identical field value numbers are stored, and is constituted such that, record identification information is stored at storage locations according to the record identification information-specifying information.

Moreover, the objects of the present invention may be achieved by an apparatus for implementing the aforementioned methods, a computer-readable storage medium containing a program according to this method, or a computer-loadable program product according to the method in question.

BRIEF EXPLANATION OF THE DRAWINGS

This and other objects of the present invention will be made clear in reference to the appended drawings and embodiments. Here.

FIGS. 23A and 23B are conceptual explanatory diagrams of a cross-tabulation table.

FIG. 24 is an explanatory diagram illustrating multi-answer type fields.

FIG. 26 is an explanatory diagram illustrating the method of handling special values according to Embodiment 11 of the present invention.

FIG. 42 is an explanatory diagram illustrating sorting on a partial set.

FIG. 43 is an explanatory diagram illustrating the post-processing of sorting on a partial set.

FIG. 50 is a flowchart illustrating the sorting process according to Embodiment 13 of the present invention.

DESCRIPTION OF THE PREFERRED EMBODIMENT

Figures 1, 2A, 2B, 28:
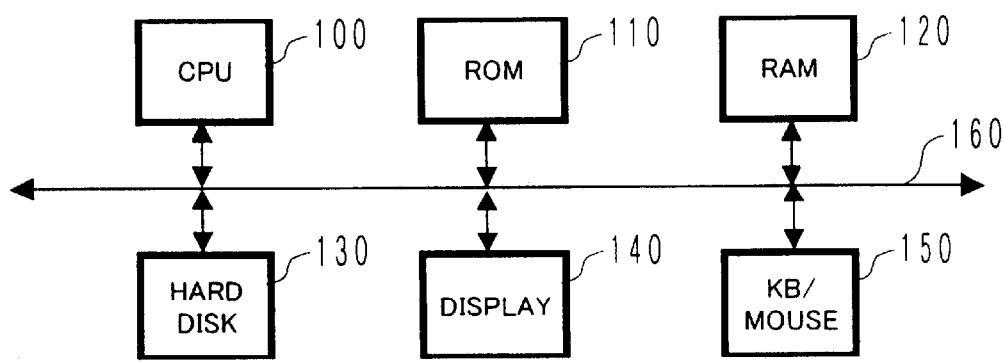
FIG. 1 is an explanatory diagram illustrating typical table-format data.
FIGS. 2A and 2B are explanatory diagrams illustrating table-format data storage techniques in the prior art.
FIG. 28 is a structural diagram of a searching and tabulating system for table-format data based on one embodiment of the present invention.
Figure 3:
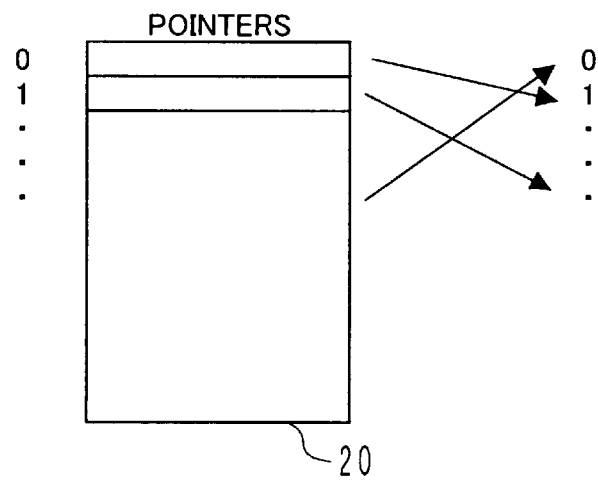
FIG. 3 is an explanatory diagram illustrating the principle of the present invention.
Figure 4:
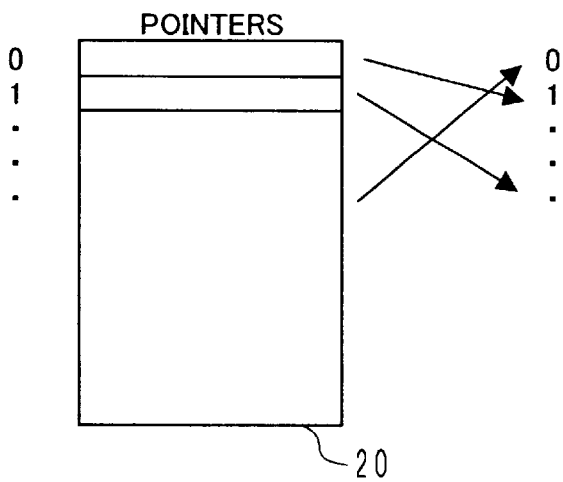
FIG. 4 is an explanatory diagram illustrating an information block according to the present invention.

In order for the present invention to be better understood, we shall use the table-format data illustrated in FIG. 1 as an example of data, and make a detailed description of the search method, tabulating method and sorting method according to the present invention in various embodiments. The data illustrated in the example of FIG. 1 includes the fields of "sex," "age" and "occupation," so as shown in the individual figures in FIGS. 6–8, the information blocks obtained are an information block regarding "sex," an information block regarding "age" and an information block regarding "occupation." The following description assumes a situation wherein these information blocks are obtained. Note that while one technique of constructing the information blocks will be described later, note that the present invention is in no way limited by the method of constructing the information blocks.

As described later, the apparatus for searching for and tabulating table-format data according to an embodiment of the present invention is provided with the structure shown in FIG. 28. As shown in FIG. 28, the apparatus for searching for and tabulating table-format data is implemented by means of a computer system such as an ordinary personal computer. This computer system includes a CPU 100 that executes programs to control the entire system and its individual constituent components, ROM (Read Only Memory) 110 that stores programs and the like, RAM (Random Access Memory) 120 that stores working data and the like, a hard disk storage device 130, a display device 140, and a keyboard, mouse or other input device 150. The CPU 100, ROM 110, RAM 120, and the like are connected to each other via a bus 160. Other components that may also be connected to the bus include a CD-ROM drive (not shown) for accessing CD-ROM discs, an external network (not shown) and an interface (not shown) provided to connected external terminals, and the like.

The program that performs the searching and tabulating (and also depending on the case, sorting) of table-format data may be contained on CD-ROM (not shown) and read by a CD-ROM drive (not shown), or stored in advance in ROM 110. In addition, once read from CD-ROM, the program may also be stored in a specific area of the hard disk storage device 130. Alternately, the aforementioned program may also be supplied from outside via the network, external terminals or interface (none of these are shown).

Figure 9:
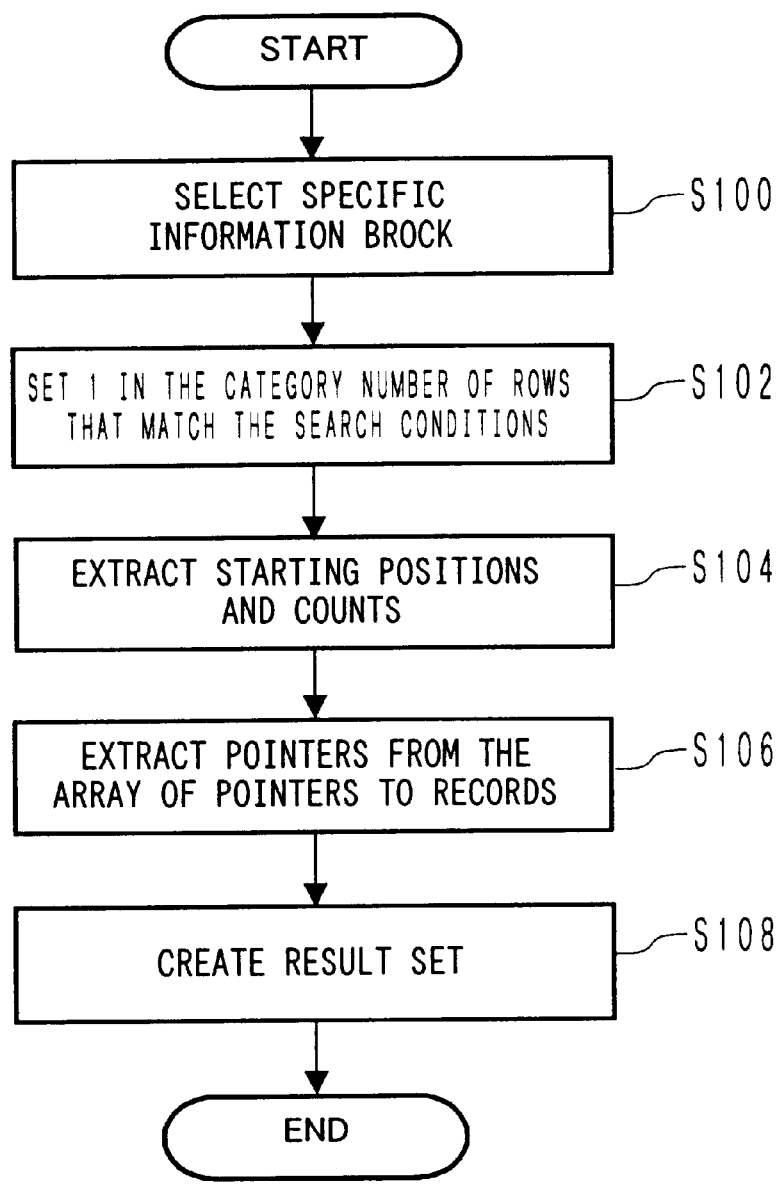
FIG. 9 is a flowchart of the operation of the method of searching within a single field according to Embodiment 1 of the present invention.

In addition, in the aforementioned search and tabulating apparatus, in order to execute searching and tabulating (and also depending on the case, sorting) processes on table-format data, as described later, it is necessary to generate an information block of a stipulated data format based on the table-format data. This information block generation program may be similarly contained on CD-ROM, stored in ROM 110, or stored on the hard disk storage device 130. Alternately, the aforementioned programs may also be supplied from outside via the network, external terminals or interface (none of these are shown). In addition, in this embodiment, the data (information blocks) generated by the aforementioned information block generating program that generates the information blocks are stored in RAM 120 or in a specific area of the hard disk storage device 130. Here follows a description of the method of searching on a single field according to Embodiment 1 of the present invention, in the case of searching for records wherein the value of the "age" field is "16" or "19." FIG. 9 is a flowchart of the operation of the method of searching within a single field. This is implemented by the CPU 100 executing the search program acquired by the aforementioned procedure and stored in a stipulated area.

Figure 7:
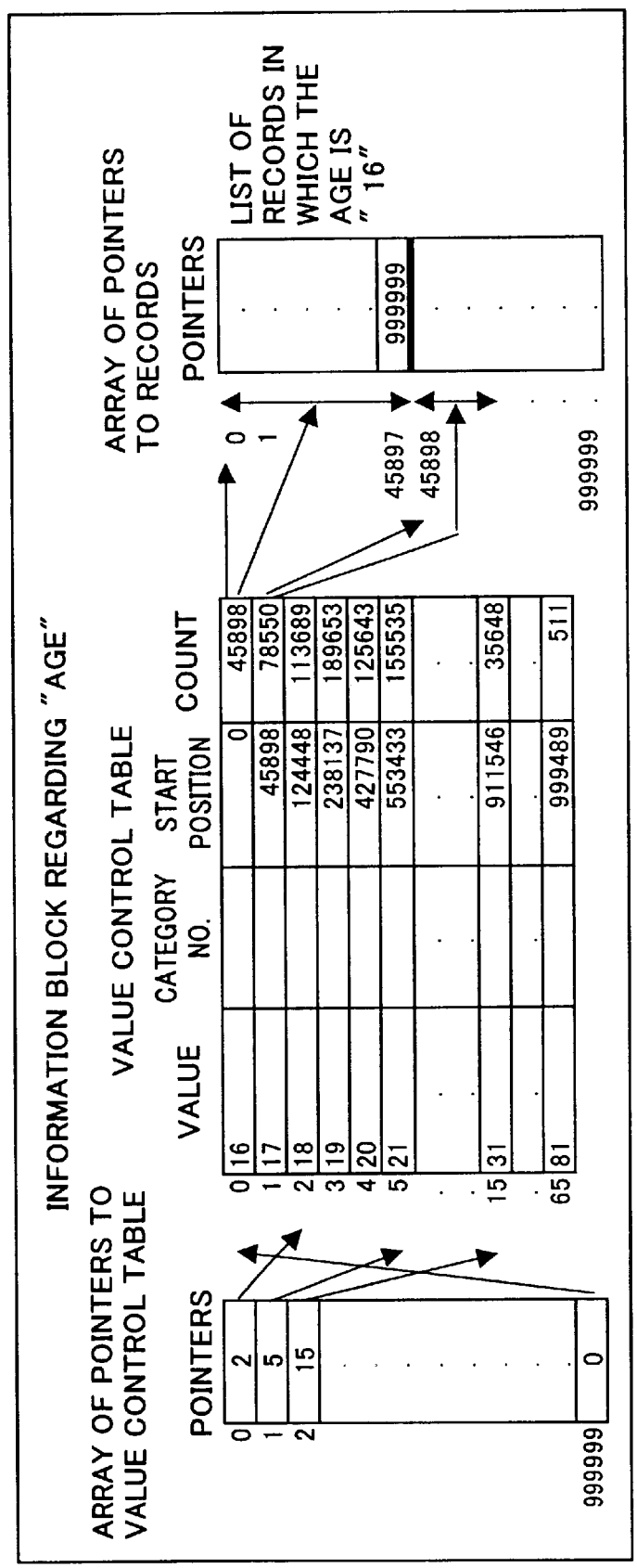
FIG. 7 is an explanatory diagram illustrating an information block regarding "age" used in an embodiment of the present invention.

First, from among the information blocks regarding table-format data, select the information block regarding "age" shown in FIG. 7 as the specific information block (Step 100).

Figure 10:
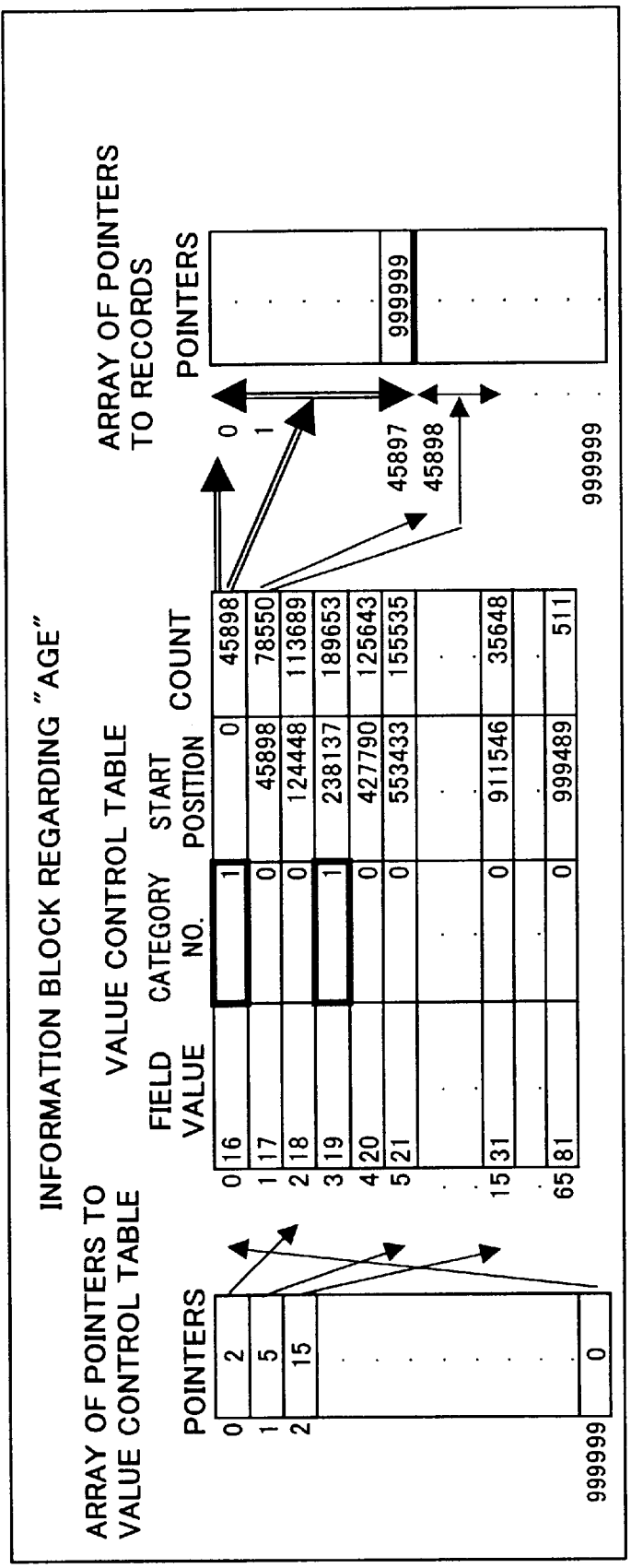
FIG. 10 is an explanatory diagram illustrating an information block according to Embodiment 1 of the present invention.

Next, set "1" in the category number of those rows in which the field value within the value control table of the specific information block matches "16" or "19" which is the aforementioned search condition, and set "0" in the category number of other rows (Step 102). In the case of this example as shown in FIG. 10, "1" is set in the category number of those rows corresponding to a field value number of "0" and field value number of "3."

Next, the start positions and counts corresponding to the rows wherein the category number is set to "1" (namely, the rows to which the field value numbers of "0" and "3" are applied) are acquired as pointer extraction information (Step 104). In the case of this example, the field value number of "0" has a corresponding start position of "0" and count of "45898." On the other hand, the field value number of "3" has a corresponding start position of "238137" and count of "189653."

Figure 11:
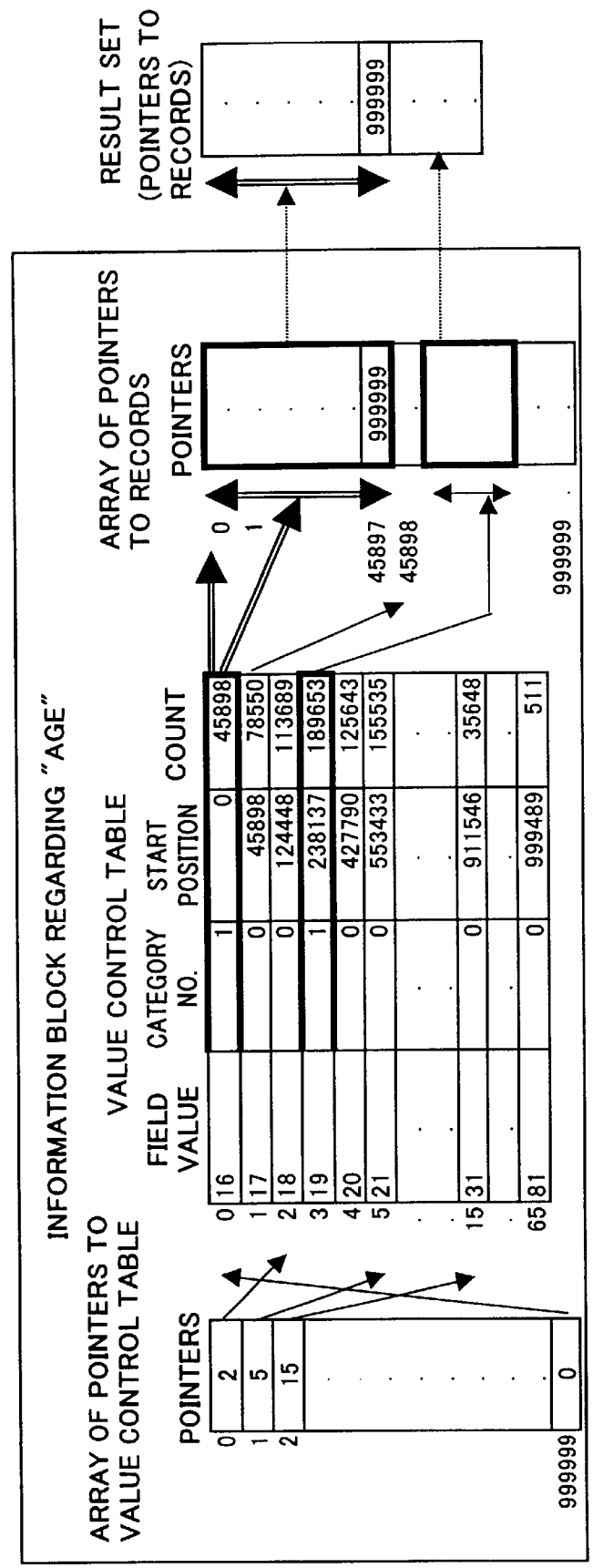
FIG. 11 is an explanatory diagram illustrating an information block according to Embodiment 1 of the present invention.

By extracting from the array of pointers to records the number of pointers specified by the aforementioned start position and count, the record numbers that represents pointers to the records matching the aforementioned search conditions are extracted (Step 106). In the case of this example, as shown in FIG. 10, one can see that the pointers to records corresponding to the field value number of "0" are stored in the array of pointers to records at locations from the start position of "0," or namely the beginning, up until the $45898^{th}$ location, while the pointers to records corresponding to the field value number of "3" are stored in the array of pointers to records at 189653 locations starting from the $2383137^{th}$ location. For example, when accessing the table-format data in FIG. 1, the "age" corresponding to the record with the last record number of "999999" is "16," so as shown in FIG. 11, the last pointer among the stored pointers within the array of record pointers which correspond to a field value number of "0," or namely an "age" of "16," is "999999."

Finally, in order to be used in subsequent processing, an array of the extracted record numbers is created as a result set and saved (Step 108).

Figure 12:
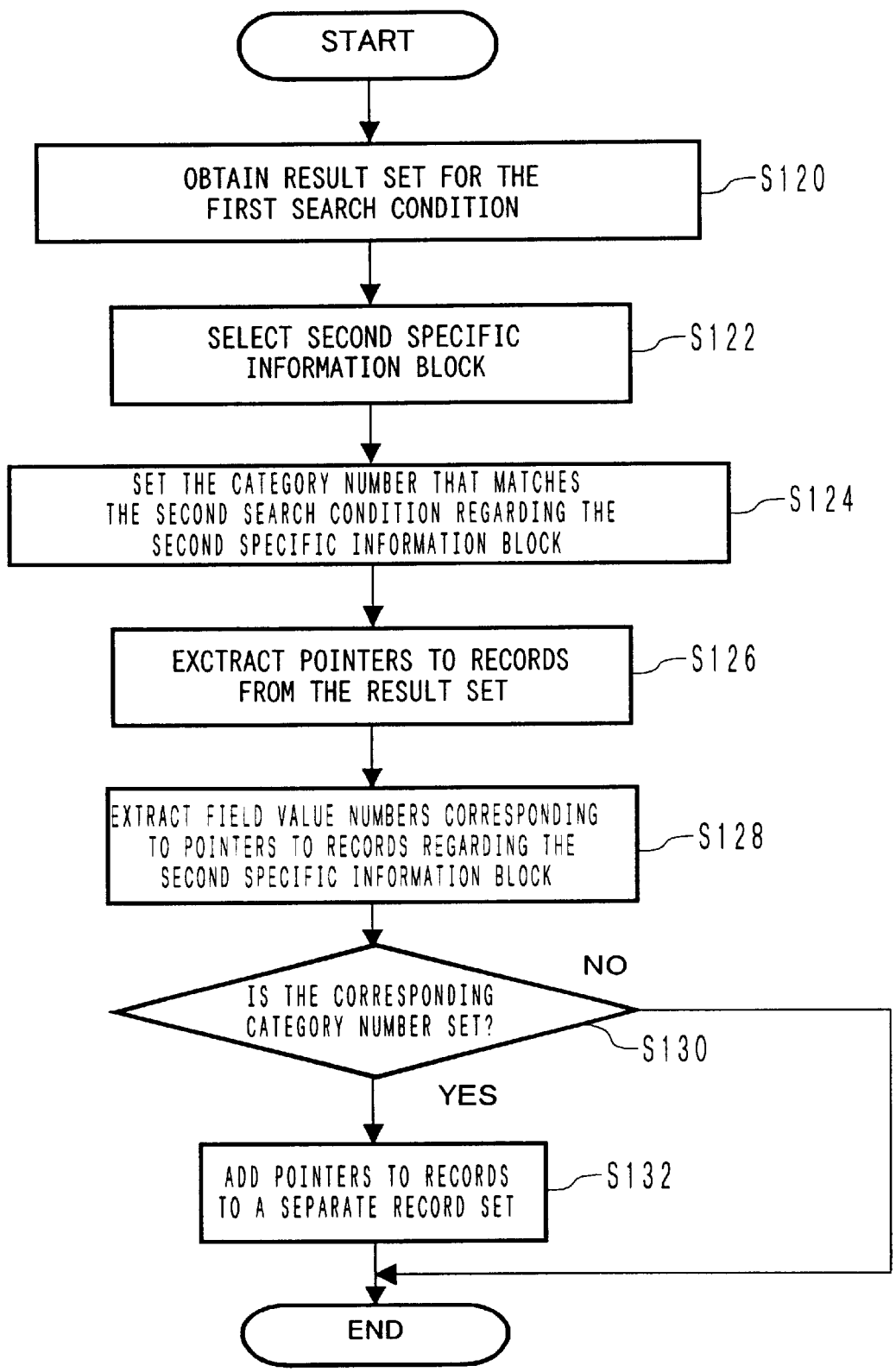
FIG. 12 is a flowchart of the operation of the method of searching upon an AND of multiple fields according to Embodiment 2 of the present invention.

With the present invention, it is possible to implement not only searches on a single field as described above, but also searches on an AND of multiple fields. Here follows a description of the method of performing searches on an AND of multiple fields according to Embodiment 2 of the present invention. In this example, we shall consider the case of obtaining a set of records that satisfy both the first search condition of the "age" being "16" or "19" and the second search condition of the "occupation" being "Student." FIG. 12 is a flowchart of the operation of the method of searching upon an AND of multiple fields.

As described previously, for the first specific information block which is the information block regarding "age" which is the first field, a result set of records wherein the "age" is "16" or "19" is obtained by means of the processing according to Embodiment 1 (Step 120). Therefore, the processing of this Step 120 corresponds roughly to that shown in FIG. 9.

Figure 8:
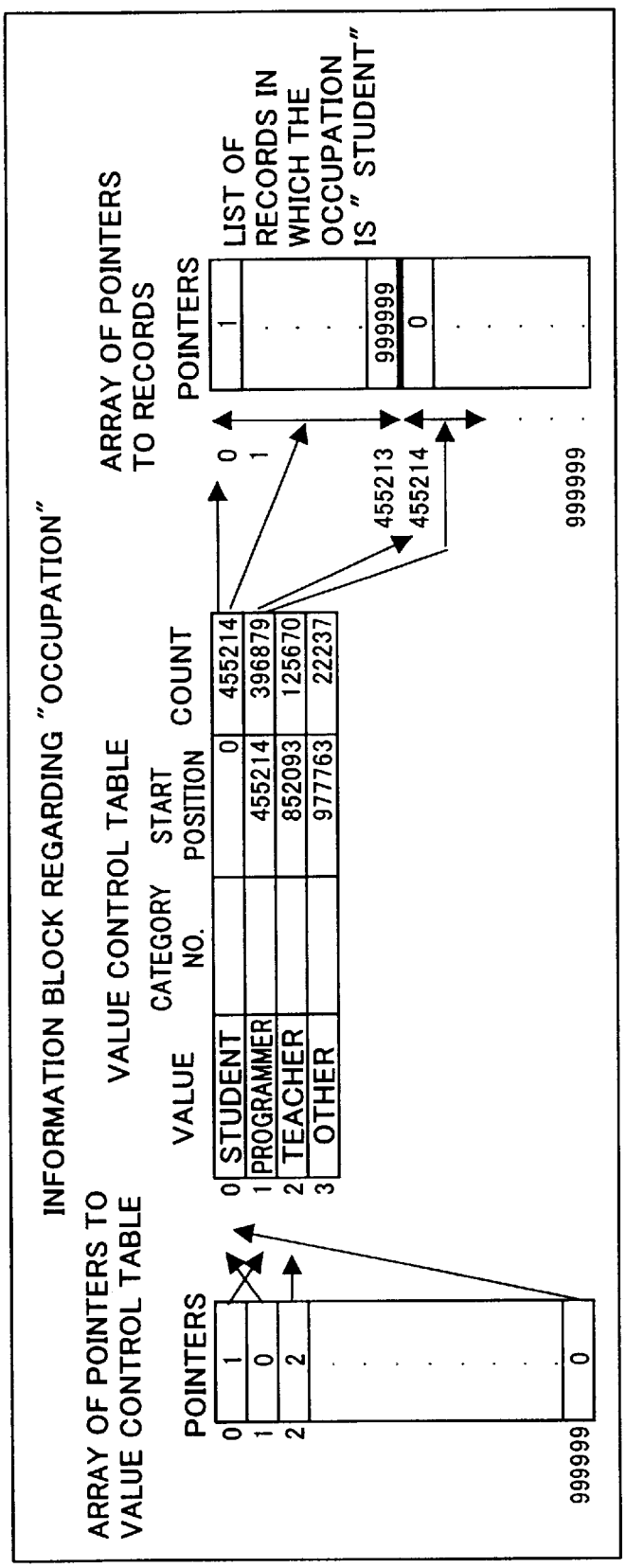
FIG. 8 is an explanatory diagram illustrating an information block regarding "sex" used in an embodiment of the present invention.

Next, the information block regarding "occupation" which is the second field shown in FIG. 8 is selected as the second specific information block (Step 122).

Figure 13:
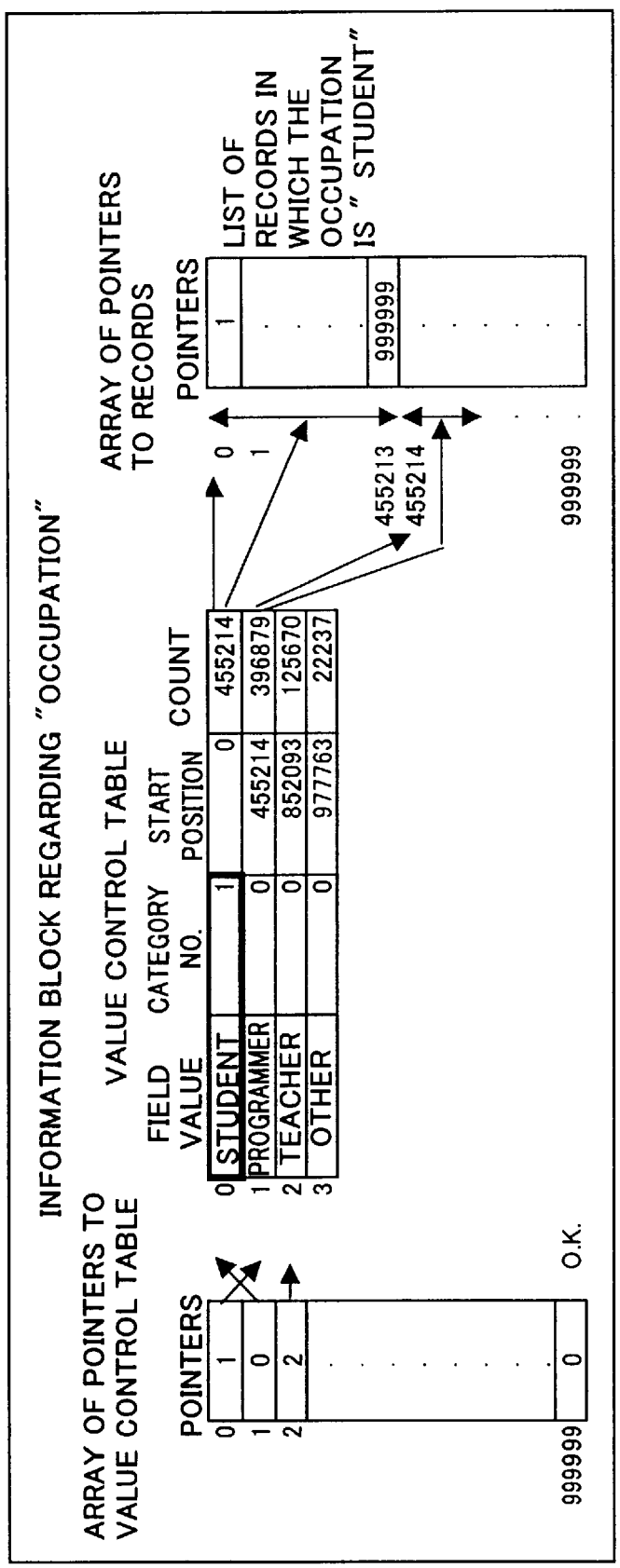
FIG. 13 is an explanatory diagram illustrating an information block according to Embodiment 2 of the present invention.

Next, set "1" in the category number of those rows in which the field value within the value control table of the specific information block matches "Student" which is the aforementioned search condition, and set "0" in the category number of other rows (Step 124). In the case of this example as shown in FIG. 13, "1" is set in the category number of those rows corresponding to a field value number of "0," and "0" is set in other rows.

Figure 14:
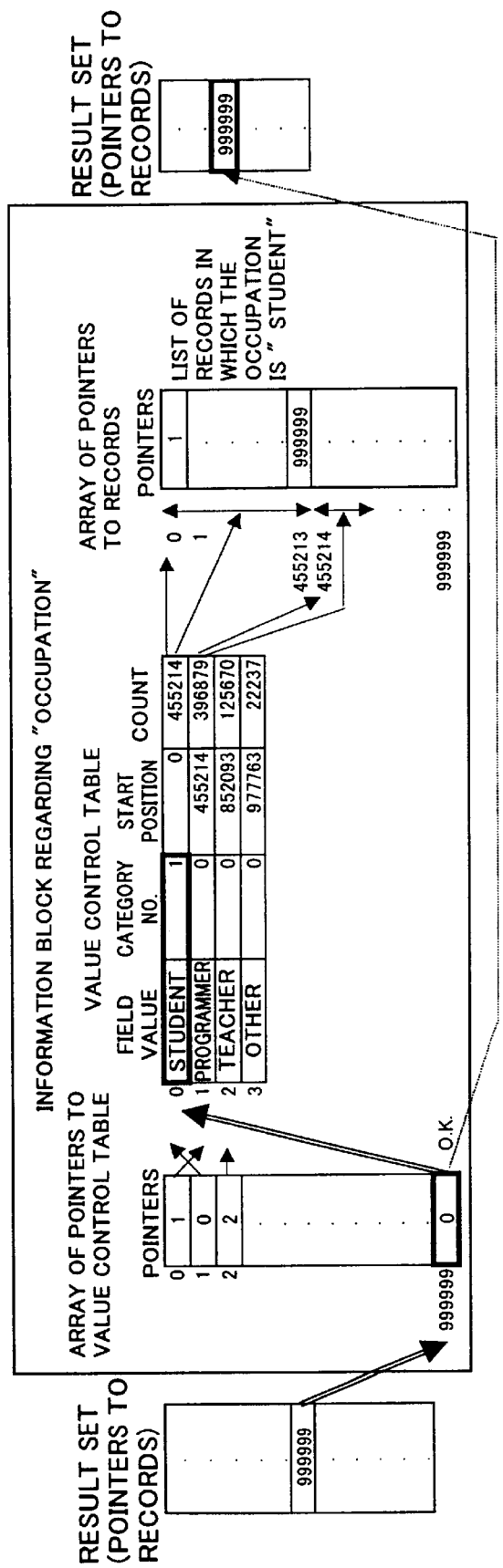
FIG. 14 is an explanatory diagram illustrating an information block according to Embodiment 2 of the present invention.

Next, sequentially extract from the result set for the first search condition those record numbers that represent pointers to records (Step 126). For example, as shown in FIG. 14, the record number "999999" is extracted.

Next, regarding the second specific information block, extract from the array of pointers to the value control table the field value numbers corresponding to the record number obtained with respect to the aforementioned first search condition (Step 128). For example, as shown in FIG. 14, the field value number of "0" corresponding to the record number of "999999" is extracted.

Next, a decision is made as to whether or not "1" is set in the category number corresponding to the field value number extracted with respect to the second specific information block (Step 130). For example, as shown in FIG. 14, one can see that "1" is set in the category number corresponding to the field value number of "0."

In the case that "1" is set in the category number, add pointers to records corresponding to locations within the array of pointers to the value control table where pointers indicating the field value number in question where "1" is set in the category number, for example, record numbers, to the final result set (Step 132). For example, as shown in FIG. 14, the record number "999999" is added to the final result set.

In the case that the category number is "0" then the final result set is not updated.

Figure 46A:
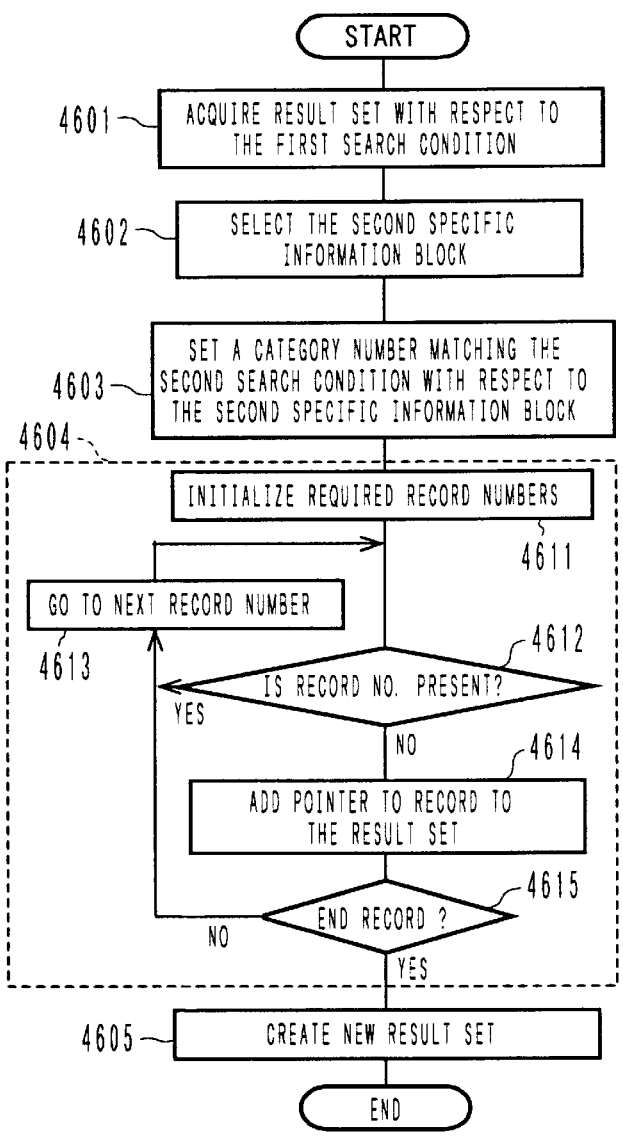
FIGS. 46A and 46B are flowcharts illustrating the OR search process on multiple fields as a variation of Embodiment 2 of the present invention.

Note that as would be easily understandable to a person skilled in the art, the aforementioned method of searching upon an AND of multiple fields can be applied to searches other than AND searches, so such variations as a method of searching upon an OR of multiple fields, for example, would be possible. FIG. 46A is a flowchart illustrating one example of the processing of an OR search process on multiple fields. This process is also implemented by the CPU 100 executing a program stored in a stipulated area. As shown in FIG. 46, first, after the result set is obtained with respect to the first search condition (Step 4601), an information block for the second search condition is selected (Step 4602). Next, regarding this information block, a category number is set with respect to the second search condition (Step 4603). While skipping record numbers contained in the result set from the first search condition, the array of pointers to the value control table is scanned sequentially with respect to the second specific information block (Step 4604). In more detail, the record numbers wherein the category number was made "1" regarding the second search condition, and a decision is made as to whether or not this record number was found within the result set according to the first search condition (Steps 4611–4615). If the number is not found within the result set according to the first search condition, that number is added to the result set (Step 4614). After this process is complete, a second result set is generated by combining the record numbers stored in the result set from the first search condition and the record numbers belonging to the field value numbers for which the category number is set with respect to the second information block (Step 4615), and this can be provided as output.

Figure 46B:
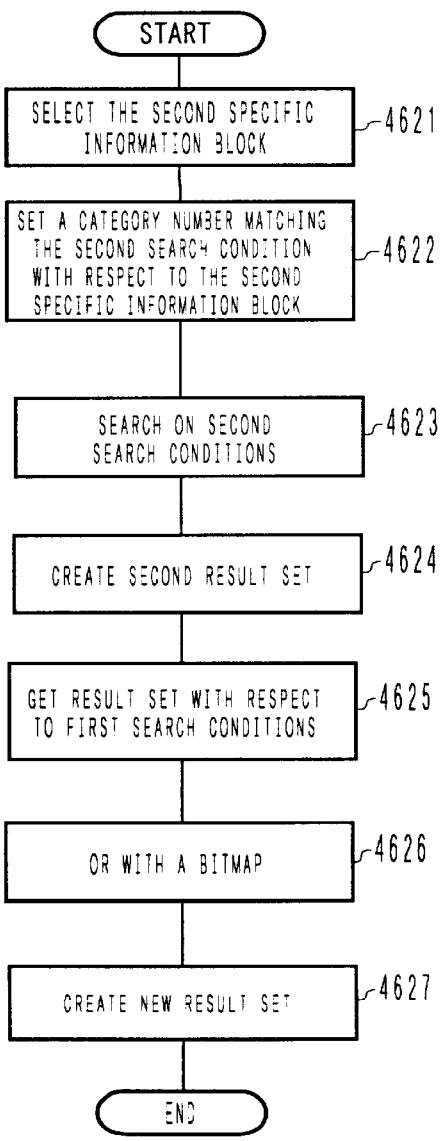

Alternately, the process shown in FIG. 46B may be executed. In this example, after the first result set is obtained based on the search conditions regarding the first specific information, independently thereof, a second result set is obtained based on the second search conditions regarding the second specific information (Steps 4621–4624), and an OR of the first result set and second result set (Step 4625) is performed using a bitmap (Step 4626), and a new result set is created based on this (Step 4627). Note that in the process of FIG. 46B, steps 4602 and 4603 correspond to Steps 4621 and 4622 of FIG. 46A, and step 4625 corresponds to Step 4601 of FIG. 46A.

Figure 15:
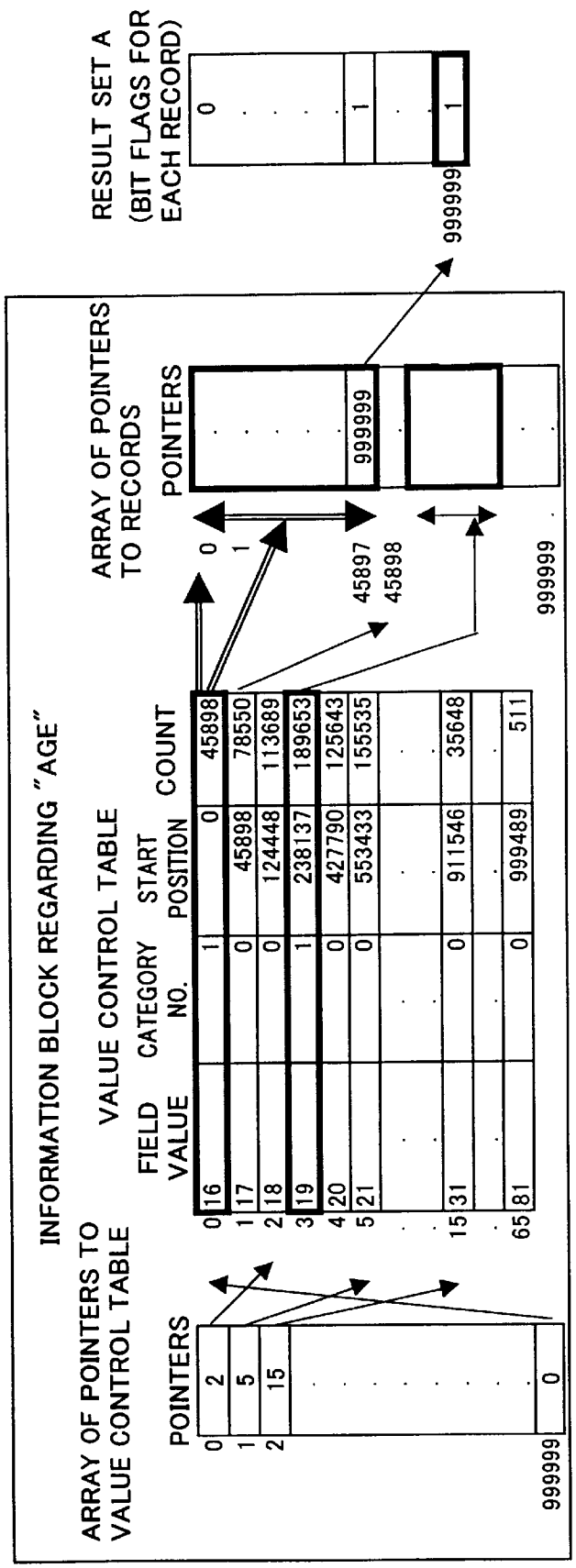
FIG. 15 is an explanatory diagram illustrating the method of multiple-field Boolean operation searching using bit flags according to Embodiment 3 of the present invention.
Figure 16:
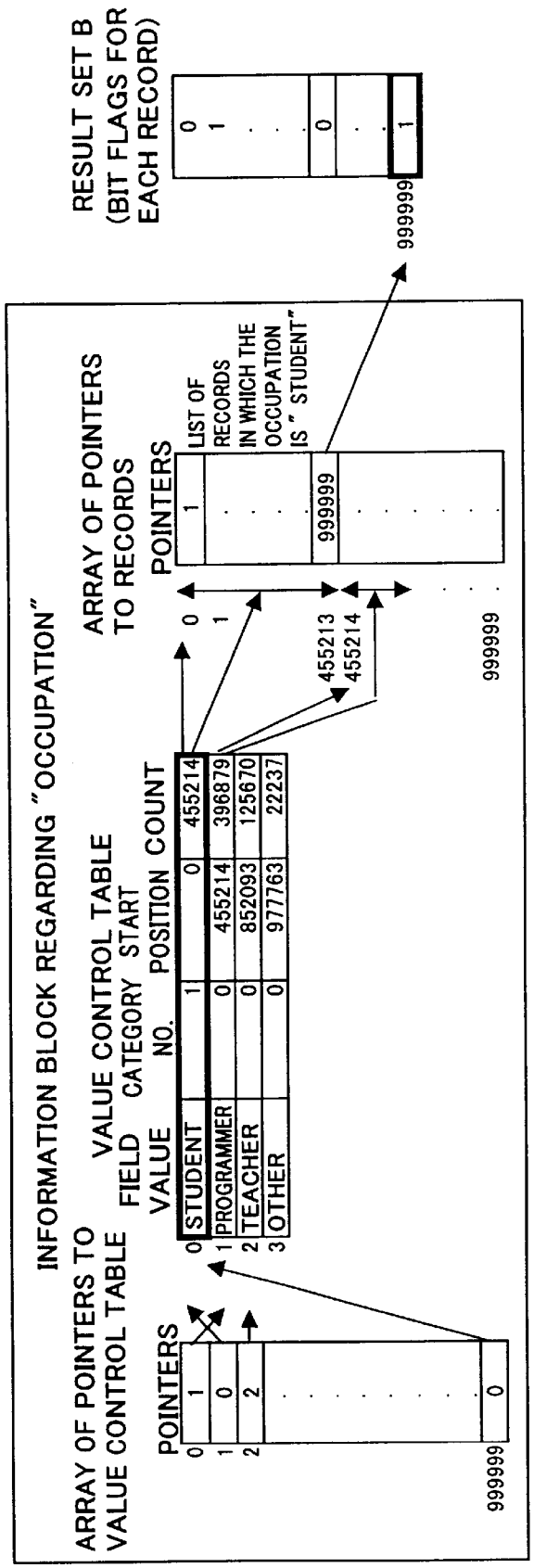
FIG. 16 is an explanatory diagram illustrating the method of multiple-field Boolean operation searching using bit flags according to Embodiment 3 of the present invention.

FIGS. 15 and 16 are explanatory diagrams illustrating the method of multiple-field Boolean operation searching using bit flags according to Embodiment 3 of the present invention, illustrating the case of performing a search under the same search conditions as the search according to the aforementioned Embodiment 2 of the present invention. Multiple-field Boolean operation searching using bit flags is defined to mean a search wherein the search conditions are expressed by a Boolean operation among search conditions for each field. In this case, as in Embodiment 1, a result set obtained by means of a search on a single field should not be constructed of an array of record numbers but rather it is more advantageous for the result set to be constructed in the form of bit flags. Namely, in accordance with the process illustrated in FIG. 47, the result set is generated by allocating one bit each to all of the records, and a bit value of "1" or "0" expresses whether or not each record matches the search conditions. In more detail, in the same manner as in the other embodiments, an information block containing field values pertaining to the search condition is selected (Step 4701), and then the category number is set to "1" on rows that match the search conditions (Step 4702). Next, the corresponding category number is accessed for each record and the bit value to be stored in the result set is determined (Steps 4703–4707). By forming the result set in this manner, the size of the result set for each field corresponds to the number of records in the table-format data, so the size of the result set is identical for each field, and as a result, it is simple to perform Boolean operations, e.g., AND, OR and XOR, on elements in the result set.

In this example, the result set A shown in FIG. 15 and the result set B shown in FIG. 16 are joined under AND conditions to obtain the desired search result set in bit flag format. In addition, the search result set in bit flag format thus obtained can be converted to a result set in the format of an array of pointers to records, and thus combined with the aforementioned method of searching on multiple fields according to Embodiment 2 of the present invention.

Figure 6:
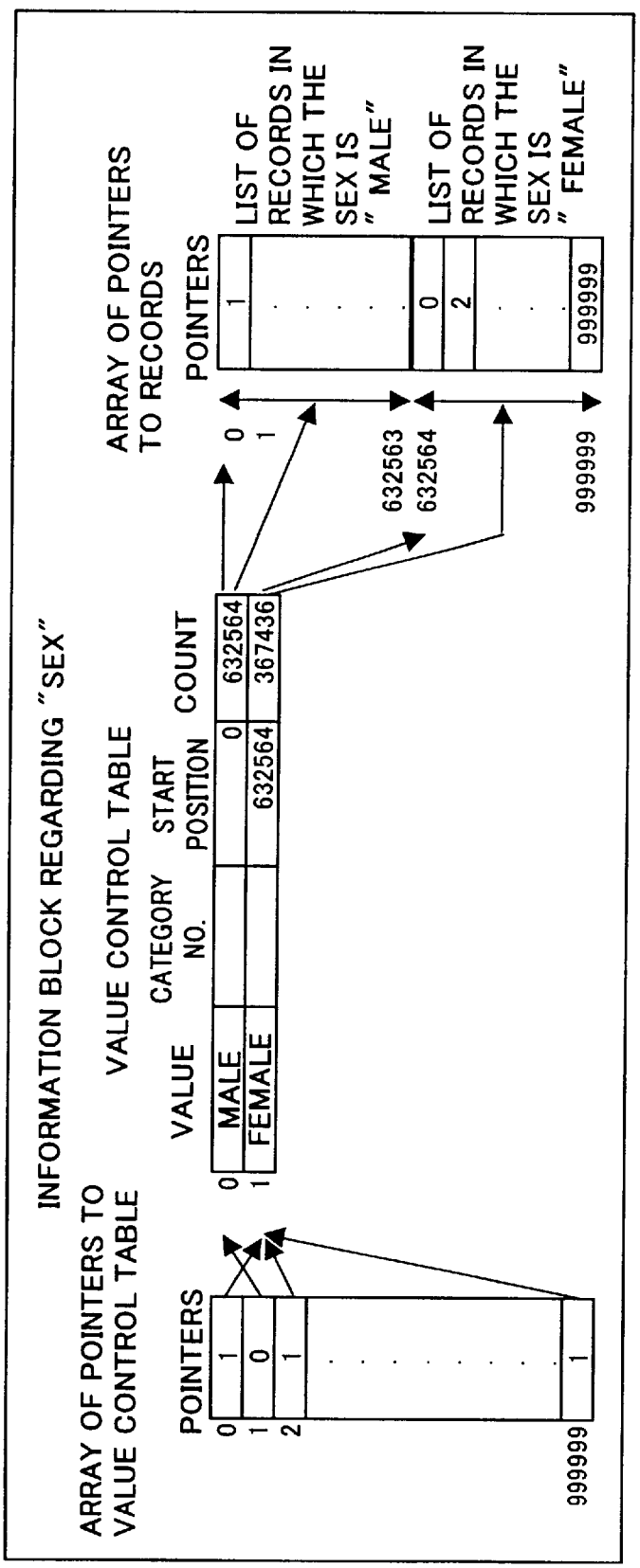
FIG. 6 is an explanatory diagram illustrating an information block regarding "sex" used in an embodiment of the present invention.

Next, we shall add an explanation of the method of tabulating various types of table-format data according to the present invention. The tabulating method according to Embodiment 4 of the present invention comprises counting the number of records that have a specific field value in a specific field. In Embodiment 4 of the present invention, we shall consider the case of counting the number of records that have the field value of "Male" or that have the field value of "Female" in the "sex" field. As illustrated in FIG. 6, according to a preferred embodiment of the present invention, the information block regarding "sex" contains a count of the records that contain the field value of "Male" (its value being "632564") and a count of the records that contain the field value of "Female" (its value being "367436"), so a simple tabulation of the number of records can be obtained immediately by accessing the array of counts within the information block.

Figure 48:
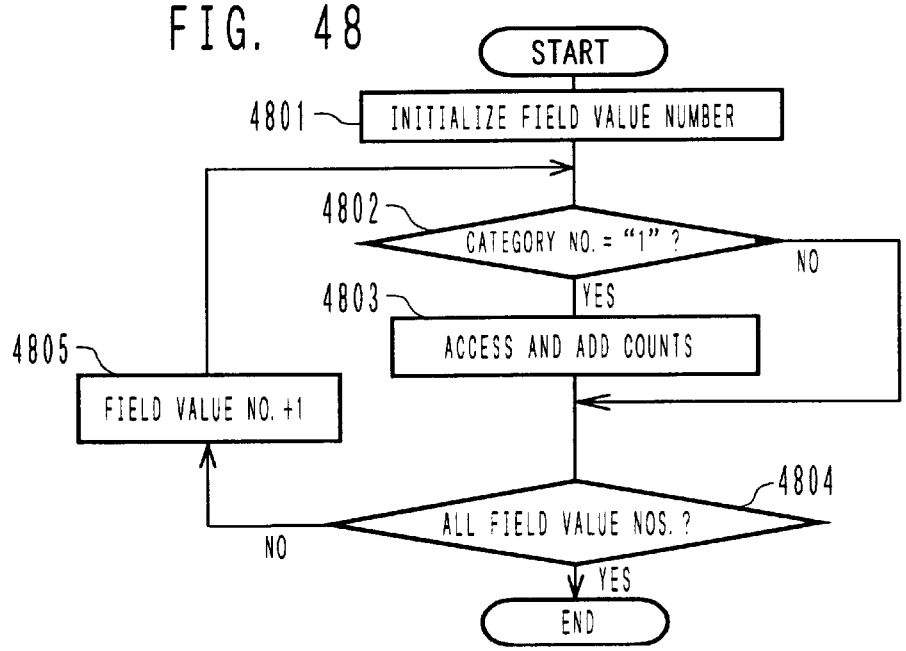
FIG. 48 is a flowchart illustrating the tabulating process according to Embodiment 4 of the present invention.

In addition, by combining the category numbers described regarding the method of searching on single fields with the method of tabulating according to the aforementioned Embodiment 4 of the present invention, counting the number of records can be performed easily even in the case of more complicated conditions. For example, in the method of searching for records in which the value of the "age" field is "16" or "19" described in Embodiment 1 of the present invention, it is possible to tabulate the counts corresponding to field value numbers in which "1" is set as the category number, and thus tabulate the number of records matching the search conditions. In this manner, by using the category number, even in the case that the value control table is of a large size or in the case that complex conditions are given, the count can be found efficiently. More generally, as shown in FIG. 48, it is sufficient to find the field value numbers in which "1" is set in the category number (Step 4802) and then add the corresponding counts (Step 4803).

Figure 17:
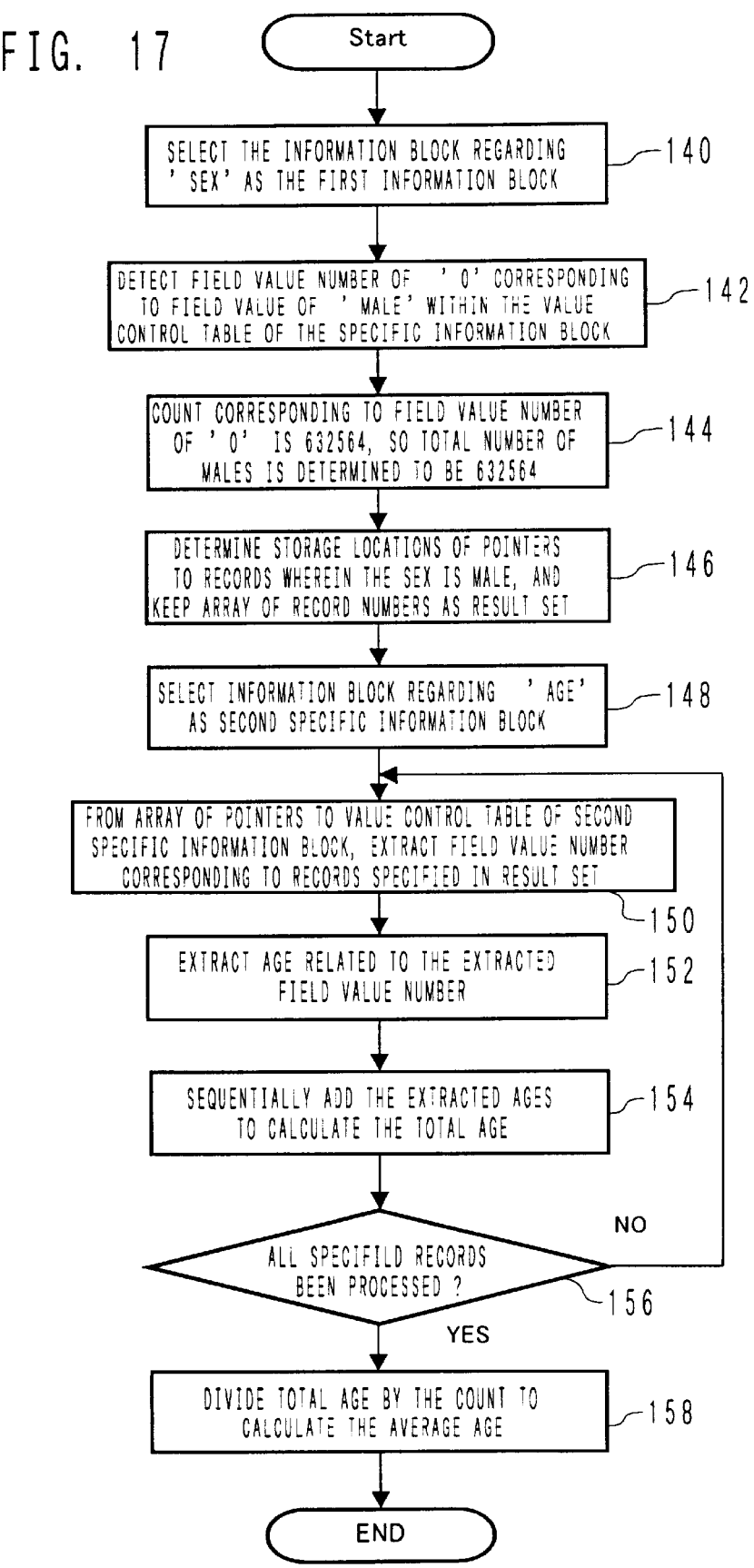
FIG. 17 is a flowchart of the operation of the method of tabulating according to Embodiment 5 of the present invention.

Next, we shall provide additional explanation of Embodiment 5 of the present invention. In this embodiment, we shall calculate the average age of the "Males." The average age can be calculated by the formula (total "age" of the males)/(count of males), and also the count of males can be obtained by the tabulation method described in the aforementioned Embodiment 4 of the present invention. Therefore, in this embodiment, it comes down to the problem of finding the total "age" of the males. FIG. 17 is a flowchart illustrating the operation of Embodiment 5 of the present invention. In the same manner as in other embodiments, this process is also implemented by the CPU 100 executing a program stored in a stipulated area.

First, the information block regarding "sex" as shown in FIG. 6 is selected as the first information block (Step 140), and the field value numbers of "0" corresponding to the field value of "Male" are detected from within the value control table of the specific information block (Step 142). Next, the count corresponding to the field value number of "0" is "632564" so the total number of males is determined to be 632564, and also, the start position corresponding to the field value number of "0" is "0" so the pointers to records wherein the sex is male are determined to be stored in the locations starting from the beginning until the 632564$^{th}$ location, and thus a list of the pointers to these records, namely, an array of record numbers is kept as the result set (Step 146).

Next, the information block regarding "age" illustrated in FIG. 7 is selected as the second specific information block (Step 148) and from the array of pointers to the value control table of the second specific information block, the field value number corresponding to the record specified in the result set regarding the first specific information block is extracted (Step 150), and the field value related to the extracted field value number, namely the "age" is extracted (Step 152). Finally, find the total age by sequentially adding the extracted "age" values (Step 154), and repeat steps 150, 152 and 154 until all of the specified records in the aforementioned result set are processed (Step 156). The total age thus obtained is divided by the count to find the average age (Step 158).

Figure 18:
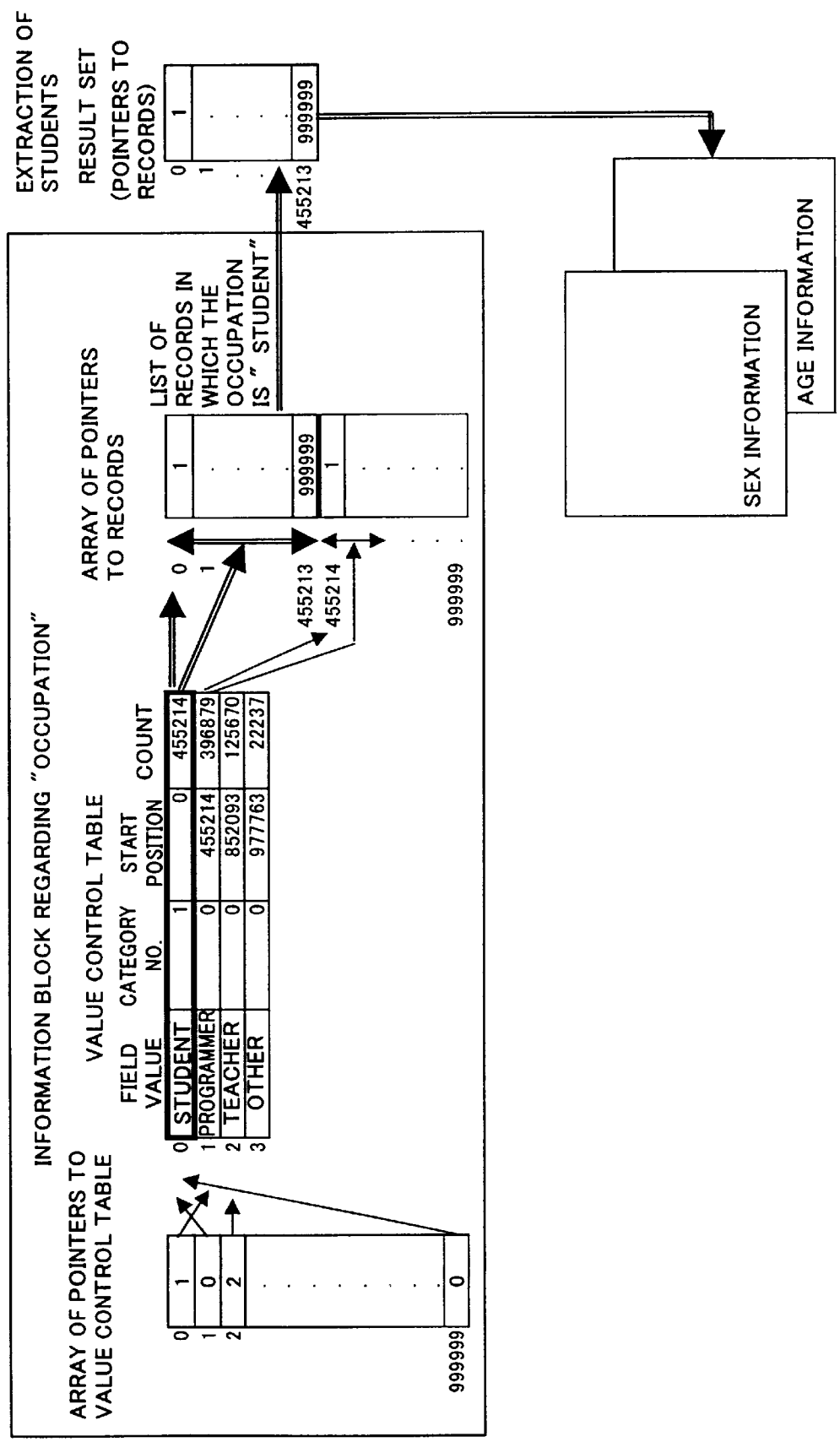
FIG. 18 is a conceptual explanatory diagram of Embodiment 6 of the present invention.
Figure 19:
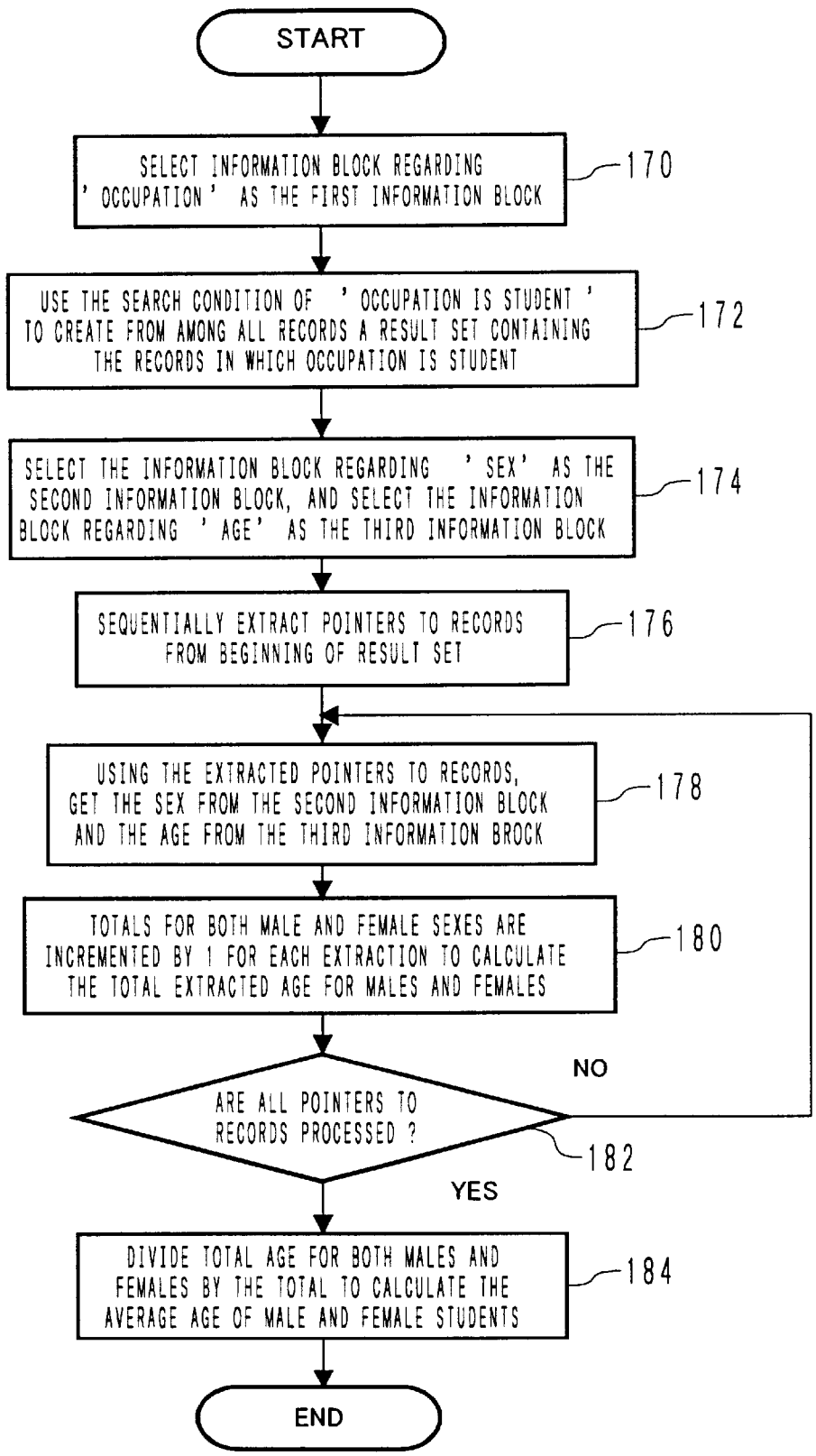
FIG. 19 is a flowchart of the operation of Embodiment 6 of the present invention.

Next, we shall add an explanation of Embodiment 6 of the present invention. In this example, we find the average age of the male students and the average age of female students. FIG. 18 is a conceptual explanatory diagram of Embodiment 6 of the present invention, while FIG. 19 is a flowchart of the operation of Embodiment 6 of the present invention.

In this embodiment, the tabulation is performed by first selecting the information block regarding "occupation" as the first information block (Step 170), and using the search condition of "occupation is student" to create from among all records a result set containing the records wherein the "occupation is student" (Step 172).

Next, select the information block regarding "sex" as the second information block and also select the information block regarding "age" as the third information block (Step 174), and sequentially extract pointers to records from the beginning of the result set (Step 176).

Using the extracted pointers to records, the array of pointers to the value control table of the second information block is accessed to get the sex corresponding to the extracted pointers to records, and also, the array of pointers to the value control table of the third information block is accessed to extract the age corresponding to the extracted pointers to records (Step 178). Totals for both male and female sexes are incremented by 1 for each extraction, to calculate the total extracted age for both males and females (Step 180).

A check is made as to whether or not all pointers to records of the result set have been processed (Step 182), and if all pointers to records have been processed, the average ages for both male and female students is calculated by dividing the total ages for males and females by the total number (Step 184).

Figure 20:
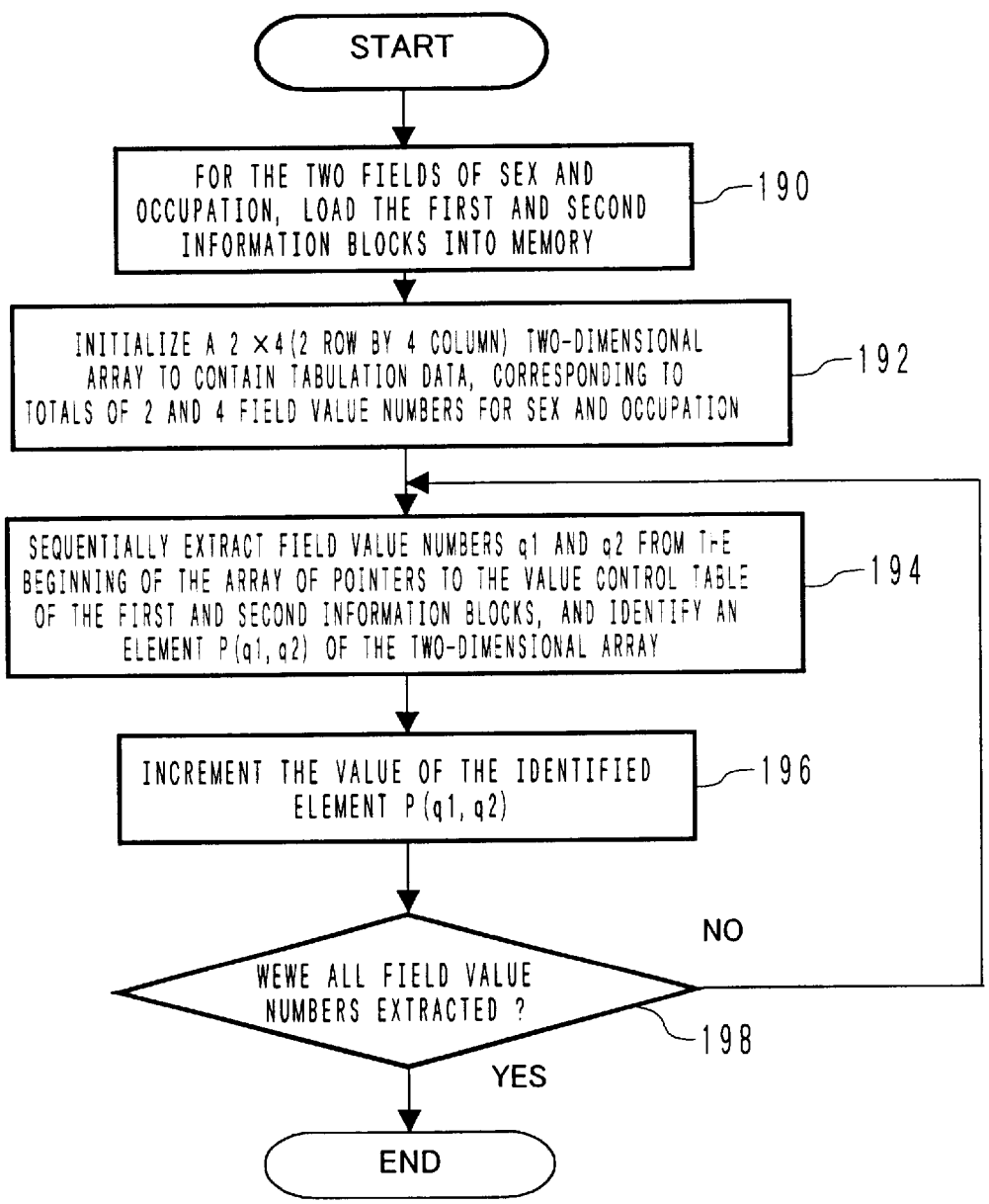
FIG. 20 is a flowchart of the operation of cross-tabulating according to Embodiment 6 of the present invention.

Next, we shall add an explanation of Embodiment 7 of the present invention made with reference to the flowchart of operation illustrated in FIG. 20. In this embodiment, the so-called cross-tabulation is implemented. Note that the processing program shown in FIG. 20 is also read and executed by the CPU 100. In this embodiment, we shall consider the case of finding counts by sex/by occupation taking the entire set of records regarding the table-format data of FIG. 1.

Regarding the two fields of "sex" and "occupation" used in tabulation, the respective value control tables and the field value number specifying information array, namely, the array of pointers to the value control table, which express two pieces of individual field information, namely the first and second information blocks are kept in a storage device (Step 190). The memory device may be implemented in the form of, for example, memory, virtual storage, memory-mapped file or the like.

Regarding the first information block regarding sex, as shown in FIG. 6, the total number of field value numbers for sex is "2," and regarding the second information block regarding occupation, as shown in FIG. 8, one can see that the total number of field value numbers for occupation is "4." Thus, an initialized 2×4 (2 row by 4 column) two-dimensional array is generated as the space to store tabulation data (Step 192).

Regarding the first and second information blocks, the field value numbers $q_1$ and $q_2$, respectively, are extracted sequentially from the beginning of the array of pointers to the value control table, and these are used to identify a single element $P(q_1, q_2)$ in the two-dimensional array (Step 194), and then the value of the identified element $P(q_1, q_2)$ is incremented by 1 (Step 196).

A check is made as to whether or not all field value numbers (namely, a number of field value numbers equal to the total number of records) have been extracted from the array of pointers to the value control table (Step 198), and if field value numbers still remain, then return to Step 194, but if not, terminate the tabulation process. This completes the two-dimensional cross table.

Figure 49:
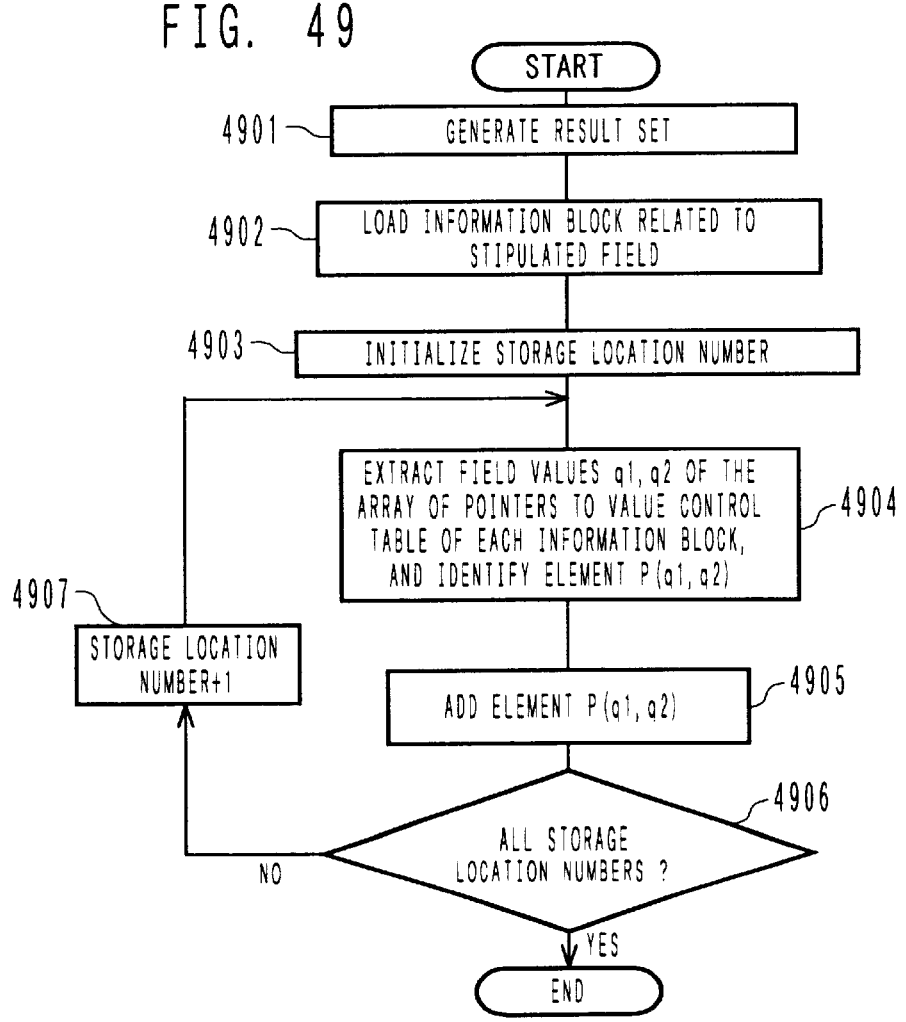
FIG. 49 is a flowchart illustrating the tabulating process according to Embodiment 7 of the present invention.

In the aforementioned Embodiment 7 of the present invention, tabulation is performed on the entire set of records in the table-format data of FIG. 1, but it is also possible to perform the same type of tabulation on a partial set of records, for example, tabulating a count of 16 year olds by sex/occupation. In order to do this, a single-field search is first performed using the age of 16 as the search condition, and then the identifying information for records that match an age of 16 is acquired and kept. Next, as described previously with regard to searches on an AND of multiple fields, it is sufficient to take the records contained in this result set, namely the partial set of records as the object of the operation, and sequentially extract record identifying information contained in the result set starting from the beginning, and then extract the field value numbers corresponding to the record identifying information from the array of pointers to the value control table, and take the field value numbers thus obtained as the row and column coordinates of a two-dimensional array while incrementing the count of element values by "1." Namely, in this process, as shown in FIG. 49, a process roughly equivalent to that shown in FIG. 9 is executed to generate a result set for containing pointers to records (Step 4901). Next, this result set is used to execute a process roughly equivalent to that of FIG. 20. Here, first, in the same manner as in FIG. 20, the first and second information blocks regarding the fields used in tabulation (Step 4902), and next, an initialized two-dimensional array is generated (Step 4903).

Thereafter, a number that indicates the storage position of pointers in the result set (hereinafter referred to as the "storage position number" depending on the case) is initialized (Step 4904). In accordance with the program, regarding the various storage position numbers, the CPU 100 extracts an array of pointers corresponding to the value control table in the first and second information block and identifies an element $P(q_1, q_2)$ within the two-dimensional (Step 4905), and next, the $P(q_1, q_2)$ is incremented (Step 4906). By executing this process with respect to all storage position numbers (namely, by processing the aforementioned field value numbers within the result set), it is possible to achieve cross-tabulation regarding a partial set obtained by searching or the like.

Next, we shall add an explanation of Embodiment 8 of the present invention. In this example, cross-tabulation is implemented in the situation wherein the field values of the field are divided into several categories, by counting the counts for each category of field value. For example, referring to the information block regarding "occupation" shown in FIG. 8, one sees that the four field values of "student," "programmer," "teacher" and "other" are registered for "occupation." As the categories based on these field values, one can envision the case of recategorization into the three types of "income earner," "non-income earner" and "unknown." In this example, in this situation, a new category of "presence of income" is created to create a cross-tabulation of counts depending on sex/presence of income.

Figure 21:
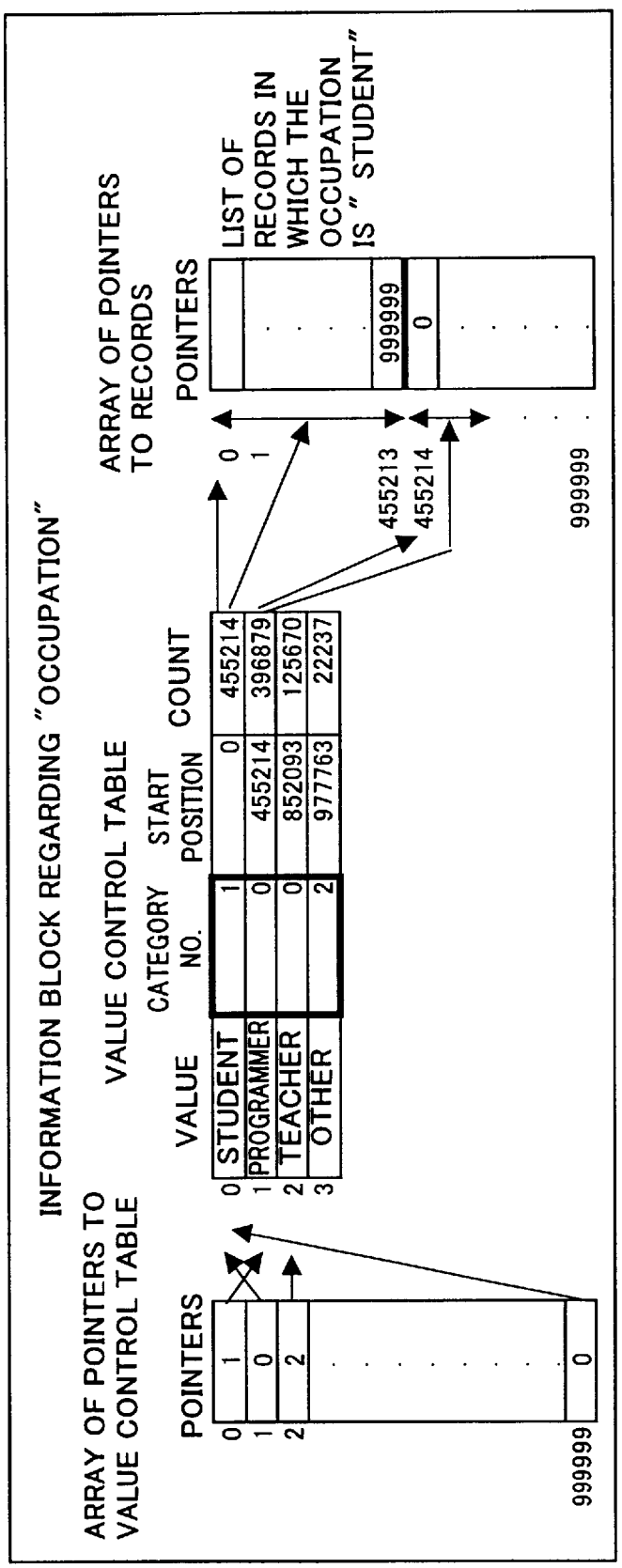
FIG. 21 is an explanatory diagram illustrating an information block according to Embodiment 8 of the present invention.

The information block regarding "occupation" shown in FIG. 21 includes a value control table wherein category numbers are applied to each field value number based on the "presence of income" in particular. In this example, students are assigned a category number of "1" (non-income earner), while programmers and students are assigned a category number of "0" (income earner), and "other" is assigned a category number of "2" (unknown).

As a general rule, the cross-tabulation in Embodiment 8 of the present invention has a process sequence roughly the same as that of the cross-tabulation in Embodiment 7, but it differs in the point that it uses as the coordinates that specify the element of the two-dimensional array to store the tabulation data, the field value number of the first information block regarding sex and the field value number of the second information block regarding occupation.

Since any of the field value numbers or category numbers can be used as the coordinates of elements in the two-dimensional array, in Embodiment 8 of the present invention, with respect to the first and second information blocks, the respective field value numbers stored in each array of pointers to the value control table are extracted sequentially, and the coordinates of the element P in the two-dimensional array is identified based on either the field value number itself extracted from the array of pointers to the value control table or the category number stored in the value control table corresponding to the field value number.

In the example described above, the information block on "sex" is used as the first information block, and the information block on "occupation" is used as the second information block (see Step 190 of FIG. 20). In the next processing step (Step 191), since the information block on "sex" contains two field value numbers and the information block on "occupation" contains three category numbers, an initialized 2×3 (2 row by 3 column) two-dimensional array is generated.

In the subsequent processing steps also, the field value number $q_1$ of the first block and the category number $q_2$ of the second block are extracted, so these are used to identify a single element $P(q_1, q_2)$ and then the value of the element P is incremented (see Steps 194 and 196).

While the cross-tabulation according to Embodiments 7 and 8 described above is particularly tabulation in the form of finding counts, but note that the present invention may also be expanded to cross-tabulation wherein an average age is found depending on multiple fields (e.g., by sex/by occupation). In Embodiment 9, cross-tabulation of the aforementioned type is performed.

Figure 22:
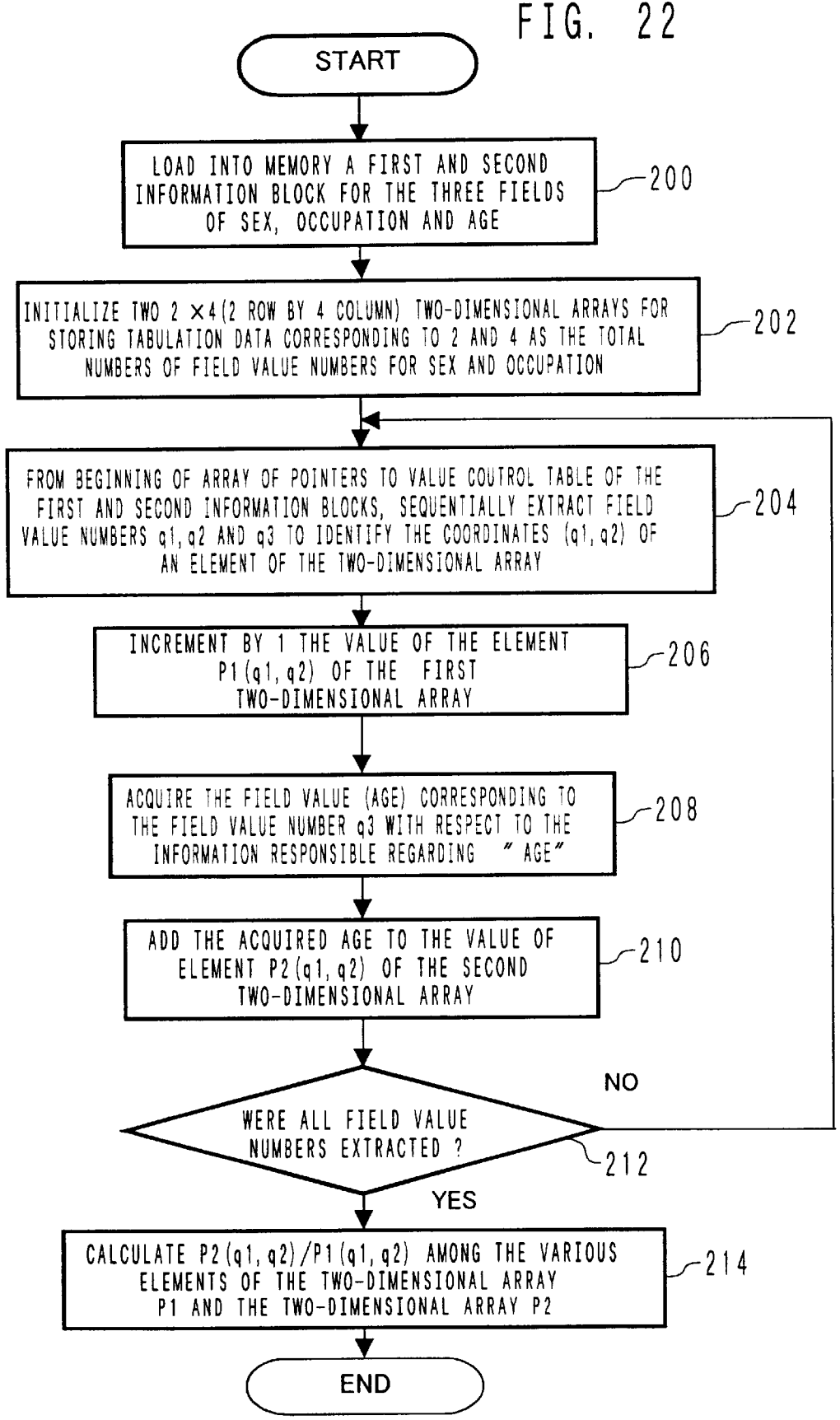
FIG. 22 is a flowchart of the operation of cross-tabulating according to Embodiment 9 of the present invention.

In order for the tabulation method of a type wherein counts are found by incrementing the elements of a two-dimensional array one at a time, as in the aforementioned Embodiment 7 of the present invention, to be expanded to cross-tabulation of a type that requires operations other than the totaling of counts such as finding an average age, the variation shown in the operation flow chart in FIG. 22 is adopted.

To wit, according to Embodiment 9 of the present invention, 2 two-dimensional arrays are used for tabulation, so regarding the first two-dimensional array, the counts by sex/by occupation are counted in the same manner as the aforementioned Embodiment 7, and regarding the second two-dimensional array, the total age by sex/by occupation are calculated.

Here follows a more detailed explanation.

First, a first, second and third information block for the three fields of sex, occupation and age are loaded into the storage device (Step 200).

Corresponding to the total number of field value numbers for sex and occupation of "2" and "4" respectively, an initialized 2×4 (2 row by 4 column) two-dimensional array for storing tabulation data is created (Step 202).

Starting from the beginning of the array of pointers to the value control table of the first and second information blocks, the field value numbers $q_1$, $q_2$ and $q_3$ are extracted sequentially to identify the coordinates ($q_1$, $q_2$) of an element of the two-dimensional array (Step 204) and then the value of the element $P_1(q_1, q_2)$ of the first two-dimensional array thus identified is incremented by 1 each (Steps 206).

Moreover, with respect to the information block regarding "age," the field value corresponding to the field value number of $q_3$ (namely, the age) is acquired (Step 208), and the acquired age is added to the element $P_2(q_1, q_2)$ of the identified second two-dimensional array (Step 210).

After this processing, a check is made as to whether or not all subject records have been processed (Step 212), and if not, then control returns to Step 204, but if so, then the operation $P_2(q_1, q_2)/P_1(q_1, q_2)$ is performed among the various elements of two-dimensional array $P_1$ and two-dimensional array $P_2$ (Step 206). Thereby, the average age by sex/by occupation is obtained and a cross-tabulation table of averages is created.

FIG. 23A is a conceptual explanatory diagram of a cross-tabulation table obtained in the aforementioned Embodiment 7 of the present invention. In this manner, in the aforementioned Embodiment 7, counts for all combinations of sex/occupation are tabulated. However, as shown in FIG. 23B, among the by sex/by occupation categories, there may be cases wherein one wishes to know in particular the count of only those persons having a sex of female and occupation of student. By means of the present invention, the count in this case is obtained by finding the size of the result set from a search of an AND of the multiple fields of "female" AND "student."

Similarly, in the aforementioned Embodiment 9 of the present invention, a cross-tabulation table of the average age is found for all combinations of sex/occupation, but it is also possible to find in particular the average age of only those persons having a sex of female and occupation of student. In this case, the count is found from the size of the result set from a search of an AND of the multiple fields of "female" AND "student," and the total of ages is found by adding the ages belonging to records specified by the identifying information for records contained in the result set, and by calculating the fraction (total of ages)/(count), it is possible to find the desired value (e.g., the average age) regarding a specific cell in the cross-tabulation table for average age.

Figure 25:
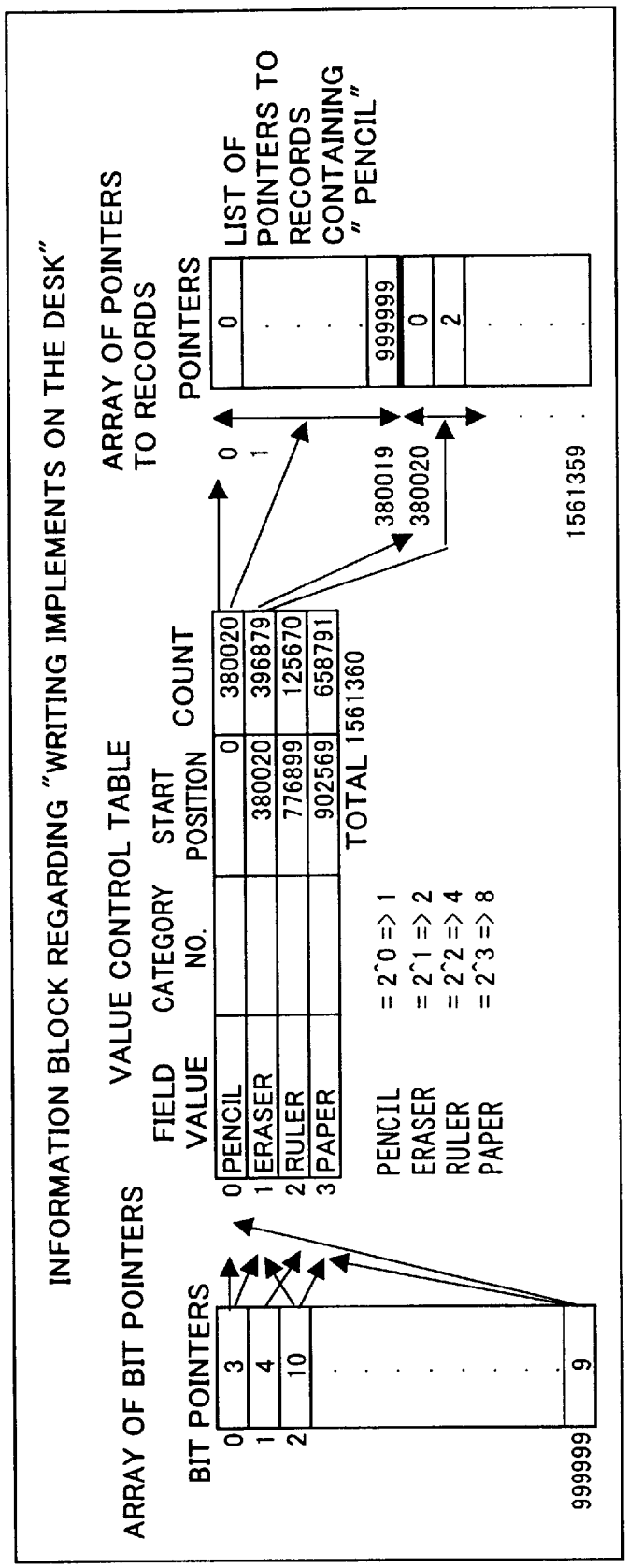
FIG. 25 is an explanatory diagram illustrating an information block of a type compatible with multi-answer type fields according to Embodiment 10 of the present invention.

Next, we shall add an explanation of Embodiment 10 of the present invention. FIG. 24 is a diagram illustrating multi-answer type fields, while FIG. 25 is an explanatory diagram of an information block of a type compatible with multi-answer type fields according to Embodiment 10 of the present invention. "Multi-answer" refers to the situation wherein, for example, when answers are obtained to the question "What kinds of writing implements are now on the table?" then multiple answers such as "pencil, eraser" or "paper, pencil" are obtained from the same person. To wit, in the case of multi-answer, it is possible to specify multiple field values for a single field of a single record. FIG. 24 shows a list of the responses to the aforementioned question obtained from 1 million people, given as is.

In order to process such data, by means of Embodiment 10 of the present invention, as shown in FIG. 25, the array of pointers to the value control table of the information block differs from the array of field value numbers itself as described above, but rather 1 bit is allocated to each field value number in the pointers in the array. Therefore, it is possible to indicate whether or not a record specifies that field value number by means of turning bits on/off (namely, a binary number). Thereby, it is possible to specify multiple field values contained in a single field in a single record. For example, in FIG. 25, the pointers (bit pointers) within the array of pointers are 4-bit in size, and when the highest bit is on (namely, "1"), this means that the response of "paper" is included, when the second bit is on the response of "ruler" is included, and when the third bit is on this means the response of "eraser" is included. Moreover, when the lowest bit is on, this means the response of "pencil" is included.

The pointer corresponding to record number "0" has the value "3." This can be considered to be "$2^1+2^0$." Therefore, this can be understood as the responses of "pencil" and "eraser" being included corresponding to this record number. In addition, the pointers corresponding to record number "1" and record number "2" have the values "4" and "10," respectively, and these can be considered to be "$2^2$" and "$2^3+2^1$." Therefore, one can thus know that the responses corresponding to these record numbers include "ruler" along with "eraser" and "paper," respectively.

By means of this embodiment, each bit in the pointer value is given meaning so a plurality of field value numbers can be indicated. Therefore, even in the case in which a record has a plurality of field values, this can be expressed by means of the pointer value.

Note that the present invention has an advantage in that it can be easily adapted to a multi-answer situation by simply modifying the constitution of one portion of the information block. In fact, an information block thus modified can be used to replace the information blocks adopted in the various aforementioned embodiments of the present invention.

Next, we shall add an explanation of Embodiment 11 of the present invention. FIG. 26 is an explanatory diagram illustrating the method of handling blanks, error values and other special values that occur during tabulation processing, according to Embodiment 11 of the present invention. As shown in this figure, in Embodiment 11, cross-tabulation is executed by taking blanks to be one category. When handling actual data, there may be cases in which blanks or log(−1) or other mathematical errors appear. With the present invention, even if such special values (blanks, errors, etc.) are present, it has the advantage in that they are registered in the value control table as field values, and the registered special values can be used as is as categories for searches or tabulation.

Figure 27:
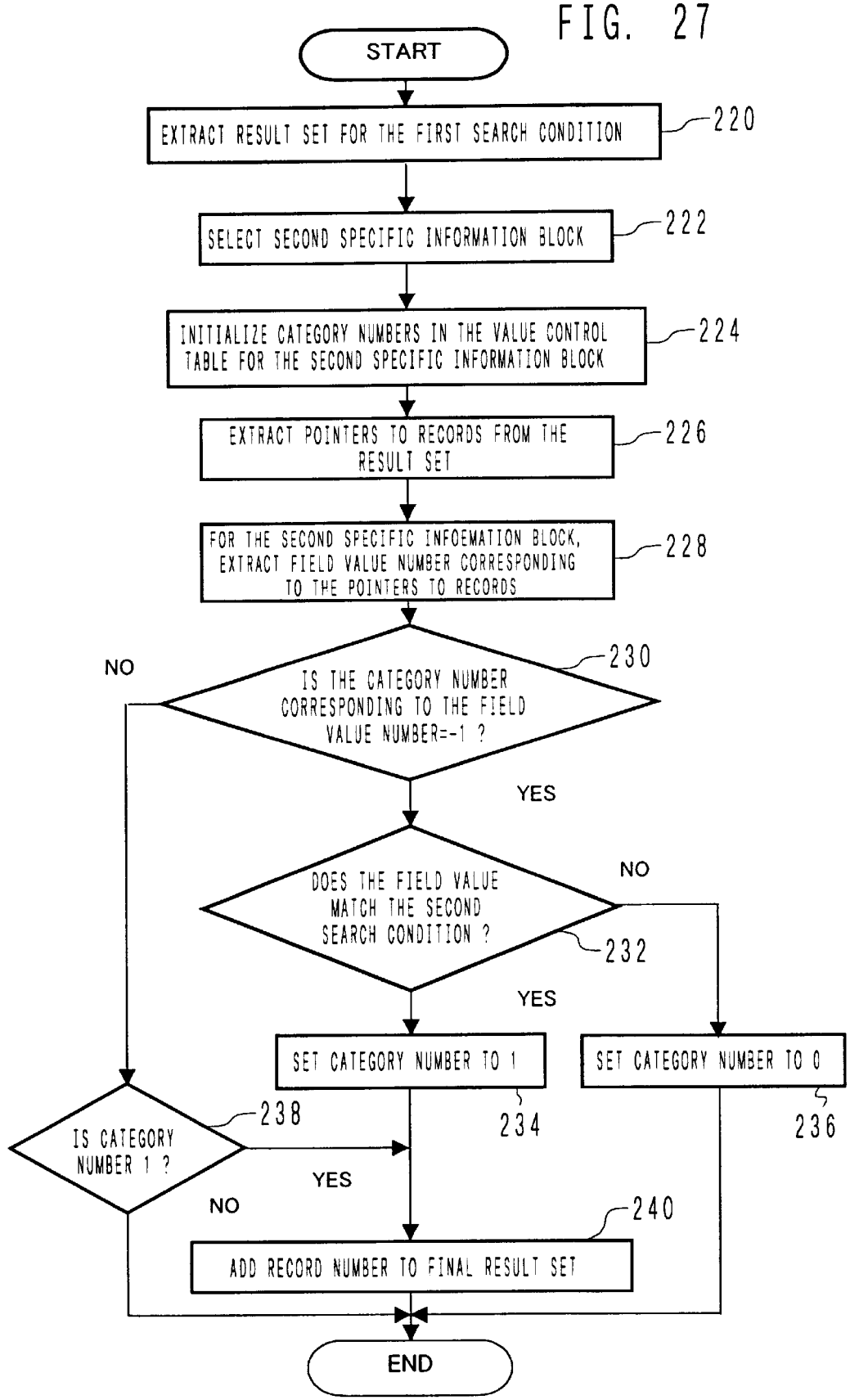
FIG. 27 is a flowchart of the operation of the method of searching upon multiple fields according to Embodiment 12 of the present invention.

Next, we shall add an explanation of Embodiment 12 of the present invention. We shall describe delay evaluation using the flowchart of the operation of the method of searching upon multiple fields according to Embodiment 12 of the present invention shown in FIG. 27. In this embodiment, in the same manner as in Embodiment 2 of the present invention, we shall consider the case of obtaining a set of records that satisfy both the first search condition of the "age" being "16" or "19" and the second search condition of the "occupation" being "Student."

In the aforementioned Embodiment 2 of the present invention, the category numbers for all records are set in advance for all records (Step 124 of FIG. 12), but in the case of Embodiment 12, the setting of the category numbers is performed for only the category numbers corresponding to the field value numbers actually accessed based on the result set from the search on the first search condition.

As described previously, from the first specific information block which is the information block regarding "age" which is the first field, a result set of records wherein the "age" is "16" or "19" is obtained according to Embodiment 1 of the present invention (Step 220).

Next, the second specific information block which is the information block regarding "occupation" which is the second field shown in FIG. 8 is selected (Step 222), and the value of all category numbers in the value control table of the second specific information block is initialized to "−1" for example (Step 224).

Next, from the result set regarding the first search condition, record numbers that represent pointers to records are extracted sequentially (Step 226). In the case of this example, as shown in FIG. 14, the record number "999999" is extracted, for example.

Next, regarding the second specific information block, extract from the array of pointers to the value control table the field value number corresponding to the record number obtained under for the aforementioned first search condition (Step 228). In the case of this example, as shown in FIG. 14, the field value number of "0" corresponding to the record number of "999999" is extracted, for example.

Next, a check is made as to whether the value of the category number corresponding to the field value number extracted with respect to the second specific information block is "−1" or not (Step 230).

In the case that the category number is "−1," this means that the category number has not yet been set for that field value number, so a decision is made as to whether or not the field value corresponding to this field value number matches the aforementioned second search condition (Step 232), and if it matches then the category number is set to "1" (Step 234), but if it does not match, then the category number is set to "0" (Step 236).

In the case that the category number is not "−1," then a decision is made as to whether or not the value of the category number corresponding to the field value number extracted above is set to "1" (Step 238). If the value of the category number is set to "1," then add to the final result set a pointer to the record, e.g. the record number, corresponding to the location within the array of pointers to the value control table at which is stored a pointer which indicates the field value number in which the category number is set to "1" (Step 240). In this example, as shown in FIG. 14, record number "999999" for example, is added to the final result set. If the category number is "0" then the final result set is not updated.

The delay evaluation as shown in the aforementioned Embodiment 12 is effective in the following types of cases. For example, consider the case in which a customer database of 1 million people exists and one wishes to implement a telephone survey, and thus extract a sample of 100 people. For example, when the people are narrowed down to those who satisfy stipulated conditions (sex, age, occupation, etc.) one can come up with 10,000 people, and then in order to ensure randomness, a search is performed based on the numbers (e.g., "12") at the end of the telephone number.

In this case, in Embodiment 12, first the elements of the "category number array" are filled with "−1" to evaluate only the aforementioned set of 10,000 people. Namely, for the result set of a size of 10,000 people, the elements of the category number array are accessed and if the element is "−1" then and only then the telephone number is accessed and the results of the access are given as elements of the "category number array." Thereby, it is possible to keep the number of checks down to 10,000. In this manner, by means of Embodiment 12, it is possible to reduce the number of processing steps greatly in comparison to an ordinary AND search.

In addition, by using the information block according to the present invention, data that has a structure like that of a telephone number consisting of the "country code+area code+central office code+number" can be divided and registered in multiple information blocks, and this has an advantage in that searching and tabulation regarding a country code, area code or other partial data can be performed easily.

In addition, by using the category number according to the embodiments of the present invention as described previously, it is possible to generate new categories for ages, for example, by taking the ages "10–19" to be the "tens," the ages "20–29" to be the "twenties" and so on, and methods of searching and tabulating similar to those described above can be applied to the new categories thus generated.

As described above, the apparatus for implementing searching and tabulating according to embodiments of the present invention is implemented by means of an ordinary computer system shown in FIG. 28, for example a personal computer including a CPU 100, ROM 110, RAM 120, a hard disk 130, a display 140 or other output device, and a keyboard/mouse 150 or other input device 150 connected to each other via a bus 160. Therefore, as described above, the program for constructing the information block for implementing the aforementioned embodiment (information block generating program) may also be recorded on CD-ROM, ROM 110 or the hard disk storage device 130, or may be supplied from outside via a network (not shown).

Figure 5:
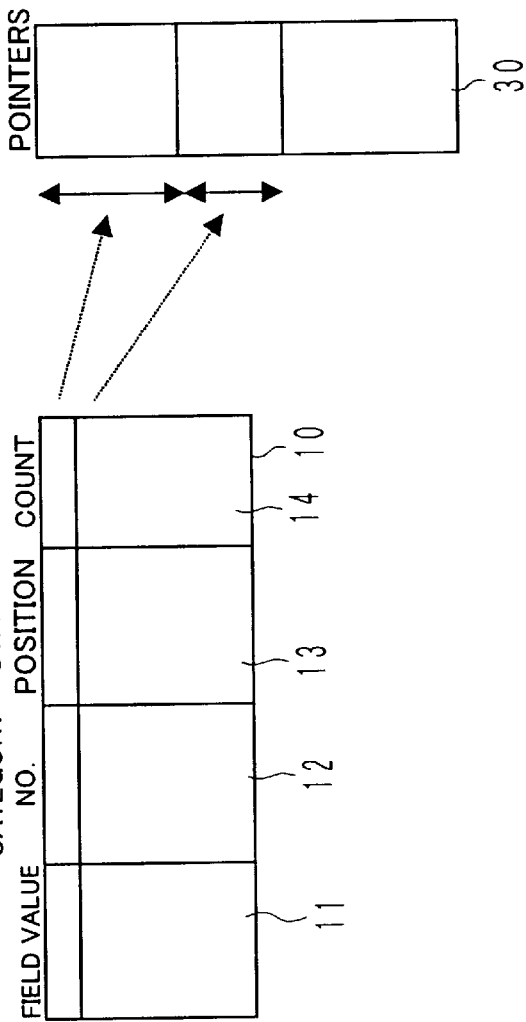
FIG. 5 is an explanatory diagram illustrating an information block according to the present invention.
Figure 29:
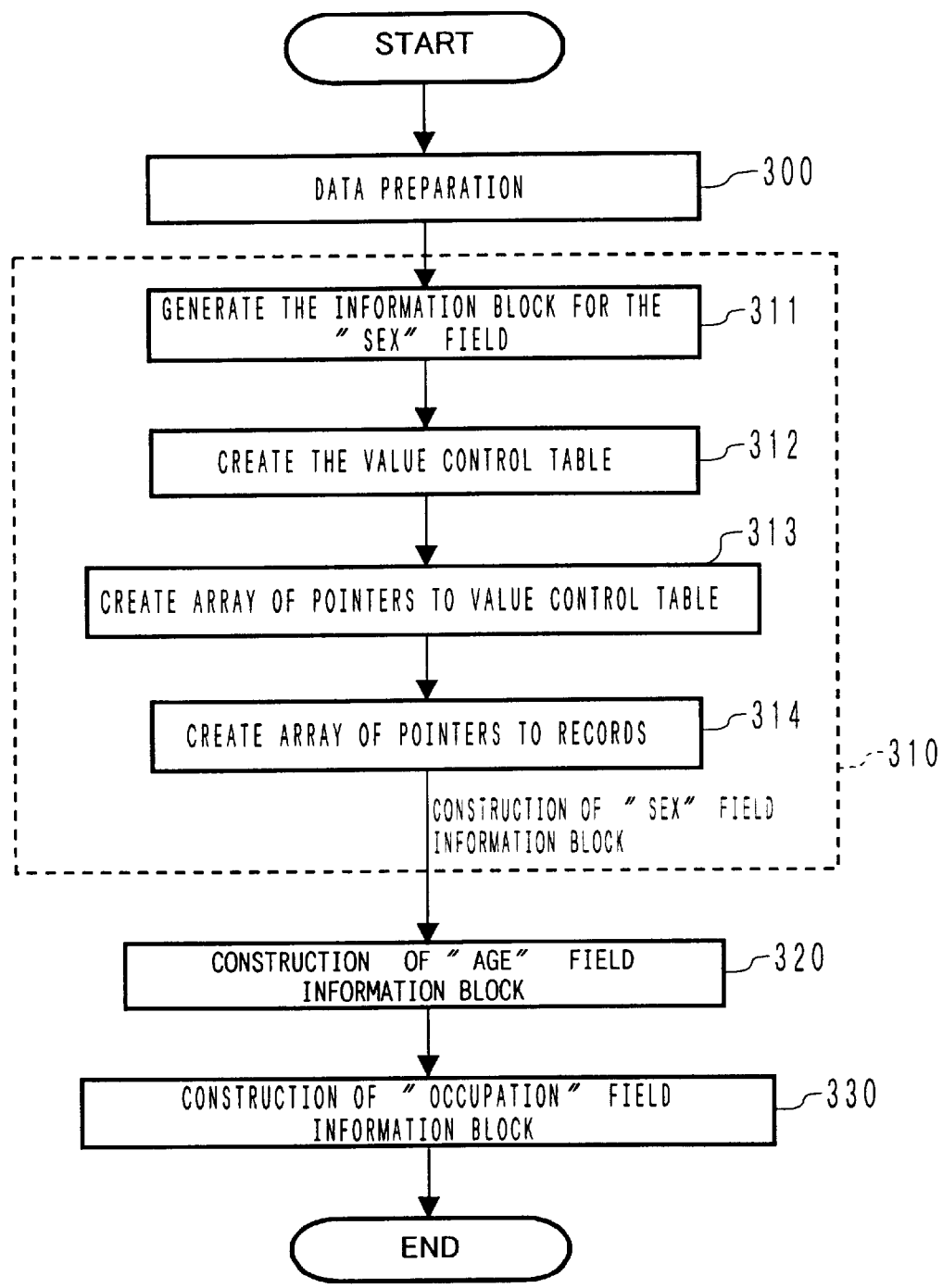
FIG. 29 is an explanatory diagram illustrating the method of constructing an information block.

With reference to the flowchart shown in FIG. 29, here follows one example of the method of constructing an information block of the format shown in FIG. 5 for the table-format data shown in FIG. 2B.

Step 300: Data Preparation

First, data of the format shown in FIG. 2B is prepared. Next, this is divided by field. In FIG. 2B, it can be divided into the fields of "sex," "age" and "occupation."

Step 311: Generation of the Information Block for the "Sex" Field

Generate one information block and this is to be the information block for the "sex" field, for example.

Step 312: Generation of the Value Control Table

Next, initialize the value control table and scan the "sex" field data from the beginning to end, while counting the number of instances of each field and storing this data. In the case of this example, up until this step, the field values of "female" and "male" are set in the array of field values 11 of the aforementioned value control table, while the values of "367436" and "632564" respectively are set in the array of counts 14 of the aforementioned value control table corresponding to the aforementioned field values.

Next, the field values ("female" and "male") within the array of field values 11 are sorted according to a stipulated basis. Naturally, at the time of this sort, the array of counts 14 must also be reordered with the sorting of the array of field values 11.

Moreover, set the start position in the array of start positions 13 of the value control table. This start position is found as the cumulative total of counts corresponding to the start position from the first count in the array of counts 14 within the value control table. Naturally, the value of the first start position is "0."

Next, copy the content of the array of start positions 13 to the array of category numbers 12. The array of category numbers 12 is used later as a work area at the time of creating the array of pointers to records.

Step 313: Creation of the Array of Pointers to the Value Control Table

Next, allocate a storage area for the array of pointers to the value control table 20 (The size of the storage area is the total count in the aforementioned array of counts 14.)

Next, extract one field value at a time from the "sex" field data from the beginning to the end, examine each field value to see if it matches the field value at each entry of the value control table, and if it matches the $n^{th}$ field value, then set "n-1" as a pointer to the value control table in the aforementioned array of pointers to the value control table.

Step 314: Creation of the Array of Pointers to Records

Next, allocate a storage area for the array of pointers to records 30. In this example, the size of the storage area is the total of the counts in the aforementioned array of counts 14. In the array of pointers to the value control table 20, from the beginning row to the ending row, extract one pointer to the value control table at a time. Extract the $J^{th}$ value of the array of pointers to the value control table 20, and assuming its value is "K" then extract the category number corresponding to the $K+1^{th}$ record of the value control table, and assuming its value is "L" then store "J-1" in the $L+1^{th}$ element of the array of pointers to records 30, and increment by 1 the category number corresponding to the $K+1^{th}$ record of the value control table.

The aforementioned operation completes the creation of the information block for the "sex" field (Step 310). Information blocks for the "age" field and "occupation" field can be created in the same manner (Step 320 and Step 330), and thus information blocks for the entire table-format data are obtained.

FIGS. 30 through 35 are explanatory diagrams for the procedure of creating the information block regarding "occupation" in the table-format data shown in FIG. 1.

Figure 30:
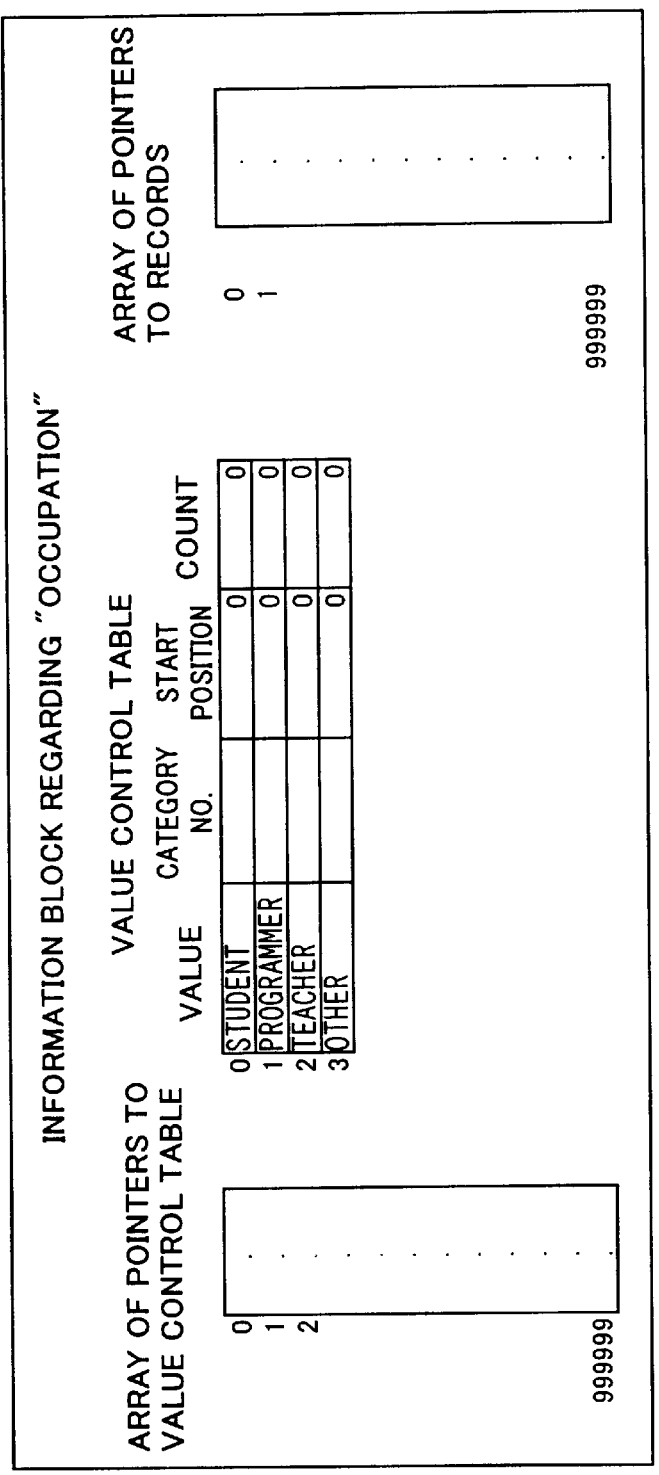
FIG. 30 is an explanatory diagram illustrating the preparation for data population and initialization.

FIG. 30 is a diagram illustrating populating with new data in the case in which categories are already defined and the types of attribute values are known in advance. Here, the value control table is created according to known category definitions. Since the start positions and counts are unknown, these are initialized to "0." In addition, storage areas are allocated for the array of pointers to the value control table and array of pointers to records and these are similarly initialized.

Figure 31:
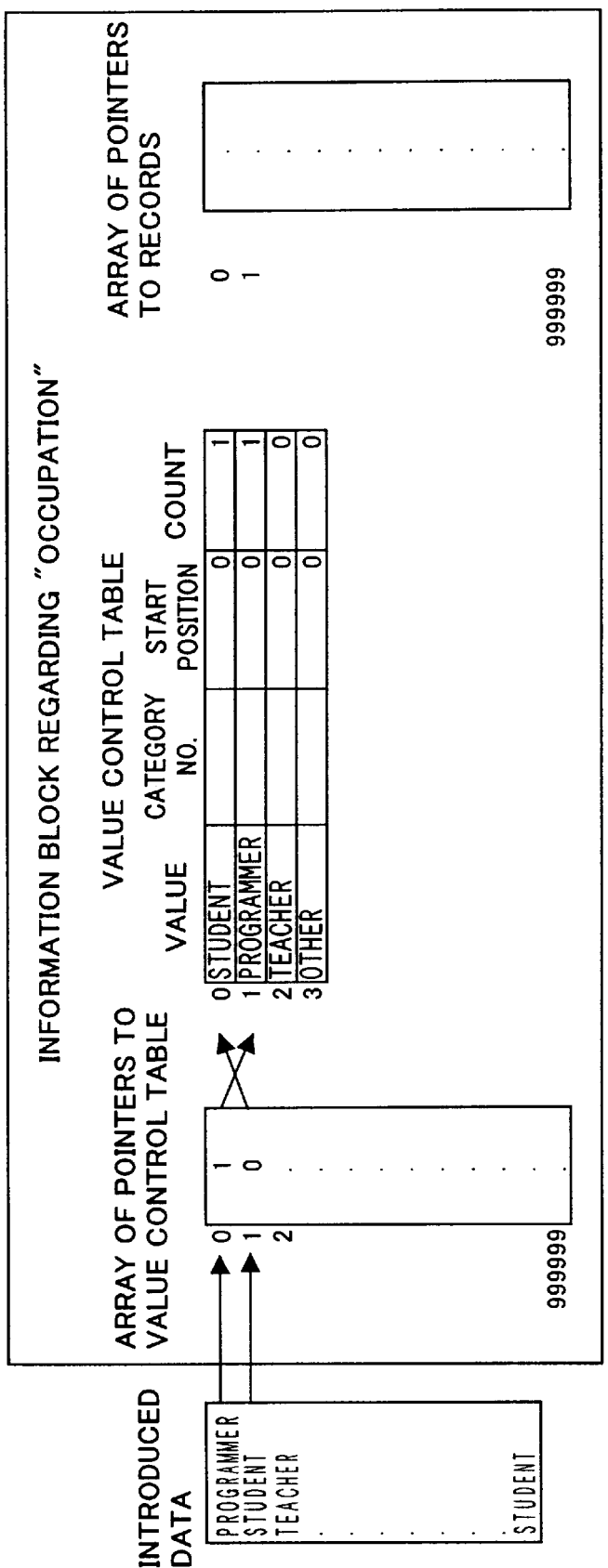
FIG. 31 is an explanatory diagram illustrating the first pass of data population.

FIG. 31 shows the pass in which the array of pointers to the value control table and the counts in the value control table are completed. The data to be populated is taken one item at a time starting from the beginning and its value examined as to which item (namely, which field value number) in the value control table it matches, and then it is stored in the array of pointers to the value control table and the corresponding count in the value control table is updated by "+1" at a time. The example of FIG. 31 shows the state after the processing of the second item of data to be populated is complete.

Figure 32:
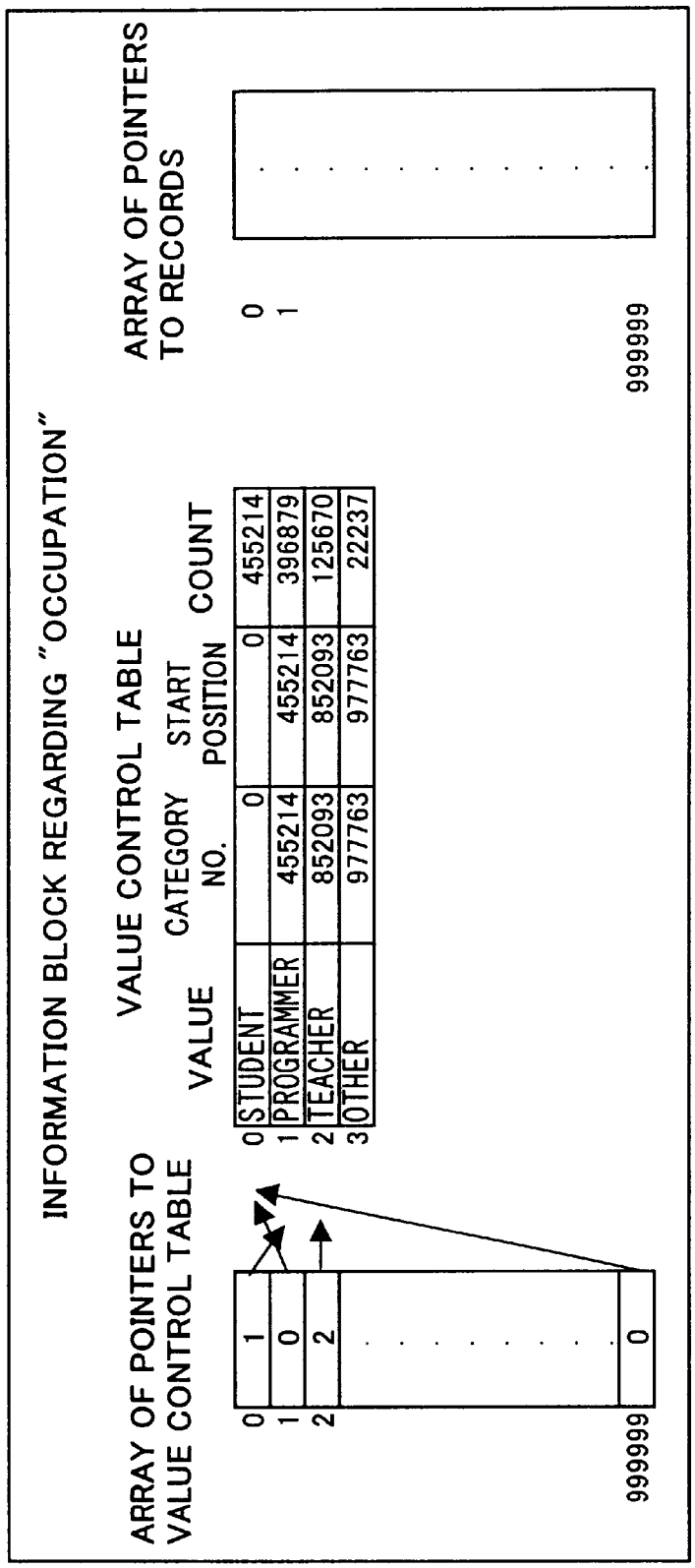
FIG. 32 is an explanatory diagram illustrating the second pass of data population.

FIG. 32 shows the second pass for completing the value control table. The accumulation of counts uses the correspondence to the start position to find the start positions. Moreover, the value of the start position is copied to the category number. In the figure, the setting of the category number is complete.

Figure 33:
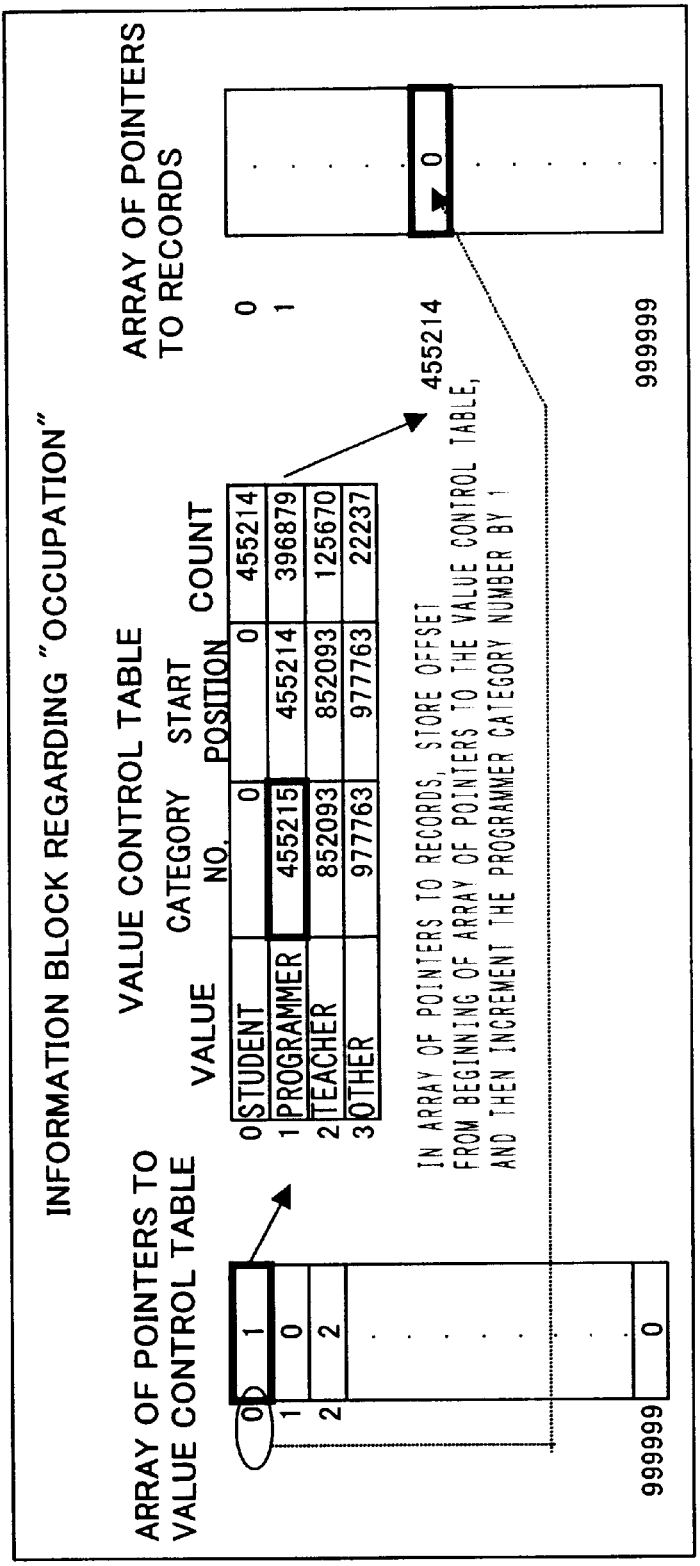
FIG. 33 is an explanatory diagram illustrating the third pass of data population.
Figure 34:
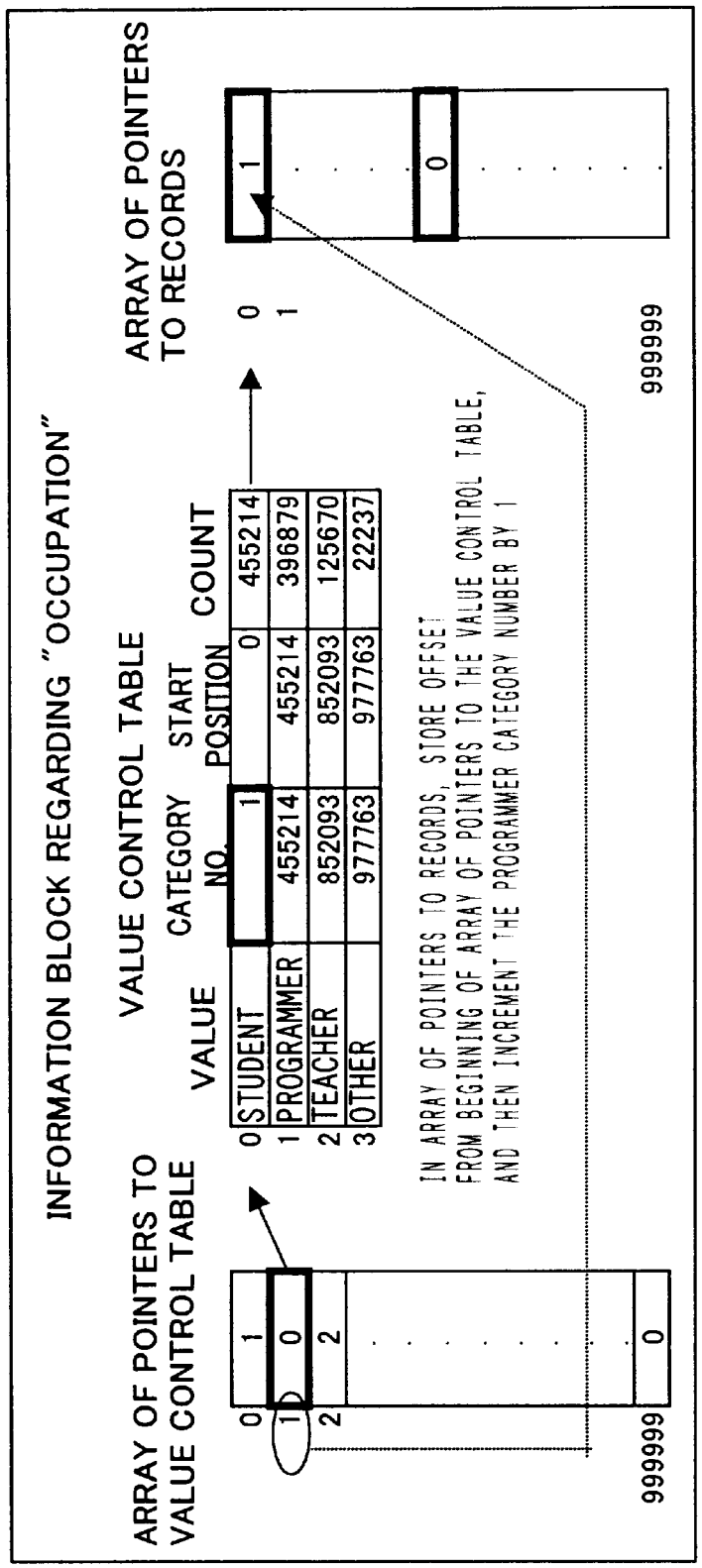
FIG. 34 is an explanatory diagram illustrating the third pass of data population.
Figure 35:
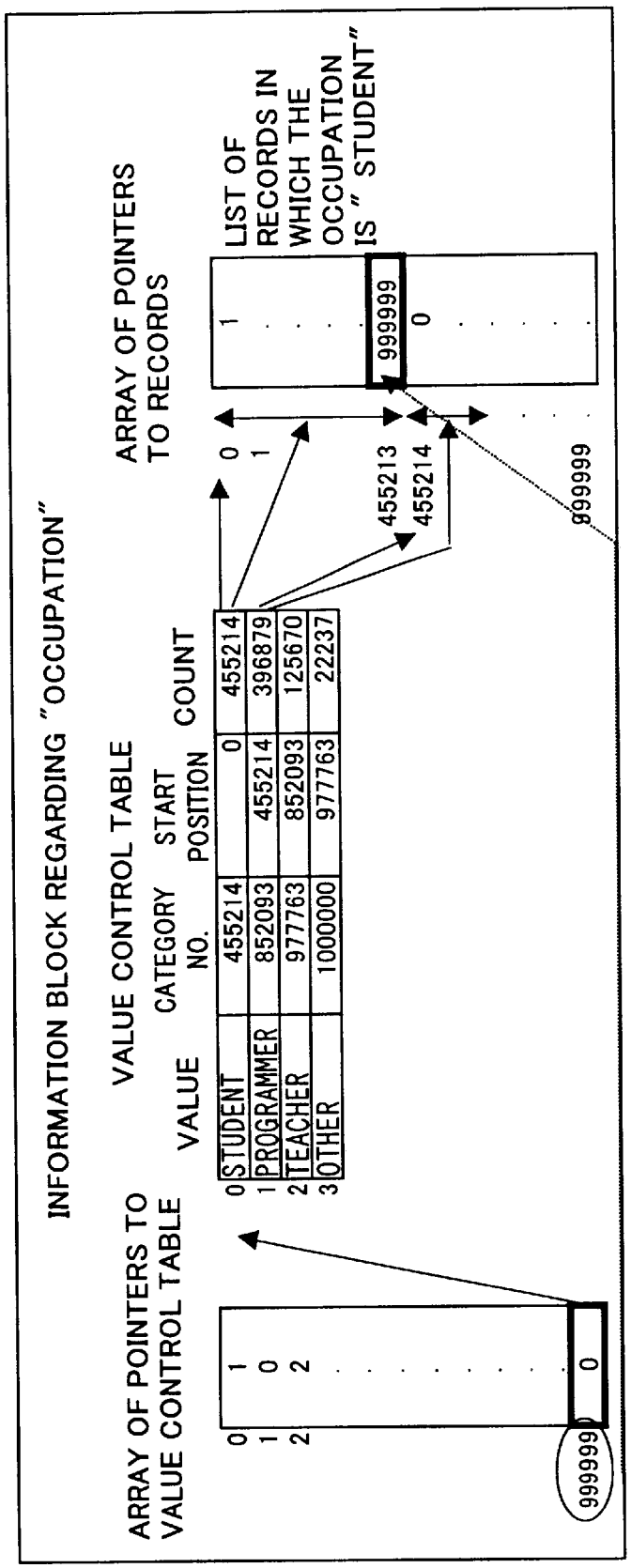
FIG. 35 is an explanatory diagram illustrating the third pass of data population.

FIGS. 33–35 show the third pass of data population. In this pass, one value (pointer) at a time is taken from the beginning of the array of pointers to the value control table, and the offset in the array of pointers to the value control table, namely the record number, is stored at the position in the array of pointers to records specified by the category number within the value control table referenced by that value. FIGS. 33, 34 and 35 respectively show the processing of the first, second and last pieces of data of the array of pointers to the value control table of the information block regarding "occupation."

Note that in the aforementioned explanation, the field of the category number is used as a work area, but any array that is an array of integers with a number of elements equal to or greater than the number of rows in the value control table, namely the total number of field value numbers, can also be used as the work area.

On the other hand, the population with new data in the case that categories are not defined in advance is implemented by scanning the data to be populated and acquiring a list of values to be registered in the value control table and then, performing the aforementioned process of population with new data in the case that the categories are defined.

Figure 36:
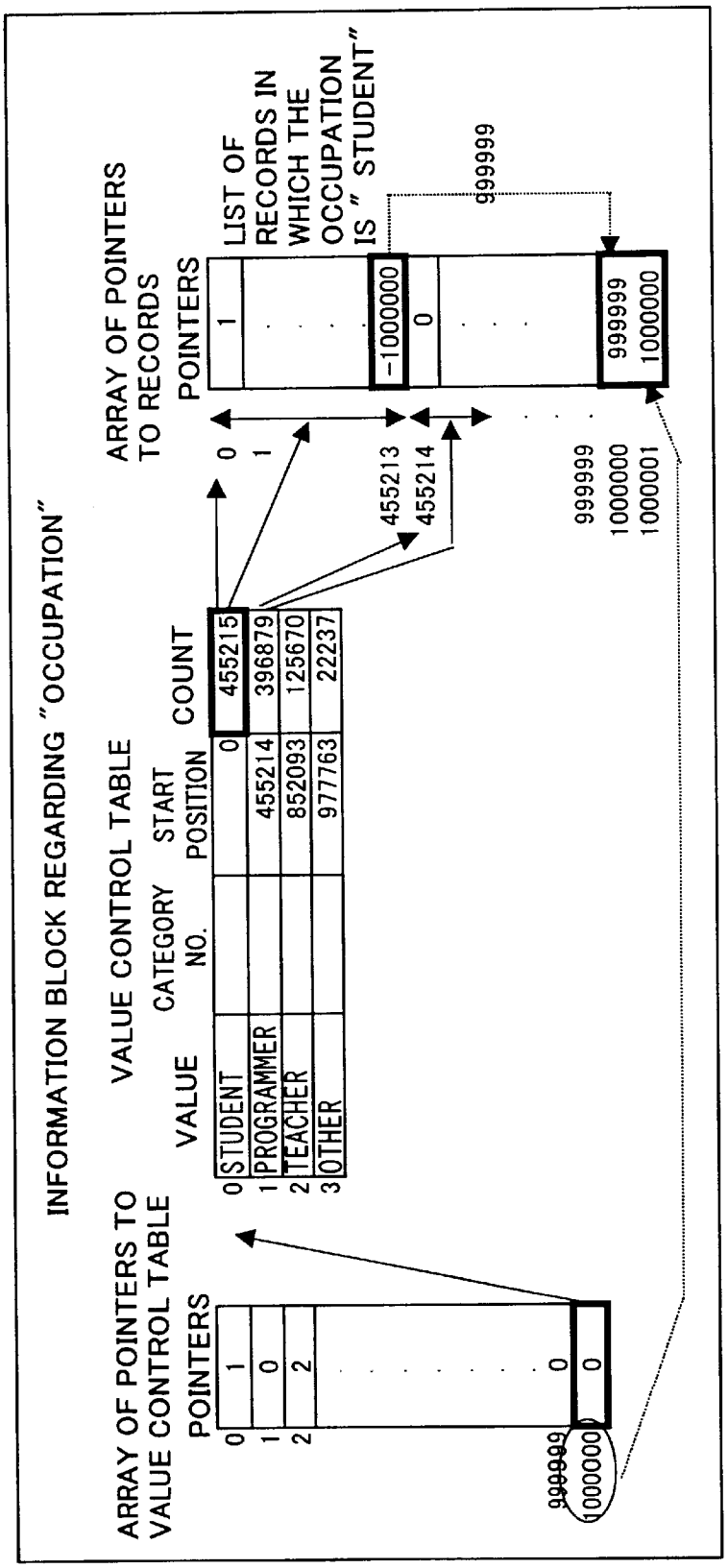
FIG. 36 is an explanatory diagram illustrating the addition of data to an information block.

Next, consider the case of adding an additional "Student" record to the information block regarding "occupation" after the population with new data is complete as shown in FIG. 35. FIG. 36 is an explanatory diagram for this addition of a record.

In this case, the field value number 0 which indicates "Student" is added to the end of the array of pointers to the value control table, and then the count of students in the value control table is increased by "1." Next, it is necessary to allocate space for storing the record number, namely the value of the pointer to the value control table (=1000000), within the array of pointers to records. To this end, the value at the end of the array of pointers to records corresponding to "Student" (in this example, 999999) is extracted and "1000000," which is the expansion address, is stored. However, its sign may be reversed, for example, in order to identify this as an expansion address, and stored as "−1000000." Then, the end value of "999999" which was extracted previously as the expansion is stored, and finally, the pointer value of "1000000" corresponding to the newly added record is stored.

By adopting this method of adding data, the need to move large amounts of data at the time of adding data is avoided. In addition, in order to suppress the drop in access efficiency arising from the increase in the number of pointers when large numbers of records are added, it is sufficient to repeat the same processing as the third pass of the population with new data at appropriate timing.

Figure 37:
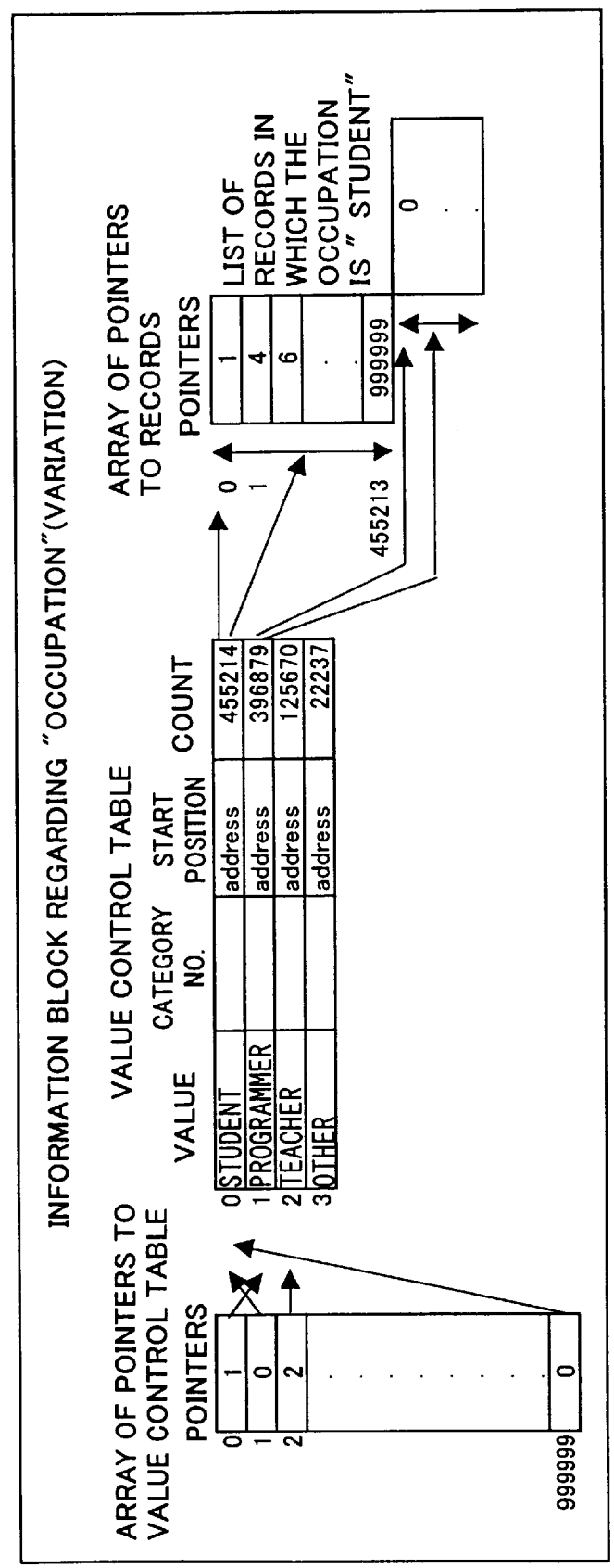
FIG. 37 is a diagram illustrating the structure of an information block according to another embodiment of the present invention.

FIG. 37 illustrates the structure of an information block according to another embodiment of the present invention.

In the case that the structure shown in this figure is adopted, increases in the number of pointers are avoided and changes to data can be performed easily. In FIG. 37, the array of starting locations contains addresses that indicate the beginning of the area where the array of pointers to records is disposed. For example, "0" is stored as the start position for the field value of "Student." On the other hand, for the field value of "Programmer," the value of "n (where n>455214)" is allocated as the start position.

Figure 38:
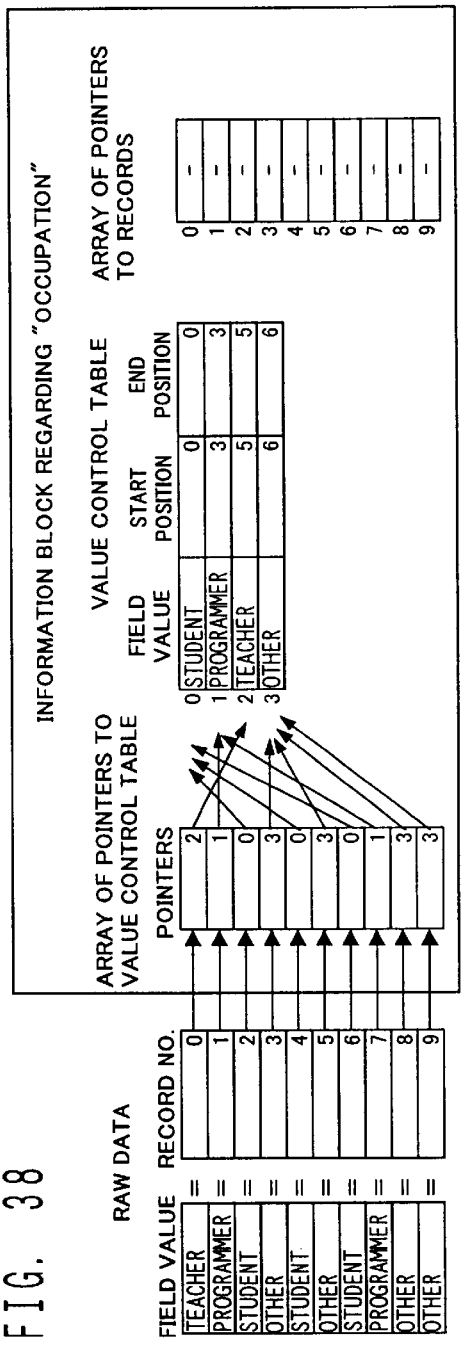
FIG. 38 is an explanatory diagram illustrating the initial state of sorting according to Embodiment 13 of the present invention.

Next, we shall add an explanation of Embodiment 13 of the present invention. In this embodiment, a sort of records is implemented using the aforementioned information block. FIG. 38 illustrates the initial state of sorting records on the "occupation" field. The raw data shown in this figure shows the array of record numbers to be sorted. For example, an array of pointers to records obtained for fields other than "occupation," or a result set from a search can be used as the raw data. In the case of this example, for simplicity in the explanation, the record numbers of the raw data are arranged in the order "0, 1, 2, . . . , 9" but one must note that the order of record numbers prior to the sort will generally be random. The field values in the "occupation" field corresponding to each record number are arranged in the order "Teacher, Programmer, Student, . . . , Other."

On the right side of this figure, the initial state of the various arrays contained in the information block regarding "occupation" is shown. The information block regarding "occupation" is created by the information block construction method explained with reference to FIGS. 29–35. At the time of performing a sort of records on the "occupation" field, the value control table and array of pointers to the value control table of an information block regarding "occupation" prepared in advance is used. As the start position, the start positions set at the time of construction of the information block are used as is. The start positions are copied to the corresponding end positions. The area to contain the end position may be, for example, the area allocated for the count (the count array). The array of pointers to the value control table may be prepared in advance in record number order, for example. In the case of this example, the array of record numbers of the raw data are in descending order, so the connection between the record numbers of the raw data and the array of pointers to the value control table exhibits a simple relationship. In addition, the array of pointers to the value control table is an array for storing the sorted result set, so an area of the same size as the data to be sorted is allocated. The aforementioned end positions are used as an array for storing the sorted results in the array of pointers to records.

Figure 39:
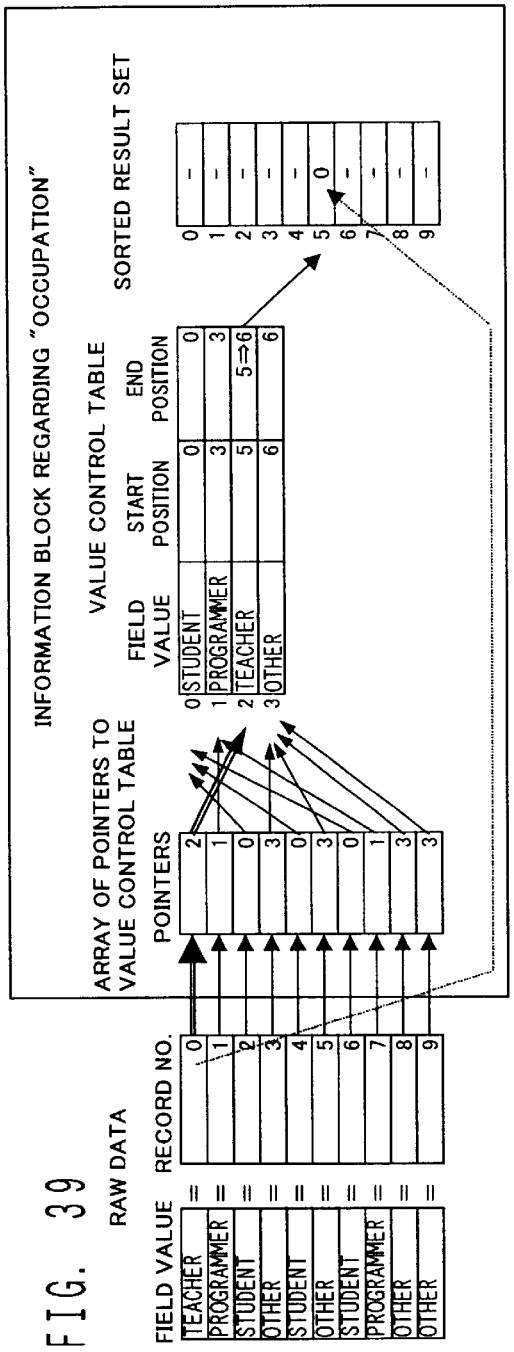
FIG. 39 is an explanatory diagram illustrating the first step of sorting according to Embodiment 13 of the present invention.

FIG. 39 is an explanatory diagram illustrating the first step of sorting according to Embodiment 13 of the present invention. In the first step, the beginning record in the raw data (in this example, the one with record number=0) is processed. The field value of the "occupation" field of the record with record number "0" is "Teacher." At this time, the field value number "2" which specifies a field value of "Teacher" is stored in the array of pointers to the value control table corresponding to record number "0." Then, the value "5" of the end position corresponding to the field value number of "2" is extracted and this value of "5" is used as an address to set this record number "0" in the $5^{th}$ position of the array of pointers to records where the sorted result set is stored. Next, the value of the end position corresponding to this field value number of "2" is incremented by "+1," so "5" is increased to "6."

Figure 40:
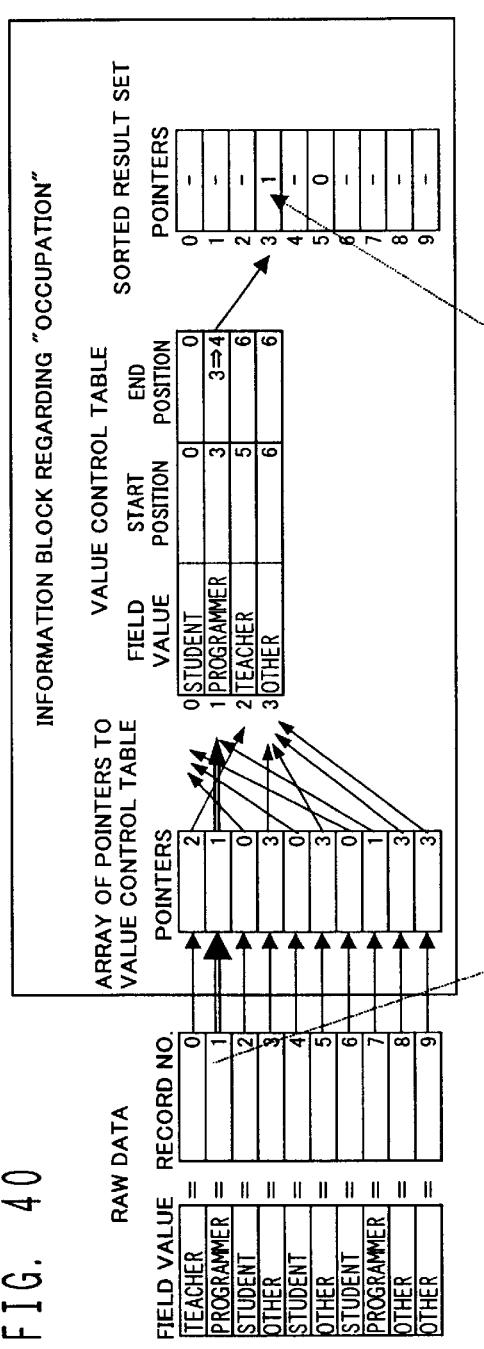
FIG. 40 is an explanatory diagram illustrating the second step of sorting according to Embodiment 13 of the present invention.
Figure 41:
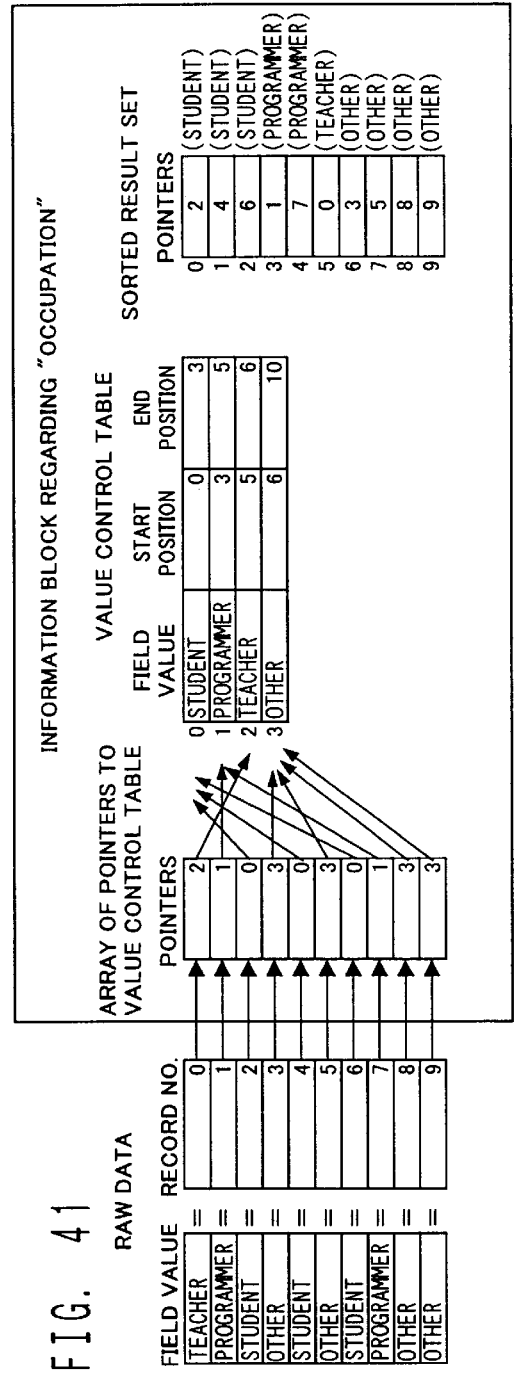
FIG. 41 is an explanatory diagram illustrating the final state of sorting according to Embodiment 13 of the present invention.

FIG. 40 is an explanatory diagram illustrating the second step of sorting according to Embodiment 13 of the present invention. In the second step, the second record in the raw data (in this example, the one with record number=1) is processed. The field value of the "occupation" field of the record with record number "1" is "Programmer." At this time, the field value number "1" which specifies a field value of "Programmer" is stored in the array of pointers to the value control table corresponding to record number "1." Then, the value "3" of the end position corresponding to the field value number of "1" is extracted and this value of "3" is used as an address to set this record number "1" in the $3^{rd}$ position of the array of pointers to records where the sorted result set is stored. Next, the value of the end position corresponding to this field value number of "1" is incremented by "+1," so "3" is increased to "4."Thereafter, the same operation as in the aforementioned first and second steps are repeated for the remaining record numbers of "2, 3, 4, 5, 6, 7, 8, 9" in the raw data. FIG. 41 shows the final state of the sort thus obtained. As can be seen from the sorted result set in this figure, the sort according to Embodiment 13 of the present invention results in the records being sorted in the order of the "occupation" field value numbers, being reordered into the order of "2, 4, 6, 1, 7, 0, 3, 5, 8, 9" by record number.

In the aforementioned explanation of Embodiment 13, the case is envisioned wherein the raw data contains all records in the original table-format data, namely the entire set. However, the sort according to the present invention is also effective on only a portion of records, namely on a partial set. Here follows an explanation of sorting a partial set in reference to FIGS. 42 and 43.

FIG. 42 is a diagram illustrating the state of completion of the aforementioned sorting on a partial set. In the case of this example, the raw data given consists of a record with a record number of "0" in which the field value of the "occupation" field is "Teacher," and a record with a record number of "1" in which the field value is "Programmer." When the sorting is applied to both of these records, sort results as shown by the sorted result set in this figure are obtained. At this time, the result set is contained in the array of pointers to records. Therefore, an area of the same size as the entire set is allocated to store the sort results from a partial set.

Thus, in the case of a sort on a partial set, it is preferable that the result set be compressed to the same size as the partial set. FIG. 43 shows the post-processing for this sorting on a partial set. This post-processing, namely the compression of the result set, comprises taking the difference between the start position and end position for each field value in the value control table, and extracting the count and storage position in the sort results corresponding to the field value in question, and then arranging the sort results based on the extracted count and storage position.

Next, we shall again add a general explanation of the aforementioned sorting of the entire set or partial set, using the flowchart in FIG. 50. Here, for both cases of an entire set and a partial set, the raw data is considered to have storage position numbers attached in order starting from the beginning. For example, in FIGS. 38 and 41, the storage position numbers match the record numbers. However, in the case that the order of arrangement of raw data does not follow the record number, the storage location number differs from the record number. Note it goes without saying that the sorting described in detail regarding the aforementioned embodiment can be implemented by the CPU 100 executing a program stored in a stipulated area.

In the sorting, first, the storage location number is initialized (Step 5001). Next, the corresponding pointer within the array of pointers to the value control table is accessed for a certain storage location number (Step 5002), and then identify the value of the end position where the field value number specified by the pointer is positioned (Step 5003).

Thereafter, the corresponding record number is stored at the position within the array of pointers to records identified by the aforementioned end position (Step 5004). Then, in the value of the end position identified in Step 5003 is incremented (Step 5005). The processing in the aforementioned Steps 5002 through 5005 is performed for all of the raw data (see Steps 5006 and 5007), and thereby, it is possible to obtain an array of pointers to records containing the stipulated record numbers. One can see that the example of FIG. 39 corresponds to Step 5002 through Step 5005 in the case that the storage position number is "0," and one can also see that FIG. 40 corresponds to Step 5002 through Step 5005 in the case that the storage position number is "1." In addition, in the case of sorting a partial set, after Steps 5001 through 5007 are executed, it is sufficient to compress the result set by means of the sort post-processing (see Step 5008).

The sort according to the aforementioned Embodiment 13 of the present invention is a so-called "ascending order" sort, namely a sort wherein the sort results are arranged in order of increasing field value numbers of the sorted field values. However, the sort results may also be arranged in "descending order," wherein they are arranged in order of decreasing field value numbers of the sorted field values. The "descending order" sort is implemented by modifying the start position used in the case of an "ascending order" sort. In the case of this example, the starting positions for an "ascending order" sort are as follows:

| Student | 0 |
| Programmer | 3 |
| Teacher | 5 |
| Other | 6 |

In contrast, the start positions for a "descending order" sort become:

| Other | 0 |
| Teacher | 10 − 6 = 4 |
| Programmer | 10 − 5 = 5 |
| Student | 10 − 3 = 7 |

A sort performed according to Embodiment 13 of the present invention as such has the following advantages.

First, a high-speed sort is achieved. For example, in an operating environment using Pentium Pro® 200 MHz/ Windows 95®, the novel sort according to the present invention achieved a sort time for 1 million of 145 ms. In contrast, in the case of a conventional Quicksort, the time required to sort 1 million integers was 1530 ms.

Second, constant performance is obtained regardless of the type of field values stored as values. The present sort gives performance identical to that for integers even when the data type of the field values is text or floating point, for example. In contrast, in the case of the conventional Quicksort or other algorithms, the speed is highest when the type of data handled is integer and lowest when the type is variable-length text.

Third, the sorting speed does not drop even if the data size increases. With this sort, the sorting speed is expressed by $O(n)$ where n is the data size. On the other hand, with Quicksort or other conventional high-speed sorting methods, the sorting speed is $O(n \cdot \log(n))$, for example.

Fourth, sorts on multiple fields can be divided into sorts on each field. For example, in Embodiment 13 of the present invention described with reference to FIGS. 38–41, among the raw data, records corresponding to a field value of "Student" are arranged in the order record number "2," record number "4," and record number "6." And this order of record numbers (namely, record number "2," record number "4," and record number "6") is preserved in the final sorted result set. This means that the order of records in the sorted result reflects the order of records prior to sorting within the scope of satisfying the purpose of the sort. By taking advantage of this characteristic of the present sort, a sort on multiple fields can be achieved by performing sequential sorts on each individual field. In contrast, with the conventional Quicksort, the state prior to sorting is known not to be reflected in the order of the sort results.

SPECIFIC EXAMPLES

In the aforementioned various embodiments of the present invention, the value control table contains a value list of the field values. For example, in the example shown in FIG. 7, the field value column contains a list including the values "16," "17," "18," . . . . In addition, the value control table includes category numbers set for each field value number. Here follows an explanation of a specific example illustrating how the combination of such a value list and category number for a field value can be used to determine immediately whether or not multiple values for a certain field match search conditions by means of several comparative judgments.

For example, consider the case wherein the following list is given as the value list, sorted by the magnitude of the value:

0.1, 0.2, . . . , 100.0, 100.1, 100.2, . . . , 1000.0 and "value is greater than 100" is given as the search condition.

First, from the value list, find the smallest value that does not satisfy the condition (in this example, 100). Then, set "0" as the category number for all the values in the value list before the smallest value, namely "100." In addition, set "1" as the category number for all values in the value list after "100." Thereby, if the smallest value can be found, thereafter, the category number is set without performing any comparison operations, and thus a field value or field value number having a value satisfying the search conditions can be obtained.

By using the bisection method or other known methods in the prior art, the smallest value can be found by a small number of comparison operations. For example, if there are N variations in the values present in the value list, then the number of comparison operations required to find the aforementioned smallest value is roughly $\log_2(N)$.

In contrast, in the event that the value list is not sorted on the magnitude of the value, if there are similarly N variations in the values present in the value list, then N comparison operations are required to find the value that satisfies the search condition.

Since the value list is sorted and category numbers are set in the value control table in this manner, the determination of whether or not the stipulated search conditions are met can be speeded up.

In addition, as would be naturally understandable to a person skilled in the art, the content of the aforementioned value list and the search conditions are no more than a single specific example for explaining this example, and according to the present invention, the determination of whether or not the stipulated search conditions are met can be speeded up for various value lists and for various combinations of search conditions.

Figures 44, 45, 47:
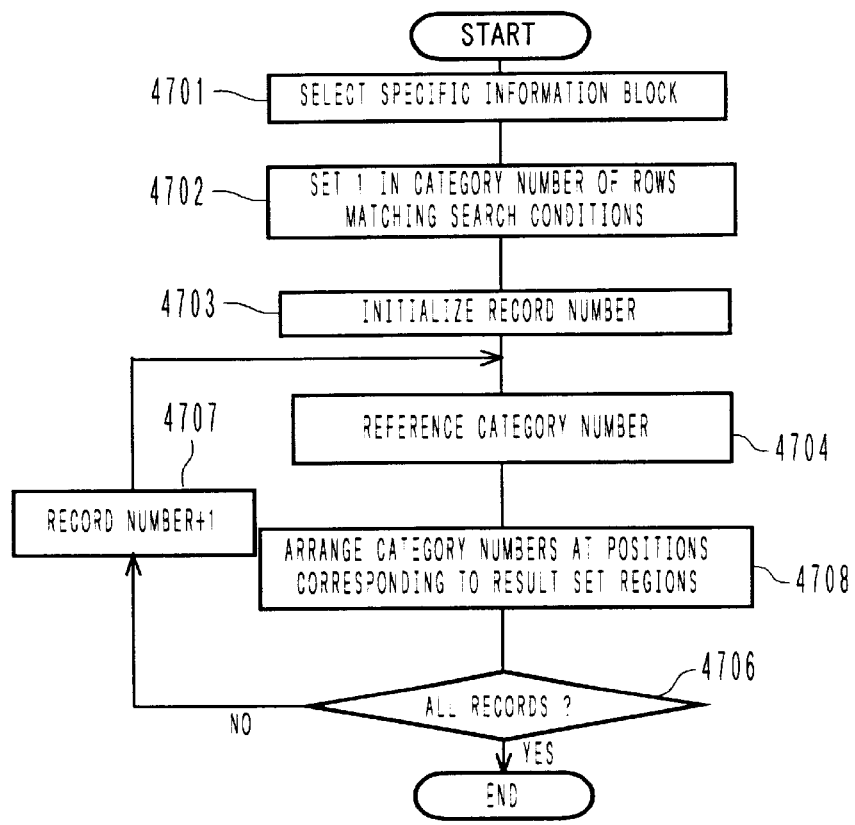
FIG. 44 is an explanatory diagram illustrating the 1 million records of data used in the searching and tabulating tests.
FIG. 45 is an explanatory diagram illustrating the results of measurement of the searching and tabulating tests on 1 million records of data.
FIG. 47 is a flowchart illustrating the searching process according to Embodiment 3 of the present invention.

Next, we shall describe tests of searching for and tabulating 1 million records of data. The platform used in the tests was an ordinary personal computer equipped with a Pentium Pro® 200 MHz processor and 128 MB of memory. FIG. 44 is a table showing the data used in the tests. The data consisted of one million numbers in the range from "000000" to "999999" in the form of table-format data divided into three fields consisting of the 0,000's unit, the 100's unit and the 1's unit. Field values in the range from "00" to "00" appear 10,000 times apiece for each field.

FIG. 45 is a list of the test results showing the time required to search for/tabulate 1 million records, measured depending on the result set type. The result set type is one two types, namely the aforementioned bit flag type and array of pointers type. The times in the test results are given in units of milliseconds (ms; 1/1000 seconds).

The search performed in the aforementioned test is a search of an AND of multiple fields, by connecting the three fields of "×10,0000," "×100" and "×1" with an AND condition. The search was a cascade of the fields "×10,000," "×100" and "×1" in this order. The intermediate and final result sets from the search take the form of a bit flag or array of pointers as described above. The measured times are given as the average of five measurements.

In addition, the tabulation in these tests consists of counting the number of times the various values (00 through 99) of the "×100" and "×1" fields appear in the result sets obtained from the search tests. The size of the table for this cross-tabulation is (100×100=)10,000 cells. The times are given in units of milliseconds and the average of 5 measurements is given as the measured times.

The constitution of the searching and tabulating system for table-format data is in no way limited to the examples described in the aforementioned embodiments, but rather the various constituent elements of the searching and tabulating system may be implemented in software (program), stored on a disk device or the like and, if necessary, the searching and tabulating system can be installed on a computer to perform the searching and tabulating of table-format data. Moreover, the program thus implemented may be stored on a floppy disk or CD-ROM or other portable storage medium, and can be used in a general purpose fashion in a situation in which such a system is used.

The present invention is in no way limited to the aforementioned embodiments but various modifications are possible within the scope of the invention recited in the patent claims, and it goes without saying that these are also included within the scope of the present invention.

For example, in the AND searches and OR searches illustrated in the aforementioned Embodiment 2, searches were executed on two fields, but this is not a limitation, since it is clear that searches on three or more fields can also be implemented.

In addition, in the aforementioned Embodiment 7 and Embodiment 8, a two-dimensional array was generated in order to perform a tabulation on two fields, but this is not a limitation, as it is possible to generate a three-dimensional or higher-dimensional array in order to perform a tabulation on three or more fields, and it goes without saying that these can be used to perform the aforementioned tabulation. Considering the tabulation of three fields, field value numbers $q_1$, $q_2$, $q_3$ in each of the three information blocks are extracted, and this is used to identify one element $P(q_1, q_2, q_3)$ in the three-dimensional array.

Moreover, regarding the aforementioned Embodiment 9 also, it goes without saying that it is possible to performed tabulation on three or more fields in the same manner as in Embodiment 7 and Embodiment 8.

In addition, while the searching, tabulating and/or sorting are implemented by reading a stipulated program into an ordinary computer system and then executing the program in the aforementioned embodiments, the present invention is in no way limited to this, but rather it goes without saying that it may be constituted such that a board computer used exclusively for data processing is connected to a personal computer or other ordinary computer system, and this board computer can execute the aforementioned processing. Therefore, in this s pacification, the word means does not necessarily mean a physical means, but rather it includes the case in which the functions of the various means are implemented by software and the case in which some or all of the functions are implemented by hardware. Moreover, the functions of a single means may be implemented by two or other physical means, or the functions of two or more means may be implemented by one physical means. According to the aforementioned description, by means of the present invention, it is possible to process large amounts of data expressed in table format without using the conventional data tables which required long access times, so the speed of tabulating and searching. can be greatly increased.

FIELD OF THE INVENTION

The present invention is particularly suited for use in systems that handle large amounts of data, for example, databases and data warehouses. More specifically, it is suited to large-scale scientific and technical calculation, control systems for plants and power supply and the like, methods of planning of delivery and resource distribution, and to order management and the management of clerical work such as securities trading.

What is claimed is:

1. When table-format data is represented as an array of records consisting of a plurality of fields containing field values for each field, a method of extracting from said table-format data the field value corresponding to a specific field and a specific record, said method being characterized in comprising the steps of:
keeping in a storage device, for each individual field, a value control table containing field values for that field corresponding to a field value number that uniquely identifies said field value, which is a field value number that is common to the various fields and has a stipulated order from an initial value, and a field value number-specifying information array containing information that specifies said field value numbers in the order of said records,
acquiring from said field value number-specifying information array the field value number corresponding to said specific record, and
obtaining from the field values stored in said value control table the field value corresponding to the field value number acquired as above.

2. The method according to claim 1, characterized in that, in order to categorize the field values corresponding to said field value number, category numbers are stored in said value control table corresponding to said field value number, and
said category numbers are accessed at the time of obtaining the field value corresponding to said field value number.

3. The method according to claim 1, characterized in that said information that specifies the field value number is the field value number itself.

4. The method according to claim 1, characterized in that said information that specifies the field value number is a binary value wherein 1 bit is allocated to each field value number, thus setting whether or not it is set.

5. A computer program product that is loadable into the memory of a computer, and that implements a method according to claim 1.

6. When table-format data is represented as an array of records consisting of a plurality of fields containing field values for each field, a method of searching through said table-format data for field values that match specific search conditions, said method being characterized in comprising the steps of:

keeping in a storage device, for each individual field, a value control table containing field values for that field corresponding to a field value number that uniquely identifies said field value, which is a field value number that is common to the various fields and has a stipulated order from an initial value, and a field value number-specifying information array containing information that specifies said field value numbers in the order of said records, setting search conditions containing a specific field and the field value to be searched for in said field, examining the field value numbers within the corresponding field value number-specifying information array in the order of said records, regarding the field related to said search conditions, determining whether or not the field values in said value control table specified by said field value number match said search conditions thus set, and accumulating records that match said search conditions as a result set.

7. The method according to claim 6, characterized in comprising the steps of:

keeping in a storage device the result set of records that match said search conditions, regarding fields related to other search conditions, acquiring from said field value number-specifying information array regarding said other fields the field value number corresponding records that match said search conditions set in said result set, regarding said other fields, determining whether or not the field values identified by said extracted field value numbers match said other search conditions, regarding said other fields, if the field values identified by said extracted field value numbers match said other search conditions, extracting said records corresponding to said field value numbers as records that match said separate search conditions, and if necessary, extracting said field value numbers with respect to still other fields regarding still other search conditions, and repeating the determination of matching and extraction of records.

8. The method according to claim 6, characterized in comprising the steps of:

keeping in a storage device the result set of records that match said search conditions, regarding fields related to other search conditions, using field values within the field values stored in other value control tables that match said search conditions and record identification information-specifying information corresponding to related field values to extract from a record identification information array the records that match said other search conditions, and store the records that match the search conditions in a specified other record set, if necessary, regarding still other search conditions, using still other record identification information-specifying information to extract records that match still other search conditions, and repeating the storage of still other result sets, and obtaining a final result set by eliminating duplicate records from the result sets thus obtained.

9. The method according to claim 6, characterized in that said value control table comprises, for each of said field value numbers, a start position that indicates the starting point of said exclusive area, and a count that indicates the number of records that have identical field value numbers, and a stipulated record identification information array is identified by accessing said start position and count.

10. The method according to claim 6, characterized in that the category numbers for categorizing the field values corresponding to said field value numbers in said value control table are stored corresponding to said field value number, and said category number is used to identify the field values that match the search conditions.

11. The method according to claim 6, characterized in that said information that specifies the field value number is the field value number itself.

12. The method according to claim 6, characterized in that said information that specifies the field value number is a binary value wherein 1 bit is allocated to each field value number, thus setting whether or not it is set.

13. A computer program product that is loadable into the memory of a computer, and that implements a method according to claim 6.

14. When table-format data is represented as an array of records consisting of a plurality of fields containing field values for each field, a method of tabulating said table-format data, said method being characterized in comprising the steps of:

if n represents an integer equal to 1 or greater, for each of n fields used in tabulation, keeping in a storage device individual field information consisting of a value control table containing field values for that field corresponding to a field value number that uniquely identifies said field value, which is a field value number that is common to the various fields and has a stipulated order from an initial value, and a field value number-specifying information array containing information that specifies said field value numbers in the order of said records, if i represents an integer in the range $1 \leq i \leq n$, for the $i^{th}$ individual information field, the total number of said field value numbers is represented by $N_i$, $k_i$ represents an integer in the range $0 \leq k_i \leq N_i-1$, M represents an integer equal to 1 or greater, and if m is an integer in the range $1 \leq m \leq M$, then initializing elements $P_m(k_1, k_2, \ldots, k_i, \ldots, k_n)$ of n-dimensional M data spaces having a size of $N_1 \times N_2 \times \ldots \times N_i \times \ldots \times N_n$, for said n individual information fields, when j represents an integer in the range $0 \leq j \leq$ (total number of records)−1, extracting the respective field value numbers stored in the $j^{th}$ position in each field value number-specifying information array, and when the field value number extracted from the $i^{th}$ individual information field is represented by $q_i$, identifying the elements $P_m(q_1, q_2, \ldots, q_i, \ldots, q_n)$ of said data space, and processing said identified values of the elements $P_m(q_1, q_2, \ldots, q_i, \ldots, q_n)$.

15. The method according to claim 14, characterized in that said information that specifies the field value number is the field value number itself.

16. The method according to claim 14, characterized in that said information that specifies the field value number is a binary value wherein 1 bit is allocated to each field value number, thus setting whether or not it is set.

17. A computer program product that is loadable into the memory of a computer, and that implements a method according to claim 14.

18. When table-format data is represented as an array of records consisting of a plurality of fields containing field values for each field, a method of tabulating said table-format data, said method being characterized in comprising the steps of:

if n represents an integer equal to 1 or greater, for each of n fields used in tabulation, keeping in a storage device individual field information consisting of a value control table containing field values for that field and the category number of said field value corresponding to a field value number that uniquely identifies said field value, which is a field value number that is common to the various fields and has a stipulated order from an initial value, and a field value number-specifying information array containing information that specifies said field value numbers in the order of said records, if i represents an integer in the range $1 \leq i \leq n$, for the $i^{th}$ individual information field, the total number of either said field value numbers or said category numbers is represented by $N_i$, $k_i$ represents an integer in the range $0 \leq k_i \leq N_i - 1$, M represents an integer equal to 1 or greater, and if m is an integer in the range $1 < m < M$, then initializing elements $P_m(k_1, k_2, k_i, \ldots, k_n)$ of n-dimensional M data spaces having a size of $N_1 \times N_2 \times \ldots \times N_i \times \ldots \times N_n$, for said n individual information fields, when j represents an integer in the range $0 \leq j \leq$ (total number of records)−1, extracting the respective field value numbers stored in the $j^{th}$ position in each field value number-specifying information array, and when the field value number extracted from the $i^{th}$ individual information field or the category number stored corresponding to said field value number in the value control table of said $i^{th}$ individual information field is represented by $q_i$, identifying the elements $P_m(q_1, q_2, \ldots, q_i, \ldots q_n)$ of said data space, and processing said identified values of the elements $P_m(q_1, q_2, \ldots, q_i, \ldots, q_n)$.

19. The method according to claim 18, characterized in that M=1 is true, and the step of processing the value of said identified element $P_m$ consists of adding 1 to the current value of said element $P_m$.

20. The method according to claim 18, characterized in that the step of processing the value of said identified element $P_m$ consists of:

for at least one element $P_m$ among the M elements $P_m$, for separate individual field information kept in a storage device, acquiring the field value numbers stored in the $j^{th}$ position in the field value number-specifying information array, from among the field values stored in the value control table of said separate individual field information, acquiring the field value corresponding to said field value number thus acquired, and updating the current value of said element $P_m$ and the value of said element $P_m$ in combination with said field value thus obtained.

21. The method according to claim 18, characterized in that said information that specifies the field value number is the field value number itself.

22. The method according to claim 18, characterized in that said information that specifies the field value number is a binary value wherein 1 bit is allocated to each field value number, thus setting whether or not it is set.

23. A computer program product that is loadable into the memory of a computer, and that implements a method according to claim 18.

24. When table-format data is represented as an array of records consisting of a plurality of fields containing field values for each field, an apparatus for searching for and tabulating said table-format data, said apparatus being characterized in comprising:

a storage device for keeping, for each individual field, a value control table containing field values for that field corresponding to a field value number that uniquely identifies said field value, which is a field value number that is common to the various fields and has a stipulated order from an initial value, and a field value number-specifying information array containing information that specifies said field value numbers in the order of said records, field value number acquisition means for acquiring from said field value number-specifying information array kept on said storage device the field value number corresponding to said specific record, and field value obtaining means for obtaining from the field values stored in said value control table kept on said storage device the field value corresponding to the field value number acquired as above.

25. The apparatus according to claim 24, characterized in that said storage device keeps individual field information that has said value control table, said field value number-specifying information array, and a record identification information array storing in exclusive areas for each of said field value number one or more pieces of record identification information related to identical field value numbers, and said value control table includes, for each of said field value numbers, record identification information-specifying information that indicates the area where said one or more pieces of record identification information related to identical field value numbers in said record identification information array, and furthermore, has search means for using said record identification information-specifying information corresponding to field value numbers related to field values within the field values contained in said value control table that match stipulated search conditions, to acquire record identification information from said record identification information array that matches said search conditions.

26. When table-format data is represented as an array of records consisting of a plurality of fields containing field values for each field, a computer-readable storage medium upon which is recorded a program for searching for and tabulating said table-format data, said storage medium being recorded with a program characterized in comprising:

a step of keeping in a storage device, for each individual field, a value control table containing field values for that field corresponding to a field value number that uniquely identifies said field value, which is a field value number that is common to the various fields and has a stipulated order from an initial value, and a field value number-specifying information array containing information that specifies said field value numbers in the order of said records, a step of acquiring from said field value number-specifying information array kept on said storage device the field value number corresponding to said specific record, and a step of obtaining from the field values stored in said value control table kept on said storage device the field value corresponding to the field value number acquired as above.

27. When table-format data is represented as an array of records consisting of a plurality of fields containing field values for each field, a computer-readable storage medium upon which is recorded a program for searching through said table-format data for records that contain a field value that matches search conditions, said program being characterized in comprising:

a step of keeping in a storage device, for each individual field, individual field information such that includes a value control table containing field values for that field corresponding to a field value number that uniquely identifies said field value, which is a field value number that is common to the various fields and has a stipulated order from an initial value, a field value number-specifying information array containing information that specifies said field value numbers in the order of said records, and a record identification information array storing in exclusive areas for each of said field value numbers one or more pieces of record identification information related to identical field value numbers, and said value control table includes, for each of said field value numbers, record identification information-specifying information that indicates the area where said one or more pieces of record identification information related to identical field value numbers in said record identification information array, and a step of using said record identification information-specifying information corresponding to field value numbers related to field values within the field values contained in said value control table that match said search conditions, to acquire record identification information from said record identification information array that matches said search conditions.

28. A sorting method whereby an array of record identification information specifying records consisting of a plurality of fields containing field values for each field is rearranged on a specific field, said method being characterized in comprising the steps of:

keeping in a storage device, for each individual field, a value control table containing field values for that field corresponding to a field value number that uniquely identifies said field value, which is a field value number that is common to the various fields and has a stipulated order from an initial value, and a field value number-specifying information array containing information that specifies said field value numbers in the order of said records, the value control table further including record identification information-specifying information that, corresponding to said field value number, indicates the area in said record identification information-specifying information array where said one or more pieces of record identification information regarding identical field value numbers are stored, for each of said records, associating said record identification information with field value numbers corresponding to the field values of said fields, for each of said field value numbers, defining the storage location after reordering said record identification information, sequentially extracting said record identification information from said array, determining said field value number corresponding to said record identification information thus extracted, storing said record identification information thus extracted in said storage location according to the record identification information-specifying information corresponding to the field value number thus determined, and updating said storage location where said record identification information is to be stored, in order to store the next record identification information.

29. The method according to claim 28, characterized in that said record identification information-specifying information comprises a start position that indicates the starting point of the area of said storage location, and an end position that is initially equivalent to the start position and whose value is incremented upon said update.

30. A computer program product that is loadable into the memory of a computer, and that implements a method according to claim 28.

31. A sorting apparatus that rearranges an array of record identification information specifying records consisting of a plurality of fields containing field values for each field on a specific field, said apparatus being characterized in comprising:

a storage device for keeping, for each individual field, a value control table containing field values for that field corresponding to a field value number that uniquely identifies said field value, which is a field value number that is common to the various fields and has a stipulated order from an initial value, and a field value number-specifying information array containing information that specifies said field value numbers in the order of said records, the value control table further including record identification information-specifying information that, corresponding to said field value number, indicates the area in said record identification information-specifying information array where said one or more pieces of record identification information regarding identical field value numbers are stored, for each of said records, means of associating said record identification information with field value numbers corresponding to the field values of said fields, for each of said field value numbers, definition means for defining the storage location after reordering said record identification information, field value number determination means for sequentially extracting said record identification information from said array and determining said field value number corresponding to the record identification information thus extracted, record identification information storage means for storing said record identification information thus extracted in said storage location according to the record identification information-specifying information corresponding to the field value number thus determined, and updating means for updating said storage location where said record identification information is to be stored, in order to store the next record identification information.

32. A computer-readable storage medium upon which is recorded a sorting program for rearranging on a specific field an array of record identification information specifying records consisting of a plurality of fields containing field values for each field, said sorting program being characterized in comprising:

a step of keeping in a storage device, for each individual field, a value control table containing field values for that field corresponding to a field value number that uniquely identifies said field value, which is a field value number that is common to the various fields and has a stipulated order from an initial value, and a field value number-specifying information array containing information that specifies said field value numbers in the order of said records, wherein the value control table further includes record identification information-specifying information that, corresponding to said field value number, indicates the area in said record identification information-specifying information array where said one or more pieces of record identification information regarding identical field value numbers are stored, for each of said records, a step of associating said record identification information with field value numbers corresponding to the field values of said fields, for each of said field value numbers, a step of defining the storage location after reordering said record identification information, a step of sequentially extracting said record identification information from said array, a step of determining said field value number corresponding to said record identification information thus extracted, a step of storing said record identification information thus extracted in said storage location according to the record identification information-specifying information corresponding to the field value number thus determined, and a step of updating said storage location where said record identification information is to be stored, in order to store the next record identification information.

* * * * *

UNITED STATES PATENT AND TRADEMARK OFFICE
CERTIFICATE OF CORRECTION

PATENT NO. : 6,643,644 B1
DATED : November 4, 2003
INVENTOR(S) : Shinji Furusho

It is certified that error appears in the above-identified patent and that said Letters Patent is hereby corrected as shown below:

<u>Title page,</u>
Item [86], 371 (c) (1), (2), (4) Date, "Mar. 16, 2001" should be -- February 9, 2001 --.

Signed and Sealed this

Fifteenth Day of November, 2005

JON W. DUDAS
*Director of the United States Patent and Trademark Office*